US007016935B2

(12) United States Patent
Lee et al.

(10) Patent No.: US 7,016,935 B2
(45) Date of Patent: *Mar. 21, 2006

(54) NETWORK CONFERENCING SYSTEM, EQUIPMENT MANAGEMENT METHOD AND DATA PRESENTATION METHOD

(75) Inventors: Seikei Lee, Saitama (JP); Hideharu Fujiyama, Chiba (JP); Shuji Kurashige, Tokyo (JP); Masataro Yamaguchi, Tokyo (JP); Toru Miyake, Tokyo (JP)

(73) Assignee: Sony Corporation, Tokyo (JP)

( * ) Notice: Subject to any disclaimer, the term of this patent is extended or adjusted under 35 U.S.C. 154(b) by 669 days.

This patent is subject to a terminal disclaimer.

(21) Appl. No.: 10/042,502

(22) Filed: Jan. 8, 2002

(65) Prior Publication Data

US 2003/0208536 A9   Nov. 6, 2003

Related U.S. Application Data

(63) Continuation of application No. PCT/JP01/03913, filed on May 10, 2001.

(30) Foreign Application Priority Data

| May 19, 2000 | (JP) | ............................ P2000-149115 |
| May 19, 2000 | (JP) | ............................ P2000-149117 |

(51) Int. Cl.
    *G06F 15/16* (2006.01)
(52) U.S. Cl. ...................... 709/204; 709/205; 709/217; 709/218
(58) Field of Classification Search ................ 709/204, 709/205, 213, 217, 218; 705/1
    See application file for complete search history.

(56) References Cited

U.S. PATENT DOCUMENTS

| 5,440,624 | A | 8/1995 | Schoof, II ............... 379/202.01 |
| 5,852,656 | A | 12/1998 | Sato et al. .................. 370/260 |
| 5,999,208 | A | 12/1999 | McNerney et al. ...... 348/14.08 |
| 2004/0117194 | A9 * | 6/2004 | Lee et al. ...................... 705/1 |

FOREIGN PATENT DOCUMENTS

WO          99/50994       10/1999

OTHER PUBLICATIONS

High-Fidelity Visual Telecommunication And Tele-Collaboration System Using ATM Networks; Itaru Mimura, Masaaki Kurosu and Masaatsu Fujita. 8297 Hitachi Review, 44(1995) Aug., No. 4, Tokyo, Japan, pp. 221-226.

(Continued)

*Primary Examiner*—Gertrude A. Jeanglaude
(74) *Attorney, Agent, or Firm*—Reed Smith LLP

(57) ABSTRACT

Various electronic equipments used in a network conferencing system are integrally managed and presentation is made in a simple manner. When each attendant electronic equipment becomes a chairman terminal having an equipment management function, it inquires the availability of an electronic equipment used for a conference, then obtains information related to an available equipment from a client control section of a conference management server, and determines whether the electronic equipment used for the conference is an output electronic equipment such as a projector or a generating electronic equipment such as a scanner. Thus, an icon display of the generating electronic equipment and an icon display of the output electronic equipment are provided while separating an area for the icon display of the generating electronic equipment and an area for the icon display of the output electronic equipment, by the display function of each attendant electronic equipment.

40 Claims, 47 Drawing Sheets

OTHER PUBLICATIONS

Computer-Supported Cooperative Work Minitrack; Marilyn A. Mantei and Raymond R. Panko; 23rd Hawaii International Conference On System Sciences; 1990 IEEE, pp. 51-110.

A Confederation of Tools for Capturing and Accessing Collaborative Activity, by Scott Minneman, Steve Harrison, Bill Janssen, Thomas Moran, Gordon Kurtenbach, Ian Smith, ACM Multimedia 95-Electronic Proceedings, Nov. 5-9, 1995, San Francisco, CA, pp. 1-22.

Architecture, Design, and Implementation of a Multimedia Conference Systems, by Anna Hac and Dongchen Lu, Int. J. Network Mgmt., vol. 7, pp. 64-83 (1997).

* cited by examiner

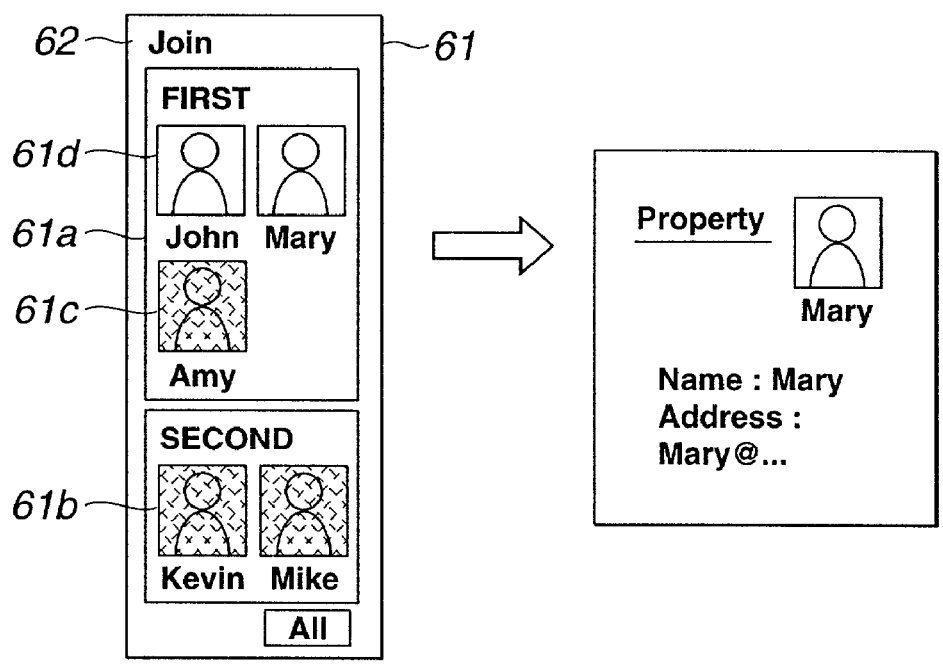
FIG.4A  FIG.4B
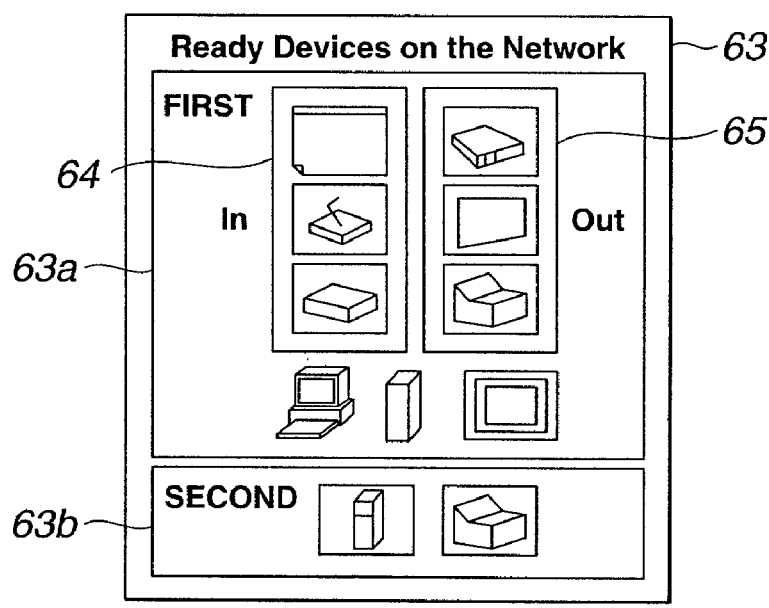
FIG.5

| TYPE | MEANING | CONTENTS |
|---|---|---|
| 01 | SUBJECT | SUBJECT |
| 02 | DATE | YYYY/MM/DD |
| 03 | PLACE | MANE OF CONFERENCE ROOM |
| 04 | Chairman | Chairman NAME |
| 05 | Presenter | Presenter NAME |
| 06 | Attendant | Attendant NAME |
| 10 | CAPTURE OUTPUT | FILE NAME |
| 11 | PROJECTOR OUTPUT | OUTPUT FILE NAME (OUTPUT TO DEVICE) |
| 12 | ···OUTPUT | OUTPUT FILE NAME |
| 15 | ···INPUT | INPUT FILE NAME (INPUT TO DEVICE) |
| 16 | ···INPUT | INPUT FILE NAME |
| 20 | MEMORANDUM | CONTENTS OF MEMORANDUM |
| 99 | END OF PRESENTATION | NONE |

FIG.8

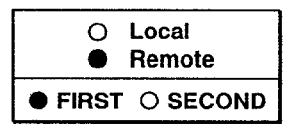
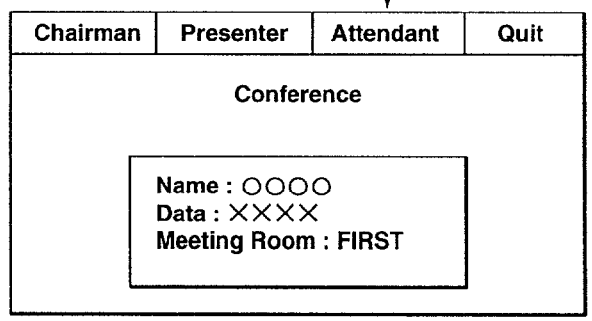
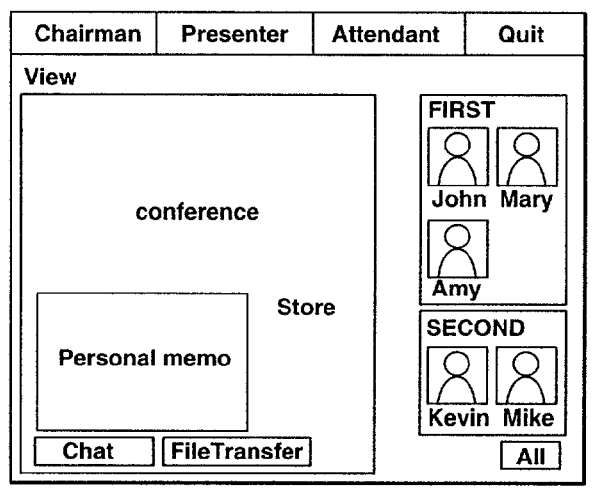
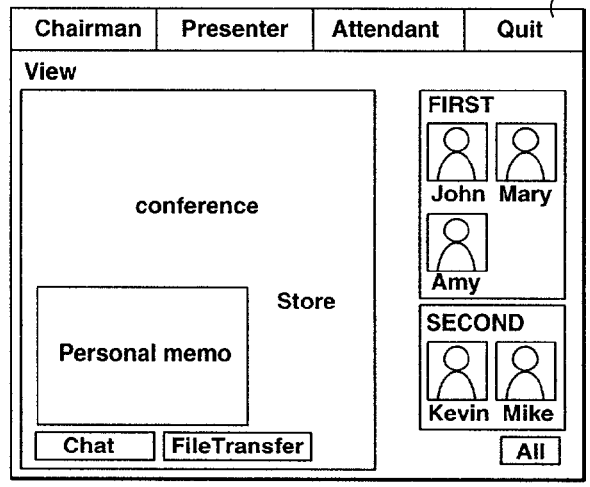
Attendant
FIG.21

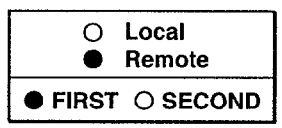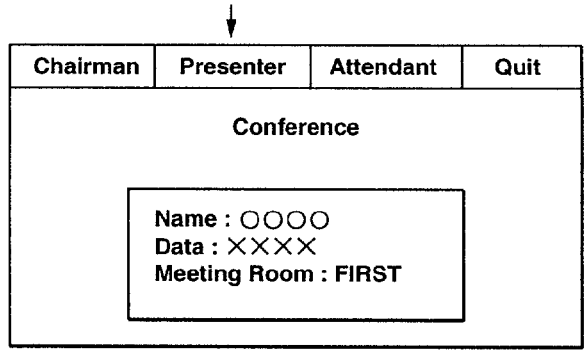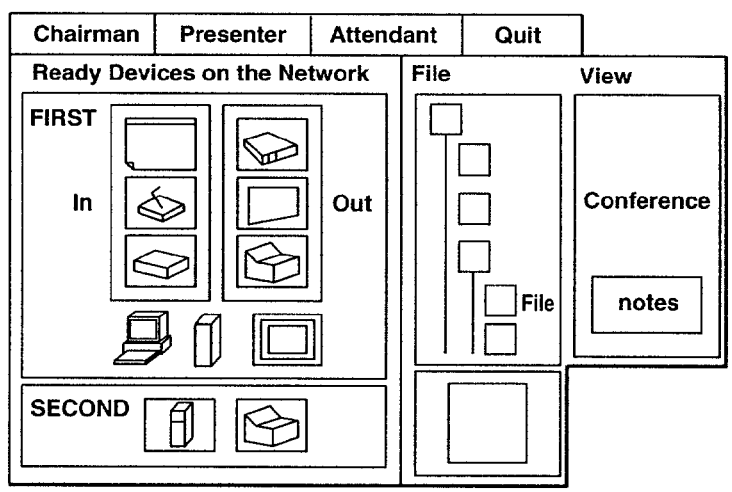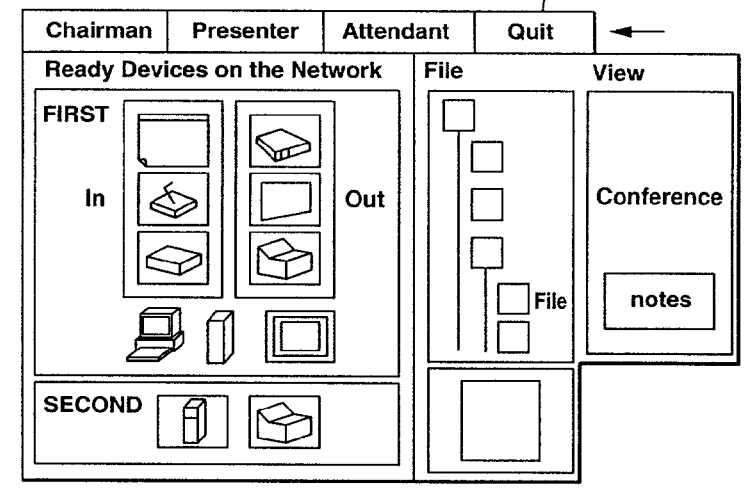
Presenter
FIG.22

Chairman

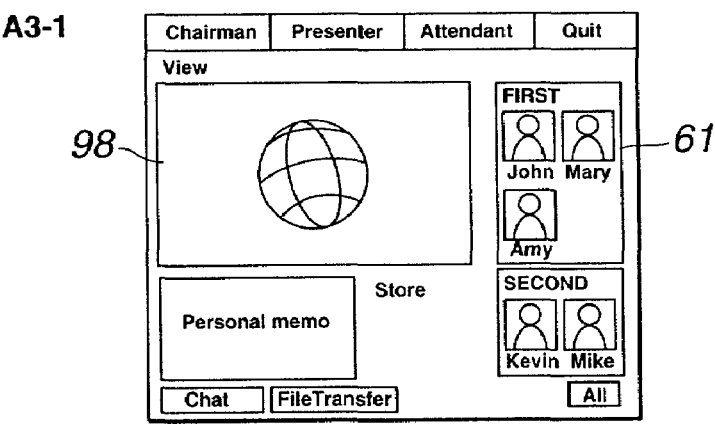
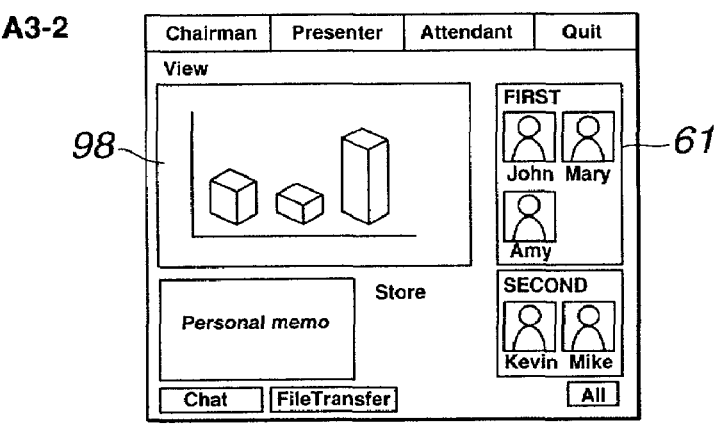
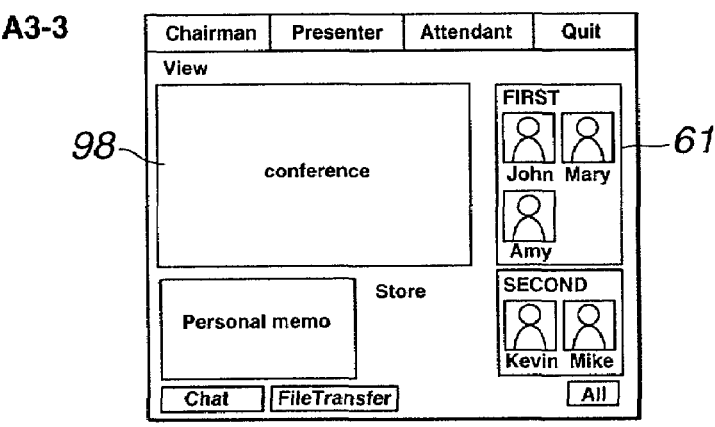
Attendant
FIG.29

Presenter

Attendant

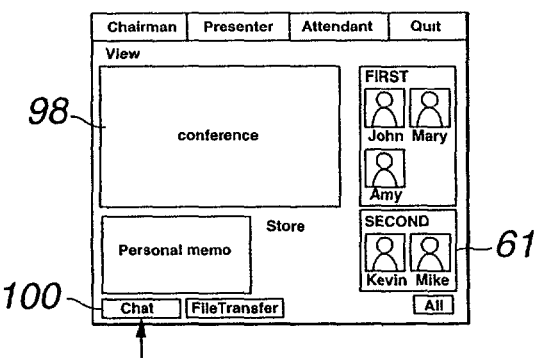
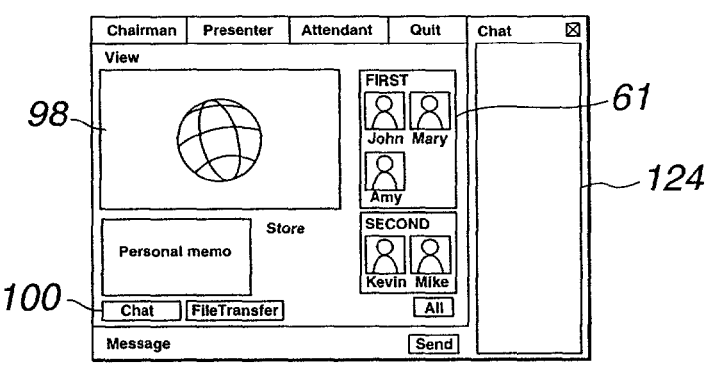
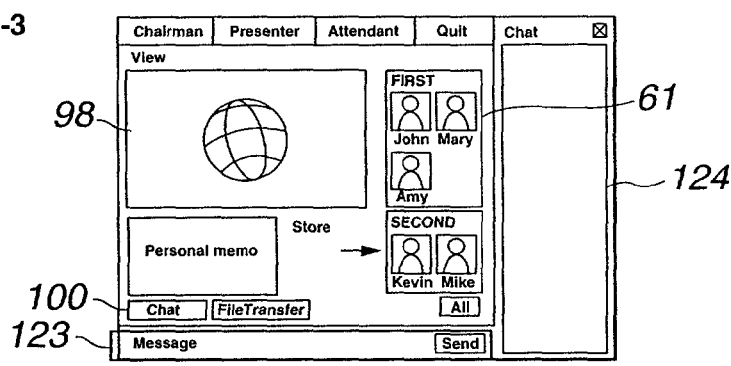
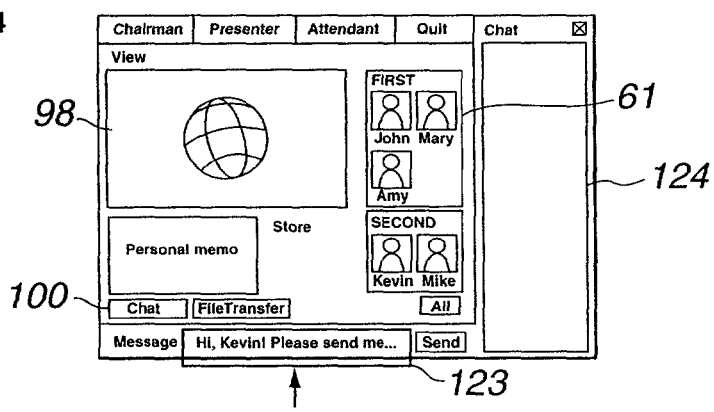
FIG. 35

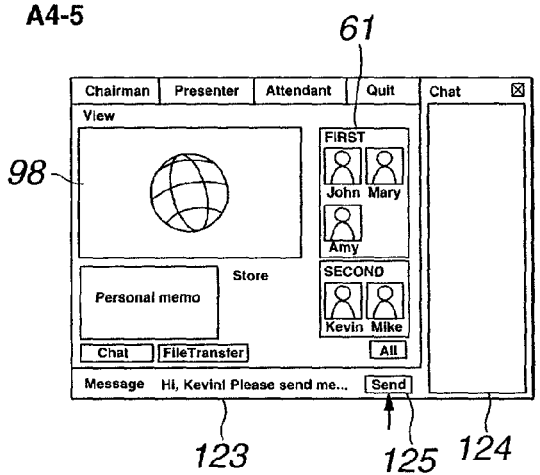
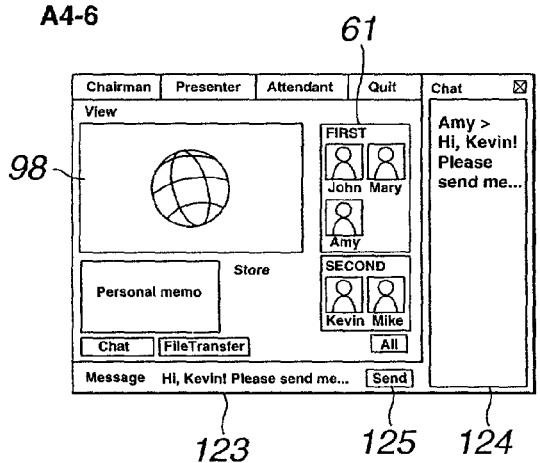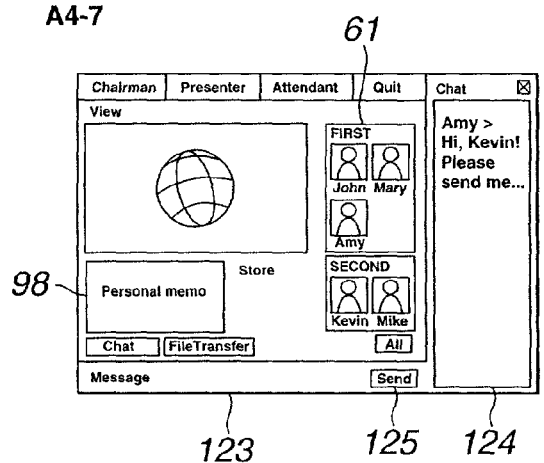
Attendant　　　　　　　　　　　Chairmen
　　　　　　　　　　　　　　　　Attendant
FIG.36

Attendant

A5-5

**A FILE IS TRANSFERRED
FROM KEVIN. SAVE ?**

YES    NO

A5-6

SAVE WITH A NEW NAME

| FILE NAME | | SAVE |
|---|---|---|
| TYPE OF FILE | | CANCEL |

Chairman
Attendant

FIG.39

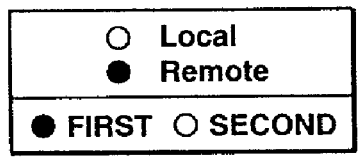
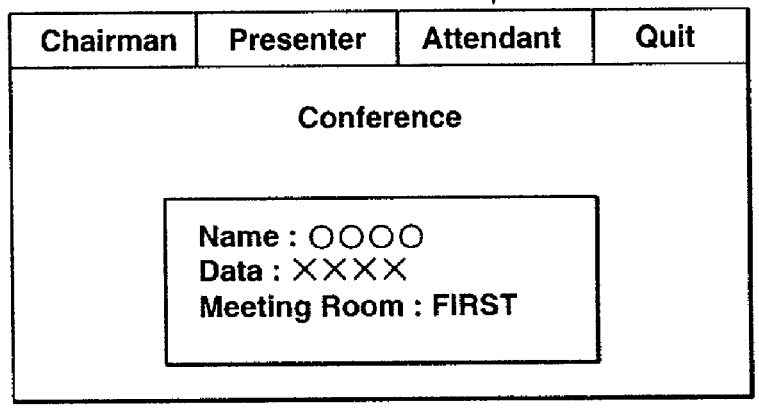
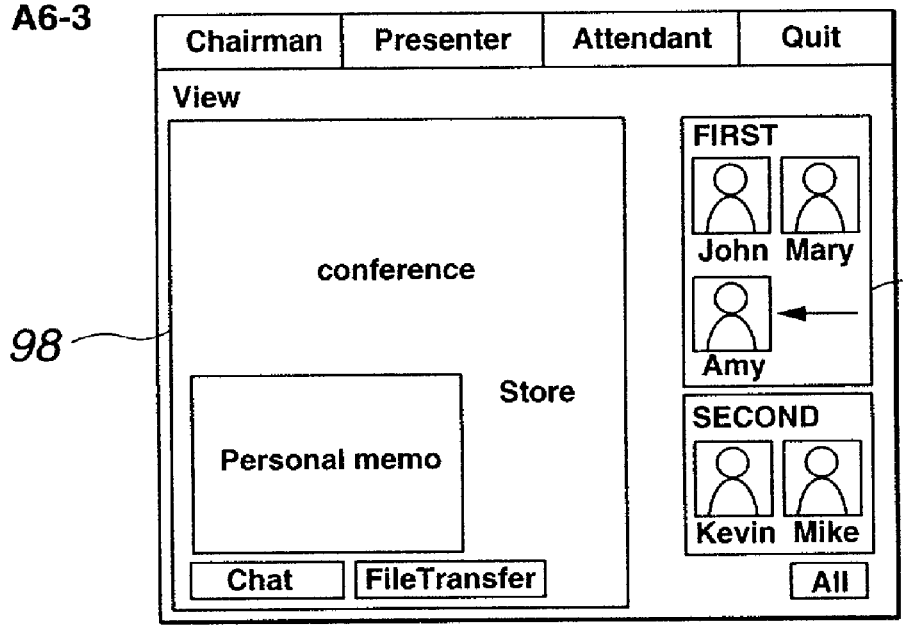
Attendant
FIG.43

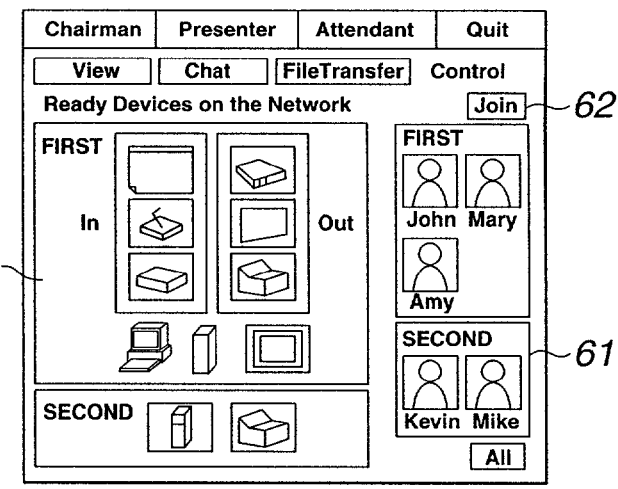
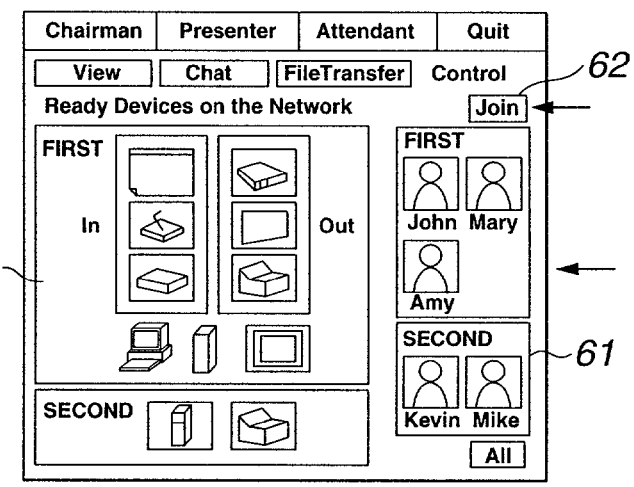
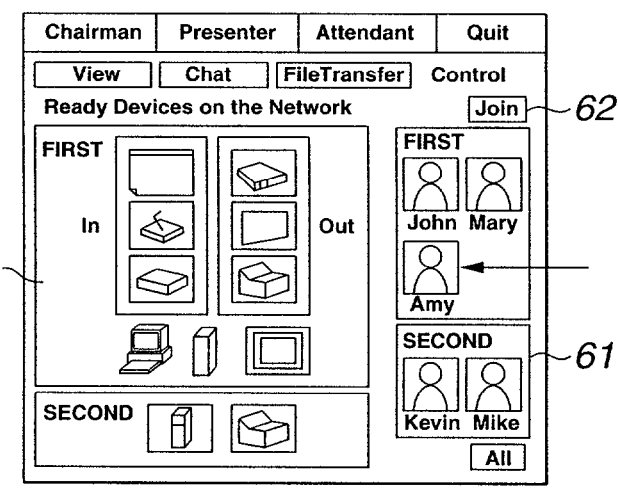
Chairman
FIG.44

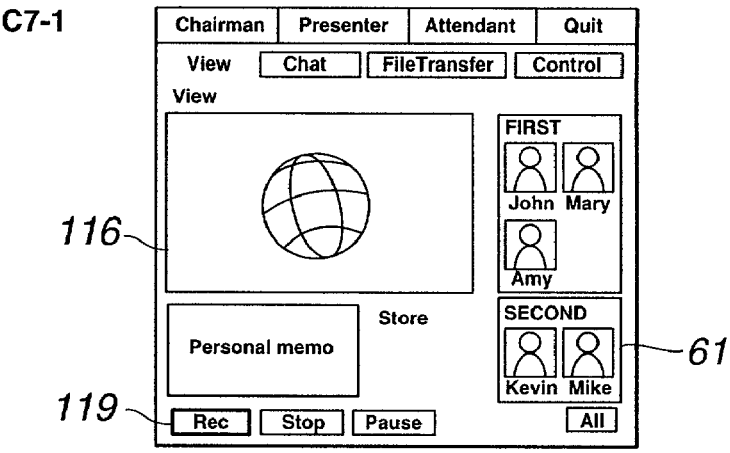
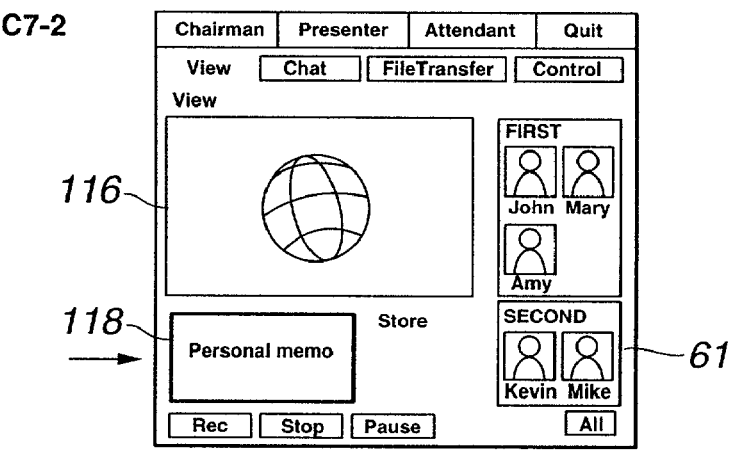
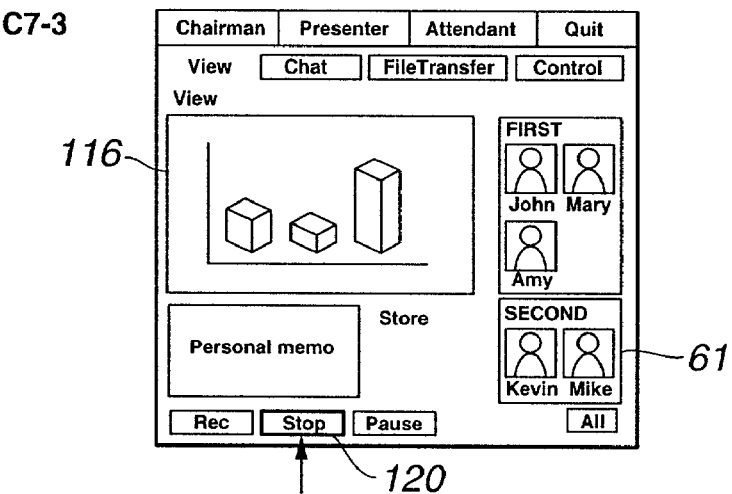
Chairman
FIG.46

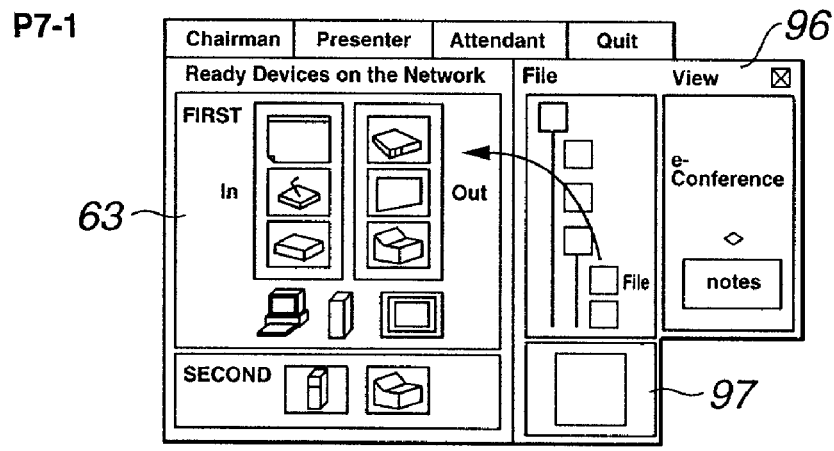
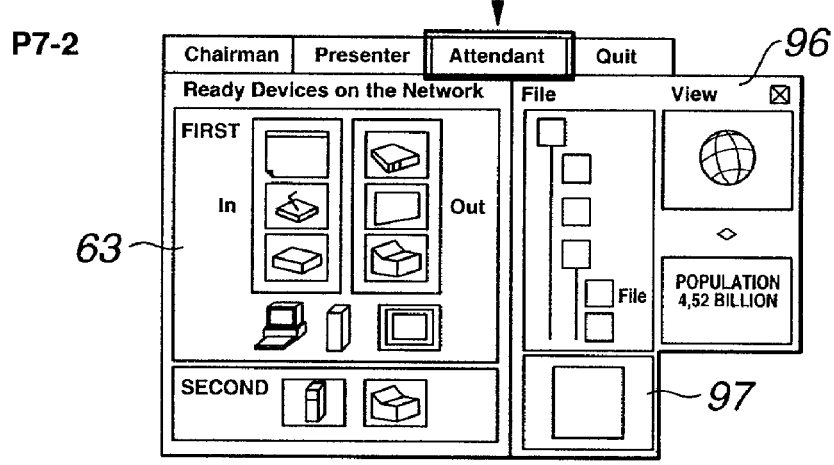
Presenter
FIG.48

NETWORK CONFERENCING SYSTEM, EQUIPMENT MANAGEMENT METHOD AND DATA PRESENTATION METHOD

CROSS-REFERENCE TO RELATED APPLICATIONS

This is a continuation of International Application PCT/JP01/03913, with an international filing date of May 10, 2001, which was not published under English under PCT Article 21(2).

TECHNICAL FIELD

This invention relates to a network conferencing system for connecting a plurality of electronic equipments and conferencing equipments via a network so that a conference is realized by attendants operating respective electronic equipments. This invention also relates to a network conferencing system and equipment management method, and a conference management server and equipment management method, adapted for managing an electronic equipment such as a projector device used for a conference. This invention also relates to a network conferencing system and data presentation method, and a conference management server and data presentation method, adapted for making presentation by a simple technique.

BACKGROUND ART

There has been known a conventional conferencing system in which a plurality of personal computers operated by users are connected via a network.

In this conferencing system, attendants at a conference with attendant terminals can browse the contents of presentation made by a presenter using a presenter terminal.

In the foregoing conferencing system, however, applications corresponding only to the attendant terminals and the presenter terminal exist as the provided applications despite the actual presence of the chairman, and no application is provided for carrying out the processing proper to the chairman.

Moreover, in the conventional conferencing system, it is desired to use not only a projector device but also various electronic equipments such as a teleconferencing system. However, the conventional conferencing system has no function to integrally manage electronic equipments used for a conference. It is often the case that individual personal computers and various electronic equipments are connected and individually managed. For example, the presenter terminal often carries out both presentation and management of various electronic equipments.

Thus, in view of the foregoing status of the art, it is an object of the present invention to provide a network conferencing system and equipment management method and a conference management server and equipment management method which enable integral management of various electronic equipments used for a conference in a network conferencing system made up of an attendant terminal, a presenter terminal and a chairman terminal.

Furthermore, for example, when a plurality of presenters alternately use the presenter terminal, the work to connect the presenter terminal with the projector device must be carries out by the presenters in turn and this is often troublesome to the presenters.

Thus, in view of the foregoing status of the art, it is an object of the present invention to provide a network conferencing system and data presentation method and a conference management server and data presentation method which enable simple presentation in a network conferencing system made up of an attendant terminal, a presenter terminal and a chairman terminal.

DISCLOSURE OF THE INVENTION

According to the present invention, there is provided a network conferencing system in which an output electronic equipment for presenting the contents of presentation, a generating electronic equipment for generating the contents of presentation to be presented by the output electronic equipment, a plurality of attendant electronic equipments operated by users attending a conference, and a conference management server connected with the output electronic equipment and the attendant electronic equipments so as to transmit and receive information to and from the output electronic equipment and the attendant electronic equipments, are connected via a communication network. In the network conferencing system, each of the attendant electronic equipments has an information input/output function for inputting and outputting information from and to the other attendant electronic equipments and the output electronic equipment via the communication network, a presentation function for presenting the contents of presentation by using the output electronic equipment, a presentation contents browsing function for browsing the contents of presentation presented by the presentation function of the other attendant electronic equipments using the output electronic equipment, an authentication function for carrying out authentication of attendance of the other attendant electronic equipments at a conference, an equipment management function for managing the state of each electronic equipment connected to the communication network, a display function for displaying, as icons, the other attendant electronic equipments with their attendance authenticated by the authentication function and the electronic equipment managed by the equipment management function, and a proceedings control function for obtaining information for preparing the proceedings by using the contents of presentation presented by the presentation function. In the network conferencing system, an area for icon display of the generating electronic equipment and an area for icon display of the output electronic equipment are separated, thus providing the icon display of the generating electronic equipment and the icon display of the output electronic equipment.

With such a network conferencing system, the output electronic equipment and the generating electronic equipment are managed by the equipment management function of the attendant electronic equipment, and the icon displays of the output electronic equipment and the generating electronic equipment are separately provided on each attendant electronic equipment.

According to the present invention, there is provided an equipment management method for a network conferencing system in which an output electronic equipment for presenting the contents of presentation, a generating electronic equipment for generating the contents of presentation to be presented by the output electronic equipment, a plurality of attendant electronic equipments, and a conference management server connected with the output electronic equipment and the attendant electronic equipments so as to transmit and receive information to and from the output electronic equipment and the attendant electronic equipments, are connected via a communication network, each of the attendant electronic equipments having an information input/output function for inputting and outputting information from and to the other attendant electronic equipments and the output electronic equipment via the communication network, a presentation function for presenting the contents of presentation by using the output electronic equipment, a presentation contents browsing function for browsing the contents of presentation presented by the presentation function of the other attendant electronic equipments using the output electronic equipment, an authentication function for carrying out authentication of attendance of the other attendant electronic equipments at a conference, an equipment management function for managing the state of each electronic equipment connected to the communication network, a display function for displaying, as icons, the other attendant electronic equipments with their attendance authenticated by the authentication function and the electronic equipment managed by the equipment management function, and a proceedings control function for obtaining information for preparing the proceedings by using the contents of presentation presented by the presentation function. In the equipment management method, when each of the attendant electronic equipments attends a conference, an area for icon display of the generating electronic equipment and an area for icon display of the output electronic equipment are separated, thus providing the icon display of the generating electronic equipment and the icon display of the output electronic equipment by the display function of the attendant electronic equipment.

With such a method, the output electronic equipment and the generating electronic equipment are managed by the equipment management function of the attendant electronic equipment, and the icon displays of the output electronic equipment and the generating electronic equipment are separately provided on each attendant electronic equipment.

According to the present invention, there is provided a conference management server connected with an output electronic equipment for presenting the contents of presentation, a generating electronic equipment for generating the contents of presentation to be presented by the output electronic equipment, and a plurality of attendant electronic equipments via a communication network, each of the attendant electronic equipments having an information input/output function for inputting and outputting information from and to the other attendant electronic equipments and the output electronic equipment via the communication network, a presentation function for presenting the contents of presentation by using the output electronic equipment, a presentation contents browsing function for browsing the contents of presentation presented by the presentation function of the other attendant electronic equipments using the output electronic equipment, an authentication function for carrying out authentication of attendance of the other attendant electronic equipments at a conference, an equipment management function for monitoring the electronic equipment connected with the communication network and managing the state of each electronic equipment, a display function for displaying, as icons, the other attendant electronic equipments with their attendance authenticated by the authentication function and the electronic equipment managed by the equipment management function, and a proceedings control function for obtaining information for preparing the proceedings by using the contents of presentation presented by the presentation function. The conference management server has: equipment management means for monitoring the operating states of the output electronic equipment and the generating electronic equipment and preparing an equipment information file showing the type of each equipment and the operating state of each equipment; equipment display information preparation means for preparing equipment display information which separately displays an area for icon display of the generating electronic equipment and an area for icon display of the output electronic equipment on the basis of the result of monitoring and the type from the equipment management means; and output means for transmitting the equipment display information prepared by the equipment display information preparation means to the attendant electronic equipment.

With such a conference management server, the output electronic equipment and the generating electronic equipment are managed by preparing the equipment management file, and the equipment display information for providing separate icon displays of the output electronic equipment and the generating electronic equipment on each attendant electronic equipment is prepared and outputted to each attendant electronic equipment.

According to the present invention, there is provided an equipment management method for a conference server connected with an output electronic equipment for presenting the contents of presentation, a generating electronic equipment for generating the contents of presentation to be presented by the output electronic equipment, and a plurality of attendant electronic equipments via a communication network, each of the attendant electronic equipments having an information input/output function for inputting and outputting information from and to the other attendant electronic equipments and the output electronic equipment via the communication network, a presentation function for presenting the contents of presentation by using the output electronic equipment, a presentation contents browsing function for browsing the contents of presentation presented by the presentation function of the other attendant electronic equipments using the output electronic equipment, an authentication function for carrying out authentication of attendance of the other attendant electronic equipments at a conference, an equipment management function for monitoring the electronic equipment connected with the communication network and managing the state of each electronic equipment, a display function for displaying, as icons, the other attendant electronic equipments with their attendance authenticated by the authentication function and the electronic equipment managed by the equipment management function, and a proceedings control function for obtaining information for preparing the proceedings by using the contents of presentation presented by the presentation function. The method includes the steps of: monitoring the operating states of the output electronic equipment and the generating electronic equipment; preparing an equipment information file showing the type of each equipment and the operating state of each equipment; preparing equipment display information which separately displays an area for icon display of the generating electronic equipment and an area for icon display of the output electronic equipment on the basis of the result of monitoring and the type; and transmitting the prepared equipment display information to the attendant electronic equipment.

With such a method, the output electronic equipment and the generating electronic equipment are managed by preparing the equipment management file, and the equipment display information for providing separate icon displays of the output electronic equipment and the generating electronic equipment on each attendant electronic equipment is prepared and outputted to each attendant electronic equipment.

According to the present invention, there is also provided a network conferencing system in which an output electronic equipment for presenting the contents of presentation, a generating electronic equipment for generating the contents of presentation to be presented by the output electronic equipment, a plurality of attendant electronic equipments operated by users attending a conference, and a conference management server connected with the output electronic equipment and the attendant electronic equipments so as to transmit and receive information to and from the output electronic equipment and the attendant electronic equipments, are connected via a communication network. In the network conferencing system, each of the attendant electronic equipments has an information input/output function for inputting and outputting information from and to the other attendant electronic equipments, the output electronic equipment and the generating electronic equipment via the communication network, a presentation function for presenting the contents of presentation by using the output electronic equipment, a presentation contents browsing function for browsing the contents of presentation presented by the presentation function of the other attendant electronic equipments using the output electronic equipment, an authentication function for carrying out authentication of attendance of the other attendant electronic equipments at a conference, an equipment management function for managing the state of each electronic equipment connected to the communication network, a display function for displaying, as icons, the other attendant electronic equipments with their attendance authenticated by the authentication function and the electronic equipment managed by the equipment management function, and a proceedings control function for carrying out control to prepare the proceedings by using the contents of presentation presented by the presentation function. In the network conferencing system, the presentation function is to select an icon display of the generating electronic equipment from the icon displays of the generating electronic equipments made by the display function in accordance with the operation by the user, then carry out control to display, by the display function, a list of the contents of material data generated by the generating electronic equipment corresponding to the selected icon display, then select the contents of material data displayed in the list by the display function, and carry out control to transfer the selected material data to the output electronic equipment or the attendant electronic equipment via the conference management server.

With such a network conferencing system, even in the case of presenting material data generated by the generating electronic equipment, presentation is made by the presentation function with the contents of material data displayed in a list and presented to the presenter.

According to the present invention, there is also provided a data presentation method for a network conferencing system in which an output electronic equipment for presenting the contents of presentation, a generating electronic equipment for generating the contents of presentation to be presented by the output electronic equipment, a plurality of attendant electronic equipments operated by users attending a conference, and a conference management server connected with the output electronic equipment and the attendant electronic equipments so as to transmit and receive information to and from the output electronic equipment and the attendant electronic equipments, are connected via a communication network, each of the attendant electronic equipments having an information input/output function for inputting and outputting information from and to the other attendant electronic equipments, the output electronic equipment and the generating electronic equipment via the communication network, a presentation function for presenting the contents of presentation by using the output electronic equipment and/or the other attendant electronic equipments, a presentation contents browsing function for browsing the contents of presentation presented by the presentation function of the other attendant electronic equipments using the output electronic equipment, an authentication function for carrying out authentication of attendance of the other attendant electronic equipments at a conference, an equipment management function for managing the state of each electronic equipment connected to the communication network, a display function for displaying, as icons, the other attendant electronic equipments with their attendance authenticated by the authentication function and the electronic equipment managed by the equipment management function, and a proceedings control function for carrying out control to prepare the proceedings by using the contents of presentation presented by the presentation function. The data presentation method includes the steps of: providing an icon display related to the generating electronic equipment by the display function; selecting the icon display of the generating electronic equipment in accordance with the operation by the user; displaying, by the display function, a list of the contents of material data generated by the generating electronic equipment corresponding to the selected icon display; selecting the material data displayed in the list by the display function; and transferring the selected material data to the output electronic equipment or the attendant electronic equipment via the conference management server.

With such a method, even in the case of presenting material data generated by the generating electronic equipment, the contents of material data is displayed in a list and presented to the presenter while the selected material data is outputted to the output electronic equipment and/or the attendant electronic equipment via the conference management server, thus making presentation.

According to the present invention, there is also provided a conference management server connected with an output electronic equipment for presenting the contents of presentation, a generating electronic equipment for generating the contents of presentation to be presented by the output electronic equipment, and a plurality of attendant electronic equipments via a communication network, each of the attendant electronic equipments having an information input/output function for inputting and outputting information from and to the other attendant electronic equipments, the output electronic equipment and the generating electronic equipment via the communication network, a presentation function for presenting the contents of presentation by using the output electronic equipment and/or the other attendant electronic equipments, a presentation contents browsing function for browsing the contents of presentation presented by the presentation function of the other attendant electronic using the output electronic equipment, an authentication function for carrying out authentication of attendance of the other attendant electronic equipments at a conference, an equipment management function for monitoring the electronic equipment connected with the communication network and managing the state of each electronic equipment, a display function for displaying, as icons, the other attendant electronic equipments with their attendance authenticated by the authentication function and the electronic equipment managed by the equipment management function, and a proceedings control function for obtaining information for preparing the proceedings by using the contents of presentation presented by the presentation function. The conference management server has: material data input means for inputting material data generated by the generating electronic equipment; data storage means for storing the material data inputted by the material data input means; output means for outputting the material data to the output electronic equipment or the attendant electronic equipment in accordance with a request from the attendant electronic equipment having the authority of a presenter terminal with the presentation function; and control means for carrying out control to cause the presenter terminal to display a list of the material data generated by the generating electronic equipment in accordance with a material presentation request for presenting the material data generated by the generating electronic equipment from the presenter terminal, and to transfer the material data selected in accordance with a material presentation request for selecting the material data displayed in the list, to the output electronic equipment or the attendant electronic equipment.

With such a conference management server, even in the case of presenting material data generated by the generating electronic equipment, the contents of material data is displayed in a list and presented to the presenter while the selected material data is outputted to the output electronic equipment and/or the attendant electronic equipment via the conference management server, thus making presentation.

According to the present invention, there is also provided a data presentation method for a conference management server connected with an output electronic equipment for presenting the contents of presentation, a generating electronic equipment for generating the contents of presentation to be presented by the output electronic equipment, and a plurality of attendant electronic equipments via a communication network, each of the attendant electronic equipments having an information input/output function for inputting and outputting information from and to the other attendant electronic equipments, the output electronic equipment and the generating electronic equipment via the communication network, a presentation function for presenting the contents of presentation by using the output electronic equipment and/or the other attendant electronic equipments, a presentation contents browsing function for browsing the contents of presentation presented by the presentation function of the other attendant electronic using the output electronic equipment, an authentication function for carrying out authentication of attendance of the other attendant electronic equipments at a conference, an equipment management function for monitoring the electronic equipment connected with the communication network and managing the state of each electronic equipment, a display function for displaying, as icons, the other attendant electronic equipments with their attendance authenticated by the authentication function and the electronic equipment managed by the equipment management function, and a proceedings control function for obtaining information for preparing the proceedings by using the contents of presentation presented by the presentation function. The data presentation method includes the steps of: inputting material data generated by the generating electronic equipment; storing the inputted presentation data and material data; causing the presenter terminal to display a list of the material data generated by the generating electronic equipment in accordance with a material presentation request for presenting the material data generated by the generating electronic equipment from the attendant electronic equipment having the authority of a presenter terminal with the presentation function; and transferring the material data selected in accordance with a material presentation request for selecting the material data displayed in the list, to the output electronic equipment or the attendant electronic equipment.

With such a method, even in the case of presenting material data generated by the generating electronic equipment, the contents of material data is displayed in a list and presented to the presenter while the selected material data is outputted to the output electronic equipment and/or the attendant electronic equipment via the conference management server, thus making presentation.

BRIEF DESCRIPTION OF THE DRAWINGS

FIGS. 4A and 4B are views for explaining an attendant icon display screen.

FIG. 5 is a view for explaining an available equipment display screen.

FIG. 8 is a view for explaining the structure of a proceedings log file prepared at a proceedings control section in the network conferencing system to which the present invention is applied.

FIG. 21 shows the display screen of the attendant terminal at the time of attending/leaving the conference in the network conferencing system to which the present invention is applied.

FIG. 22 shows the display screen of the presenter terminal at the time of attending/leaving the conference in the network conferencing system to which the present invention is applied.

FIG. 29 shows the display screen of the attendant terminal at the time of presentation in the network conferencing system to which the present invention is applied.

FIG. 35 shows the display screens of the attendant terminal and the chairman terminal at the time of chat in the network conferencing system to which the present invention is applied.

FIG. 36 shows the display screens of the attendant terminal and the chairman terminal at the time of chat in the network conferencing system to which the present invention is applied.

FIG. 39 shows the display screens of the attendant terminal and the chairman terminal at the time of file transfer in the network conferencing system to which the present invention is applied.

FIG. 43 shows the display screens of the attendant terminal and the presenter terminal at the time of user authentication in the network conferencing system to which the present invention is applied.

FIG. 44 shows the display screen of the chairman terminal at the time of user authentication in the network conferencing system to which the present invention is applied.

FIG. 46 shows the display screen of the chairman terminal at the time of controlling and preparing the proceedings in the network conferencing system to which the present invention is applied.

FIG. 48 shows the display screen of the presenter terminal at the time of controlling and preparing the proceedings in the network conferencing system to which the present invention is applied.

BEST MODE FOR CARRYING OUT THE INVENTION

A preferred embodiment of the present invention will now be described in detail with reference to the drawings.

Figure 1:
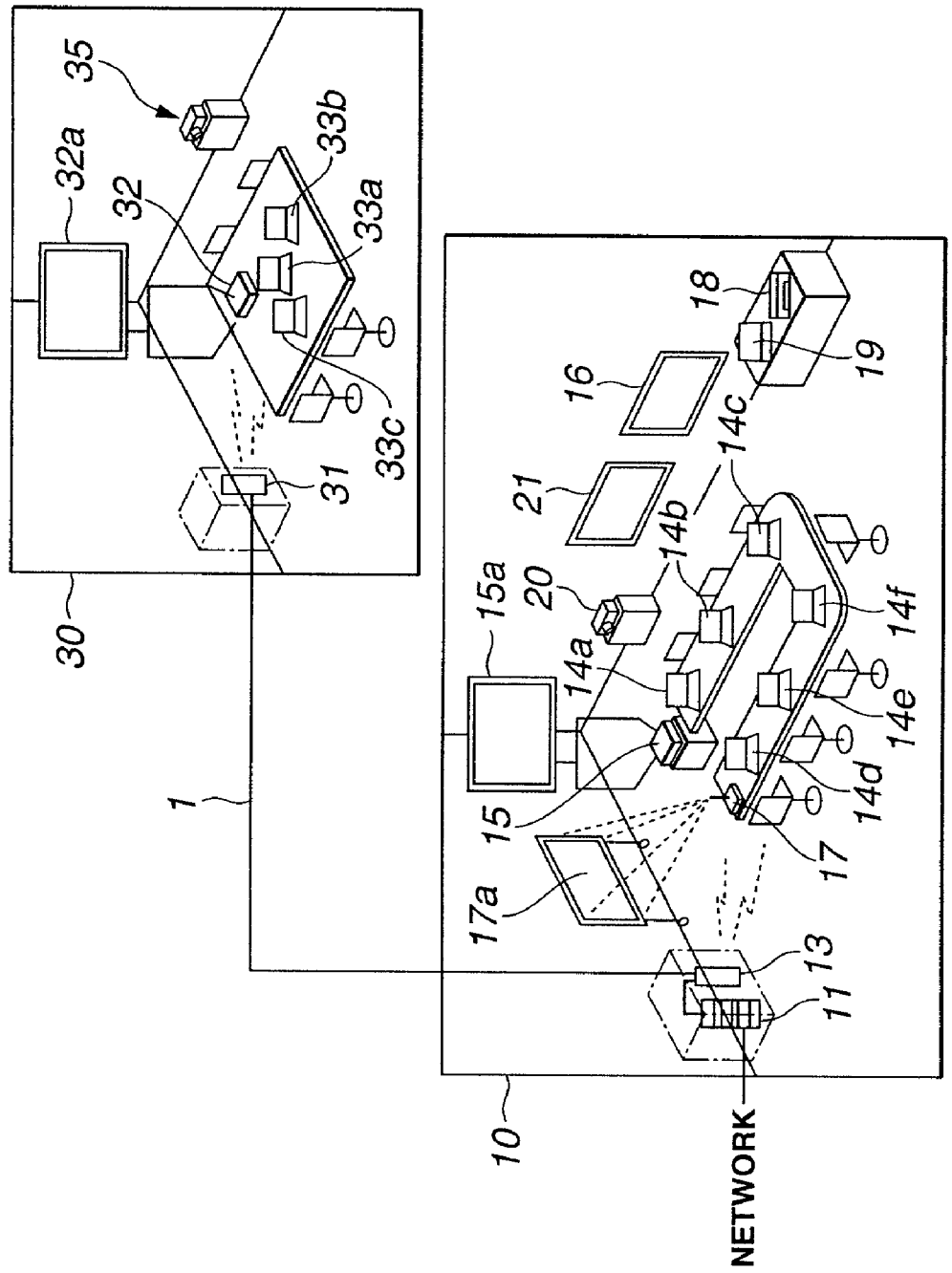
FIG. 1 is a schematic view showing a network conferencing system to which the present invention is applied.
Figure 2:
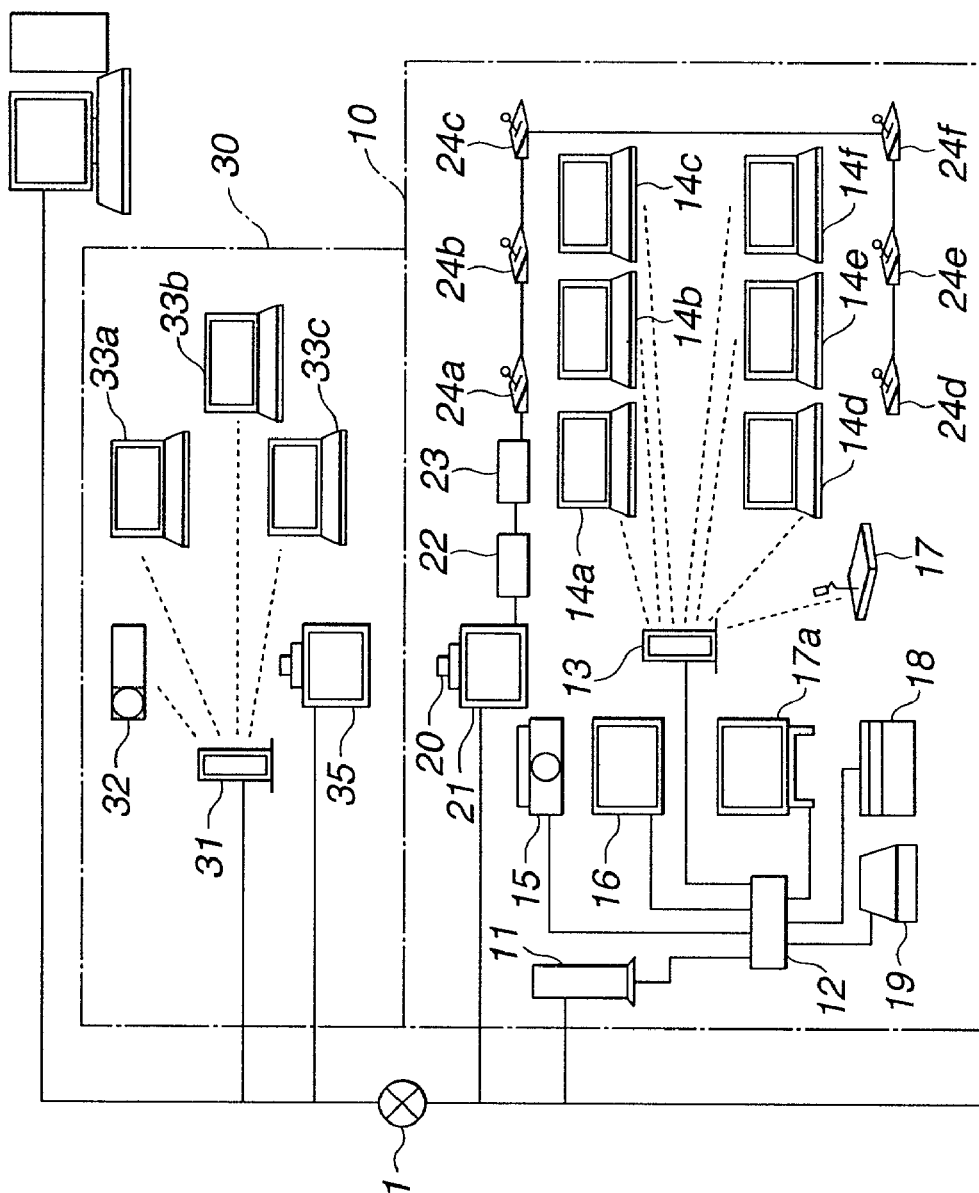
FIG. 2 is a structural view of the network conferencing system to which the present invention is applied.

The present invention is applied to a network conferencing system as shown in FIGS. 1 and 2.

This network conferencing system is constituted by a first conference room 10 and a second conference room 30. The first conference room 10 and the second conference room 30 are connected with each other via a communication network 1. In this network conferencing system, the first conference room 10 and the second conference room 30 are connected by the communication network 1 for transmitting data and various types of information via a communication channel in accordance with, for example, a wired LAN protocol (e.g., Ethernet).

In the network conferencing system, a plurality of client PCs operated by attendants at a conference are provided. The authority to be a chairman and the authority to be a presenter are given to any of the client PCs and the authority to be an attendant is given to the other client PCs, thus realizing a conference with the chairman, the presenter and the attendants. In the following description, the client PC having the authority to be the attendant is referred to an attendant terminal and the client PC having the authority to be the presenter is referred to as presenter terminal while the client PC having the authority to be the chairman is referred to as chairman terminal.

The first conference room 10 has a conference server 11 connecting to the second conference room 30 via the communication network 1, a hub 12 connecting the conference server 11 with various equipments within the first conference room 10, and a radio communication device 13 forming a radio network in the first conference room 10.

The conference server 11 has a communication function for transmitting/receiving images, sounds and characters to/from the various equipments included in the first conference room 10 and the second conference room 30, a proceedings preparation function for preparing the proceedings in which the contents of the conference are recorded, and an equipment management function for recognizing and controlling the various equipments included in the first conference room 10 and the second conference room 30.

The conference server 11 is connected with the various equipments included in the first conference room 10 via the hub 12, thereby transmitting/receiving information to/from the equipments included in the first conference room 10 and also transmitting/receiving information to/from the equipments included in the second conference room 30 via the communication network 1.

The hub 12 is connected to output equipments such as a projector device 15, a GUI (graphical user interface) display device 16, a whiteboard 17a and a printer device 18, and input equipments such as a 3D image input device 17 and a scanner device 19, included in the first conference room 10, and is also connected with the radio communication device 13.

The radio communication device 13 is connected with the hub 12 and is also connected with a client PC 14 operated by a user in the first conference room 10 who attends the conference by using the network conferencing system, via the radio network. The radio communication device 13 transmits/receives information to/from each client PC 14 in accordance with the radio communication protocol such as IEEE (The Institute of Electrical and Electronics Engineers) 802.11b.

The first conference room 10 also has client PCs (personal computers) 14a to 14f (hereinafter generally referred to as "client PC 14") which are connected with the radio communication device 13 via the radio network and are operated by attendants in the network conferencing system.

The client PC 14 is made up of, for example, an information portable terminal or a personal computer operated by the attendant at the conference. The client PC 14 has a pointing device such as a keyboard and a mouse operated by the user, and a display mechanism for displaying the contents of presentation and the like.

The client PC 14 is connected with the radio communication device 13 via the radio network and is connected with the various equipments in the first conference room 10 via the radio communication device 13. The client PC 14 is connected with the other client PCs 14, a client PC 33 in the second conference room 30 and the various equipments in the first conference room 10 and the second conference room 30 via the radio communication device 13.

The first conference room 10 has the projector device 15, the data display device 16 and the printer device 18 as the output equipments.

The projector device 15 has an internal optical system and projects a light emitted from an internal light source onto a display screen 15a. The projector device 15 is connected with the hub 12 via a cable or the like and is connected with the conference server 11 via the hub 12. The projector device 15 receives presentation data from the presenter terminal via the conference server 11 and the hub 12 and operates to project the contents of presentation onto the display screen 15a.

The data display device 16 is made up of, for example, PDP (plasma display panel) and presents various contents to the conference attendants in the first conference room 10. The data display device 16 is connected with the hub 12 via a cable or the like and is connected with the conference server 11 via the hub 12, thus displaying the display screen of the chairman terminal and various contents.

The printer device 18 has a print mechanism for printing onto a print medium such as a print sheet. The printer device 18 is connected with the hub 12 via a cable or the like and is connected with the various equipments in the first conference room 10 via the hub 12. The printer device 18 carries out print processing in accordance with material data to be printed, for example, from the conference server 11, and outputs a print medium on which printing is made.

The first conference room 10 also has the 3D image input device 17, the whiteboard 17a and the scanner device 19 as the input equipments. The scanner device 19 has, for example, an optical reading mechanism and is connected with the hub 12 via a cable or the like. The scanner device 19 is operated by the conference attendant and outputs static image data thus read out to the conference server 11 via the hub 12.

The 3D image input device 17 is connected with the radio communication device 13 via the radio network and is connected with the various equipments in the first conference room 10 via the radio communication device 13. The 3D image input device 17 has a camera mechanism having an IEEE 1394 interface and a stand, and has a function to transmit static image data picked up by the camera mechanism to the conference server 11.

The whiteboard 17a is adapted so that various contents are written thereon by the attendants and has a function to scan the contents and output the scanned data to the conference server 11 via the cable.

The first conference room 10 also has a teleconferencing system which is made up of a camera device 20, a teleconference monitor device 21, a camera control unit 22, an audio controller 23 and a plurality of microphone devices 24a to 24f (hereinafter generally referred to as "microphone device 24"). In the teleconferencing system, sounds and images in the first conference room 10 are obtained to notify the second conference room 30 of the status of the first conference room 10. The image data obtained by the teleconferencing system is captured by the conference server 11.

The camera device 20 is used, for example, for a teleconference. The camera device 20 images the presenter presenting in the first conference room 10 and the scene in the first conference room 10, thus generating image data. The camera device 20 is connected with the communication network via a cable and outputs the image data to a teleconferencing system 35 of the second conference room 30 and the conference server 11.

The camera control unit 22 is made up of a controller for controlling adjustment of the imaging direction and zoom of the camera device 20. The camera control unit 22 controls the camera device 20 in accordance with commands from the client PC 14 in the first conference room 10 and the client PC 33 in the second conference room 30 via the communication network 1.

The teleconference monitor device 21 is made up of a display device and is connected with the camera device 20 to display images picked up by a camera device 35a in the second conference room 30.

The microphone devices 24 are made up of the microphone devices 24a to 24f corresponding to the client PCs 14a to 14f. The microphone device 24 detects the voice and sound from each attendant, then generates audio data and supplies the audio data to the audio controller 23.

The audio controller 23 has a function to adjust the audio data from the microphone device 24. The audio controller 23 may be set to detect only the voice and sound from the presenter or may be set to detect the voice and sound from the other attendants as well as the presenter.

The second conference room 30 has the teleconferencing system 35 constituted by a radio communication device 31, a portable projector device 32, client PCs 33a to 33c (hereinafter generally referred to as "PC 33"), a camera device 35a and a teleconference monitor 35b.

The radio communication device 31 is connected with the communication network 1 and is also connected with the client PC 33 operated by the user in the second conference room 30 who attends the conference by using the network conferencing system, via the radio network. The radio communication device 31 transmits/receives information to each client PC 33 in accordance with the radio communication protocol such as IEEE (The Institute of Electrical and Electronics Engineers) 802.11b.

The portable projector device 32 has an internal optical system and projects a light emitted from an internal light source onto a display screen 32a. The portable projector device 32 is connected with the radio communication device 31 via the radio network and is connected with the various equipments in the first conference room 10 and the second conference room 30 via the radio communication device 31. The portable projector device 32 is supplied with presentation data from the presenter terminal via the communication network 1 and the radio communication device 31 and operates to project the contents of presentation onto the display screen 32a.

The client PCs 33a to 33c (hereinafter generally referred to as "client PC 33") are connected with the radio communication device 31 via the radio network and are operated by the attendants in the second conference room 30.

The client PC 33 is made up of, for example, an information portable terminal or a personal computer and is operated by the attendant at the conference. The client PC 33 has a pointing device such as a keyboard and a mouse operated by the user, and a display mechanism for displaying the contents of presentation.

The teleconferencing system 35 images the status of the second conference room 30 by the camera device 35a and transmits the image data to the first conference room 10. The teleconferencing system 35 also displays images based on the image data from the camera device 20 of the first conference room 10, by the teleconference monitor 35b.

Figure 3:
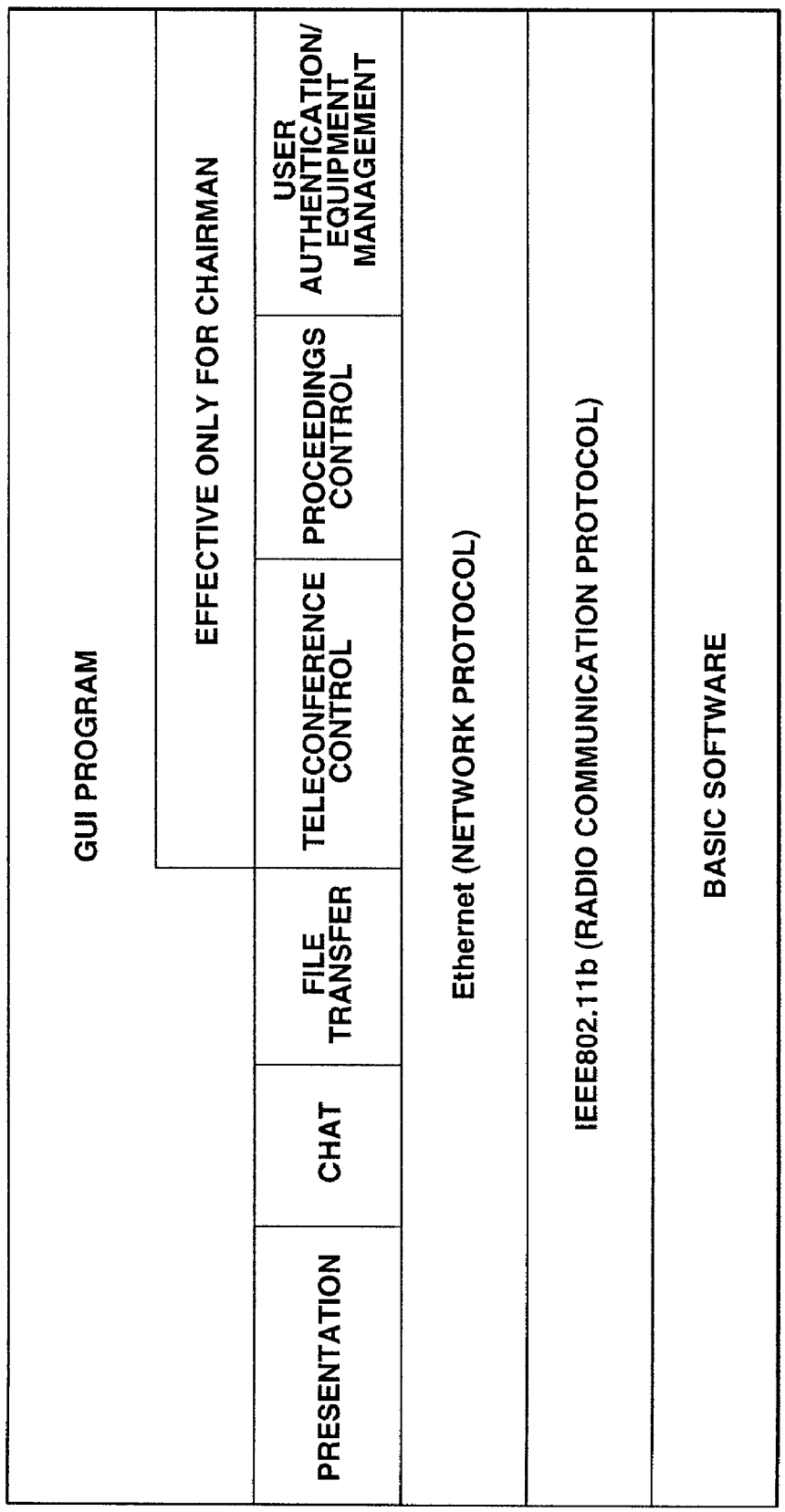
FIG. 3 is a view for explaining the software environment of a client PC.

The client PCs 14 provided in the first conference room 10 and the client PCs 33 provided in the second conference room 30 (hereinafter generally referred to as "client PC") have a software environment as shown in FIG. 3.

In FIG. 3, each client PC has stored therein basic software, a radio communication protocol such as IEEE 802.11b, a network protocol for transmitting/receiving information via the communication network 1, a conference program for participating in the network conferencing system, and a GUI program for attending the conference and display various contents.

The conference program includes a presentation program for making presentation, as a program available to the presenter at the conference.

The conference program also includes a chat program for transmitting/receiving real-time messages between the client PCs and a file transfer program for transferring files between the client PCs, as programs available at the presenter terminal, the attendant terminal or the chairman terminal.

The conference program further includes a teleconference control program for having a teleconference using the teleconferencing system, a proceedings control program for controlling the conference server 11 to control preparation of a proceedings file, and a user authentication/equipment management program for managing the client PCs and the various equipments using the network conferencing system, as programs available only at the chairman terminal.

The GUI program is adapted for displaying various contents by the display mechanism of the client PC in accordance with the program used by the client PC. Specifically, when the client PC has the authority as the presenter and is using the presentation program, the GUI program displays a GUI screen for carrying out presentation. When the client PC has the authority as the chairman, the GUI program displays GUI screens corresponding to the teleconference control program, the proceedings control program and the user authentication/equipment management program.

The chairman terminal executes the user authentication/equipment management program, thereby providing an attendant icon display 61 in which the attendants operating the other client PCs are displayed as icons, as shown in FIG. 4.

To display the user-authenticated conference attendants, attendant icon display screens 61a, 61b are displayed for the first conference room 10 and the second conference room 30, respectively, as shown in FIG. 4A. In this case, the chairman terminal displays the images and names of the attendants to make the conference attendants visually recognizable to the chairman. In response to the selection of any of the images of the attendants, the chairman terminal displays information of the selected attendant as shown in FIG. 4B.

The chairman terminal provides a shaded display 61c for the icon display of a client PC which is not user-authenticated but is included in the network conferencing system, and provides a normal display 61d for the icon display of a user-authenticated client PC.

The chairman terminal also displays a join button (Join) 62 for deciding whether to carry out user authentication or not. When the attendant icon display is selected by the user and the join button 62 is selected, the chairman terminal provides attendance permission to the client PC corresponding to the attendant icon display.

Moreover, the chairman terminal executes the user authentication/equipment management program, thereby displaying an available equipment display 63 showing the various equipments constituting the network conferencing system, as shown in FIG. 5. The chairman terminal displays equipment icon display screens 63a, 63b for the first conference room 10 and the second conference room 30, respectively. In this case, the chairman terminal displays the images representing the individual equipments as icons.

In FIG. 5, for the client PC, icons corresponding to the whiteboard 17a, the 3D image input device 17 and the scanner device 19 are displayed as an input equipment display (IN) 64, and icons corresponding to the projector device 15, the data display device 16 and the printer device 18 are displayed as an output equipment display (OUT) 65. The teleconferencing system, the conference server 11 and the client PC itself, present in the first conference room 10, are also displayed as icons.

Moreover, the equipments such as the portable projector device 32 and the printer device 18, present in the second conference room 30 and connected with the communication network 1, are displayed as icons.

Figure 6:
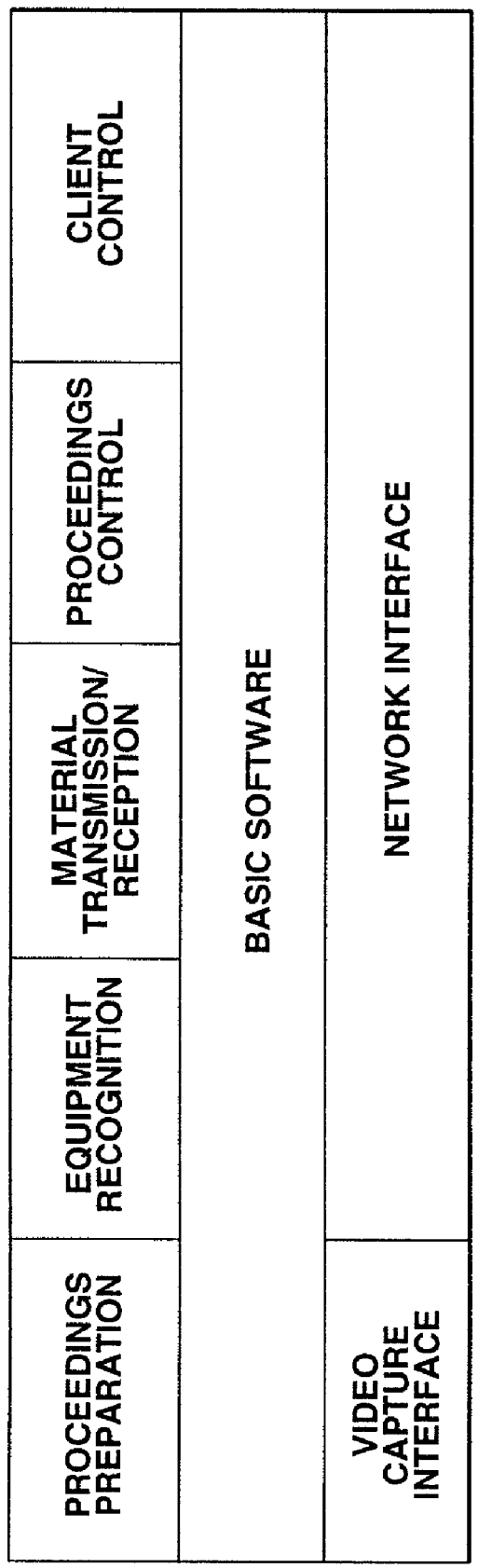
FIG. 6 is a view for explaining the software environment of a conference server in the network conferencing system to which the present invention is applied.

The conference server 11 has a software environment as shown in FIG. 6. In FIG. 6, the conference server 11 has stored therein a network interface program for connecting to a network such as the Internet which is outside the communication network 1, a video capture interface program, basic software, a proceedings preparation program, an equipment recognition program, a material transmission/reception program, a proceedings control program and a client control program.

The conference server 11 executes the network interface program, thereby carrying out communication with an external network such as the Internet.

The conference server 11 executes the video capture interface program, thereby capturing image data generated by the teleconferencing system and transmitted/received between the first conference room 10 and the second conference room 30 and then preparing static image data used for preparing the proceedings. The conference server 11 also holds images and sounds picked up by the teleconferencing system, as a proceedings file.

The conference server 11 executes the equipment recognition program, thereby recognizing the various equipments existing in the network conferencing system and then registering the various equipments to an internal equipment list file.

The conference server 11 executes the proceedings preparation program, thereby preparing and editing the proceedings data along the time base with the static image data related to the contents of presentation, the memorandum data prepared by the chairman terminal, and the static image data or dynamic image data obtained and captured by the teleconferencing system.

The conference server 11 executes the material transmission/reception program, thereby receiving and saving static image data from the various equipments existing in the network conferencing system. The conference server 11 also executes the material transmission/reception program, thereby carrying out the processing to output and display various data on the printer device 18 and the data display device 16 in accordance with the protocol (Jet Send) defined among the projector device 15, the printer device 18, the scanner device 19, the whiteboard 17a and the data display device 16.

The conference server 11 executes the client control program, thereby controlling the client PCs included in the network conferencing system and also controlling the communication including chat and file transfer between the client PCs.

Figure 7:
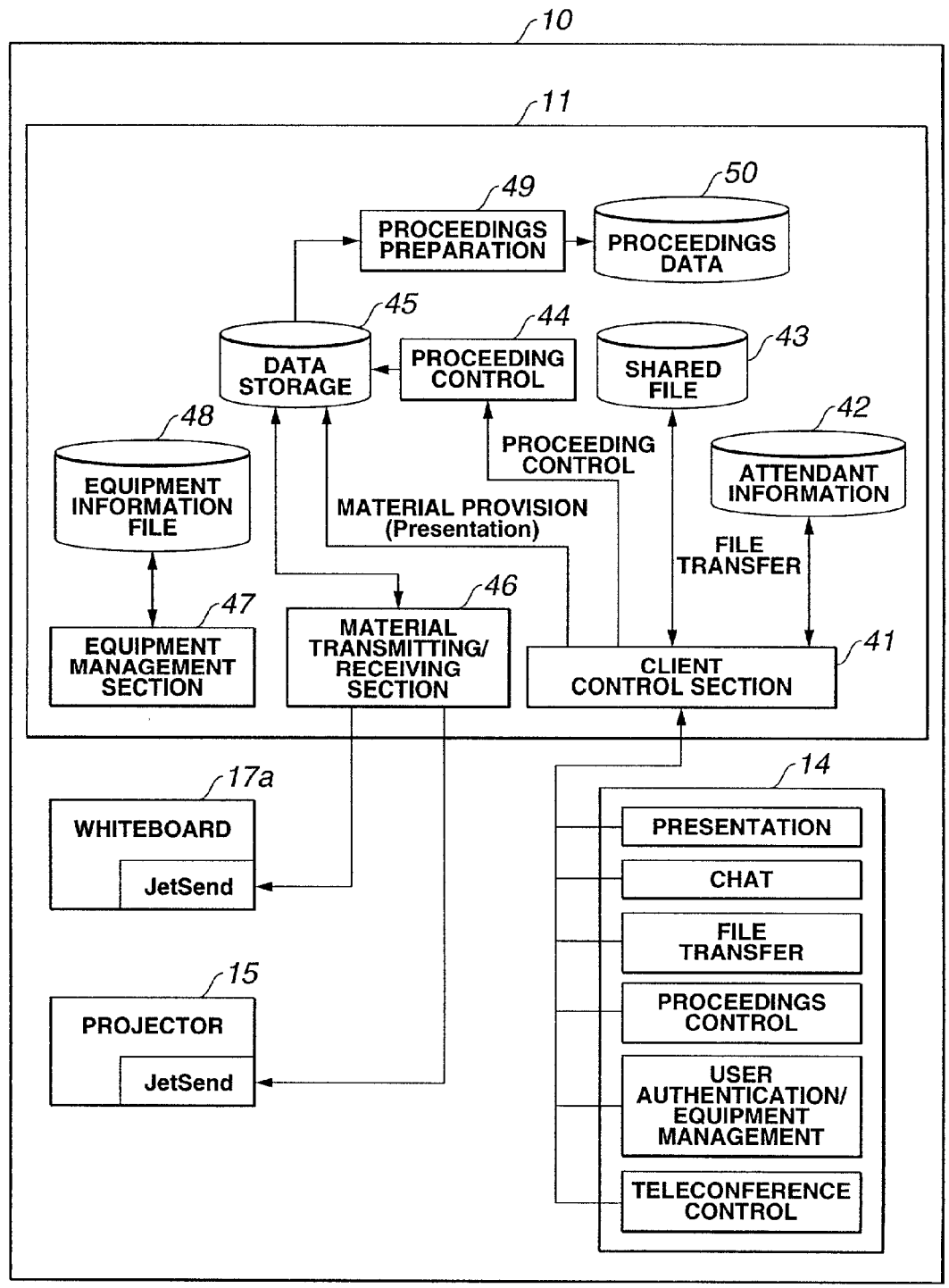
FIG. 7 is a block diagram showing the structure of a conference server in a first conference room in the network conferencing system to which the present invention is applied.

The conference server 11 having these functions has a structure as shown in FIG. 7. In this case, the conference server 11 executes the respective functions on the basis of the basic software for server, and the client PC executes the respective functions on the basis of the basic software for individual user. The whiteboard 17a has a function to transmit the contents written therein by the attendants to the conference server 11 in accordance with the data transmission protocol (for example, Jet Send protocol).

The client PC has the presentation program, chat program, file transfer program, proceedings control program, user authentication/equipment management program and teleconference control program as described above.

The conference server 11 has a client control section 41 for carrying out communication with the client PC having the various programs, an attendant information storage section 42, a shared file storage section 43, a proceedings control section 44 for executing the proceedings control program, a data storage section 45, a material transmitting/receiving section 46 for executing the material transmission/reception program, an equipment management section 47 for executing the equipment recognition program, an information file storage section 48, a proceedings preparation section 49 for executing the proceedings preparation program, and a proceedings data storage section 50.

The client control section 41 is connected with the plurality of client PCs 14 in the first conference room 10 and manages various information, requests and various data in user authentication, chat, file transfer and teleconference control. For the processing other than user authentication, chat, file transfer and teleconference control, the client control section 41 relays various information and data and carries out input/output processing from/to each section constituting the conference server 11.

During the presentation, the client control section 41 receives presentation data from the presenter terminal and records the presentation data into the data storage section 45. During the conference, the client control section 41 carries out the processing to store memorandum data from the chairman terminal into the data storage section 45.

When the chairman terminal carries out user authentication, the client control section 41 transfers information about the conference attendance permission from the chairman terminal to the other client PCs, then prepares an attendant information file and stores it into the attendant information storage section 42. The client control section 41 receives personal data indicating the name, mail address and IP address of the attendants operating the respective client PCs, then prepares the attendant information file including the information of a plurality of individuals and stores it into the attendant information storage section 42.

When chatting, the client control section 41 transfers chat data transmitted from the client PC to the other client PCs.

When carrying out file transfer, the client control section 41 carries out the processing to receive a file from the client PC of the file sender and store the file into the shared file storage section 43, and notifies the client PC at the file transfer destination of the occurrence of the file transfer. In response to a file transfer request from the file sender, the client control section 41 carries out the processing to read out the file stored in the shared file storage section 43 and transmit the file to the file sender.

The proceedings control section 44 prepares a proceedings log file as shown in FIG. 8 using the various information from the client control section 41. The proceedings control section 44 prepares the proceedings log file at every predetermined time and synchronizes the data related to the contents of presentation, the data used at the time of presentation, the memorandum data, the captured data and various information.

In the proceedings control section 44, conference management information for managing each conference, attendant management information for managing the attendants at the conference, presentation data management information for managing presentation data used for presentation, material management information for managing materials which are used, and memorandum management information for managing the memorandum data prepared by the chairman terminal are stored. The proceedings control section 44 causes the presentation data management information, the material management information and the memorandum data management information to correspond to time information, thus preparing the proceedings log file.

The proceedings control section 44 uses, for example, information indicating the subject, the date of the conference and the name of the conference room, as the conference management information.

The proceedings control section 44 uses, for example, the name of the user operating the chairman terminal, the name of the user operating the presenter terminal and the name of the user operating the attendant terminal, as the attendant management information.

The proceedings control section 44 uses, for example, the file name of static image data captured by the teleconferencing system, the file name of material data outputted to the output equipment, and the file name of material data inputted from the input equipment such as the file name of material data inputted from the second conference room 30, as the material management information. The proceedings control section 44 prepares the proceedings log file in which the various file names are caused to correspond to time information indicating the time of presentation to the attendants or the time of input to the client PC.

Moreover, the proceedings control section 44 uses, for example, the file name of the presentation data outputted from the projector device 15, as the presentation data management information. The proceedings control section 44 prepares the proceedings log file in which the file name of the presentation data is caused to correspond to time information indicating the time when the contents related to the presentation data are presented to the projector device 15.

The proceedings control section 44 uses the contents of the memorandum data generated by the chairman terminal, as the memorandum management information. The proceedings control section 44 prepares the proceedings log file in which the contents of the memorandum is caused to correspond to time information indicating the time when the memorandum data is transmitted from the chairman terminal to the client control section 41.

When preparing the proceedings log file, the proceedings control section 44 discriminates the conference management information, attendant management information, presentation data management information, material management information and memorandum management information, by type.

The material transmitting/receiving section 46 is connected with the projector device 15 and the whiteboard 17a via the hub 12 and controls the projector device 15 and the whiteboard 17a. The material transmitting/receiving section 46 transmits the presentation data and the material data in accordance with the same data transmission protocol (for example, Jet Send protocol) as the projector device 15 and the whiteboard 17a.

When causing the projector device 15 to display the contents of presentation on the display screen 15a, the material transmitting/receiving section 46 reads out the presentation data stored in the data storage section 45 and outputs the presentation data to the projector device 15.

When displaying or printing materials by the data display device 16 or the printer device 18, the material transmitting/receiving section 46 reads out the material data from the data storage section 45 and outputs the material data.

The material transmitting/receiving section 46 controls the whiteboard 17a to carry out the processing to read the contents written on the whiteboard 17a by the user, at every predetermined time interval, and then receives the contents written on the whiteboard 17a and stores it into the data storage section 45.

The equipment management section 47 recognizes the client PCs and the various equipments included in the network conference system, then prepares an equipment information file which files the equipment information related to each equipment, and stores the equipment information file into the equipment information file storage section 48. The equipment management section 47 obtains, for example, the equipment name, machine type and IP address, as the equipment information related to each equipment, thus preparing the equipment information file. The equipment information file is referred to by the client control section 41 and is transferred to each client PC. Thus, each client PC recognizes each equipment included in the network conferencing system.

In the data storage section 45, the proceedings log file including the proceedings data of each conference prepared by the proceedings control section 44 is stored, and the proceedings log file is read out by the processing preparation section 49 when preparing the proceedings data.

In the data storage section 45, the presentation file including the presentation data is stored, and the presentation data from the presenter terminal is inputted via the presenter terminal and is added to the presentation file. The presentation file in the data storage section 45 is read out by the proceedings preparation section 49 when making presentation or when preparing the proceedings data.

Moreover, in the data storage section 45, the material file including the material data obtained by the scanner device 19 and the whiteboard 17a is stored, and the static image data is inputted via the material transmitting/receiving section 46 and is added to the material file. The material file in the data storage section 45 is read out at the time of preparing the proceedings data or at the time of presenting the materials.

Furthermore, in the data storage section 45, a proceedings video file including static image data or dynamic image data obtained and captured by the teleconferencing system is stored, and the captured video data and audio data are inputted via the material transmitting/receiving section 46 and are added to the proceedings video file. The proceedings video file in the data storage section 45 is read out at the time of presenting the materials or at the time of preparing the proceedings.

The proceedings preparation section 49 analyzes the proceedings log file prepared by the proceedings control section 44, then prepares the proceedings data by editing the presentation data, material data, static image data or dynamic image data, audio data and memorandum data in the mode along the time base, and stores the proceedings data into the proceedings data storage section 50.

Figure 9:
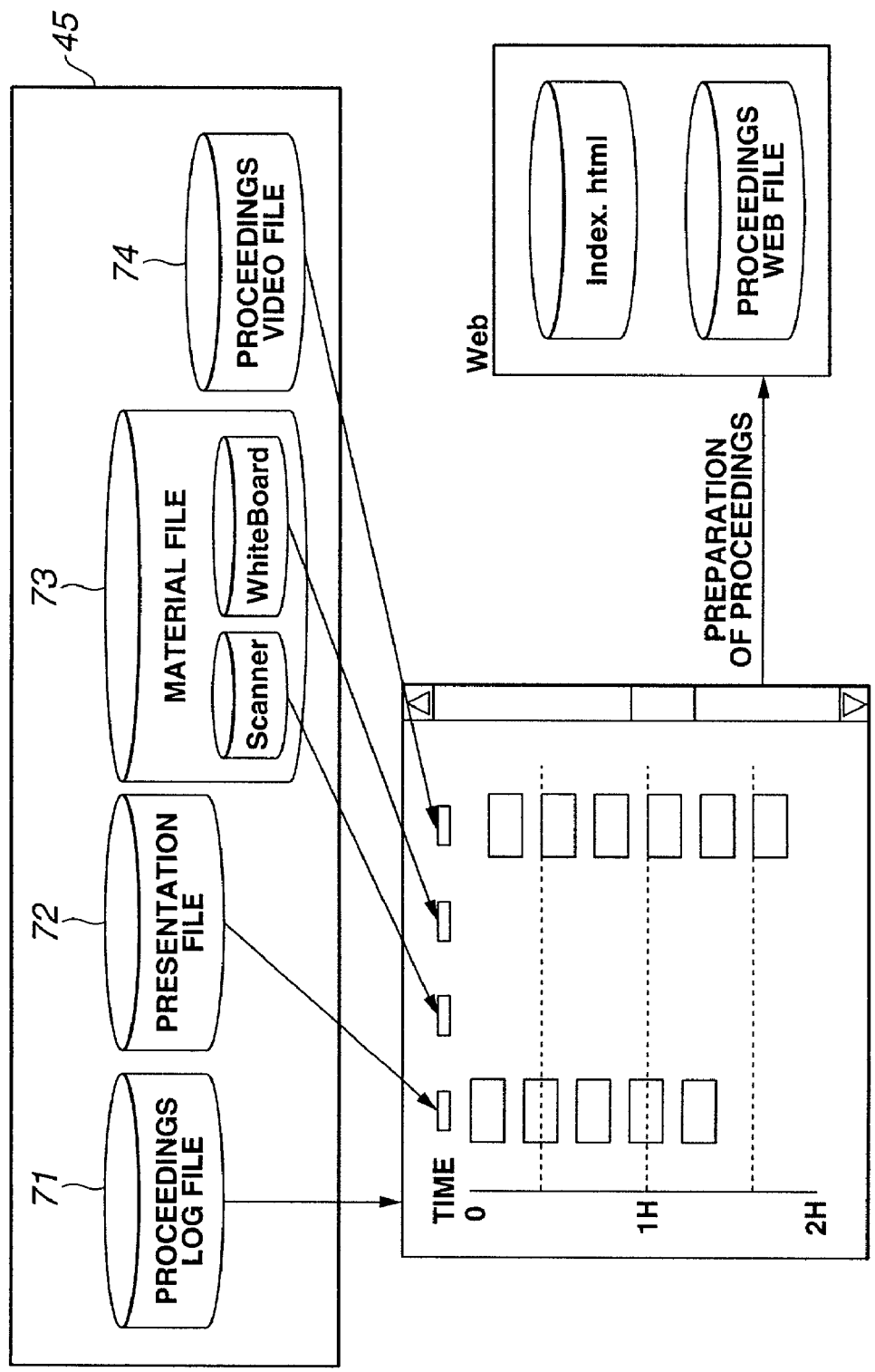
FIG. 9 is a view for explaining the processing to prepare proceedings data at the proceedings preparation section in the network conferencing system to which the present invention is applied.

In this case, the proceedings preparation section 49 reads out a proceedings log file 71, a presentation file (PPT file) 72, a material file 73 storing the materials displayed on the scanner device 19 and the whiteboard 17*a*, and a proceedings video file 74 picked up by the teleconferencing system, then recognizes the association of the respective data on the basis of the contents of the proceedings log file 71, and displays the data on the same time base, as shown in FIG. 9. The proceedings preparation section 49 prepares the proceedings data in which the various data are synchronized in accordance with the time base, for each proceedings log file.

Figure 10:
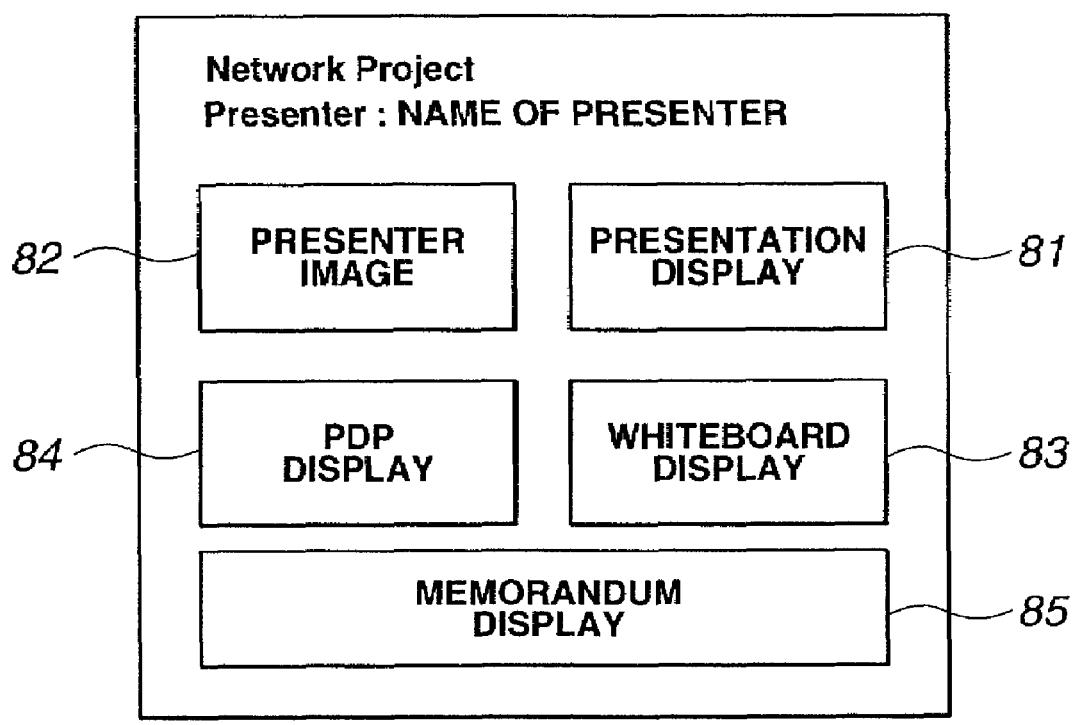
FIG. 10 shows an exemplary display screen when displaying the proceedings data in the network conferencing system to which the present invention is applied.

The proceedings preparation section 49 prepares proceedings data of a different display mode when allowing browse by the other equipments. The proceedings preparation section 49 prepares proceedings data (proceedings web file) such that the contents of the conference are displayed along the time base in divided display areas obtained by dividing one screen, such as the name of conference, the name of presenter, a presentation data display area 81, a presenter video display area 82, a display area 83 for the whiteboard 17*a*, a display area 84 for displaying the contents displayed by the data display device 16, and a memorandum display area 85, as shown in FIG. 10.

The proceedings preparation section 49 also prepares proceedings data of a form (Index.html) such that static image files of the contents of presentation, the image of the presenter, the display contents of the whiteboard 17*a* and the memorandum data are displayed as thumbnails to allow the browsing user to visually recognize the outline of the conference.

The display screen corresponding to the authority in the case where a conference is held with a plurality of client PCs in the above-described network conferencing system will now be described.

Figure 11:
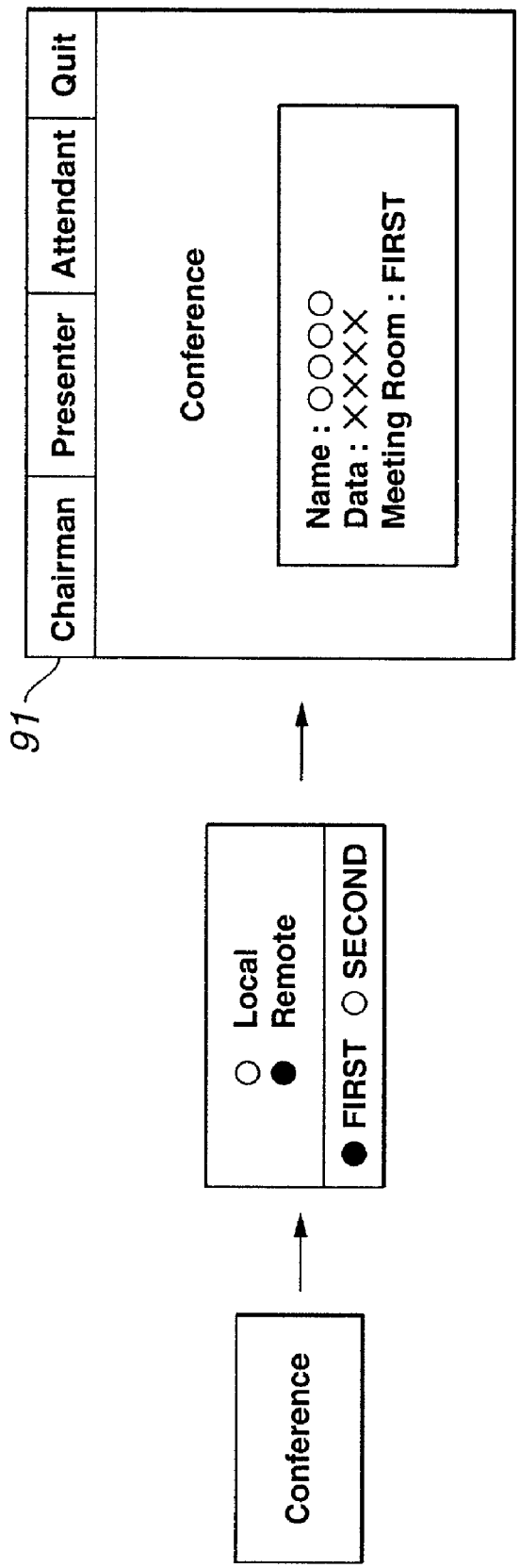
FIGS. 11A and 11B show a display screen of a client PC existing in the first conference room in the network conferencing system to which the present invention is applied.

First, each client PC of the network conferencing system starts the conference program as shown in FIG. 11A and displays a display screen for selecting the conference room where the conference server 11 exists (first conference room 10, Remote) or the conference room where the conference server 11 does not exist (second conference room 30, Local). Then, the client PC selects the first conference room 10 and shifts to the next display screen.

Figure 12:
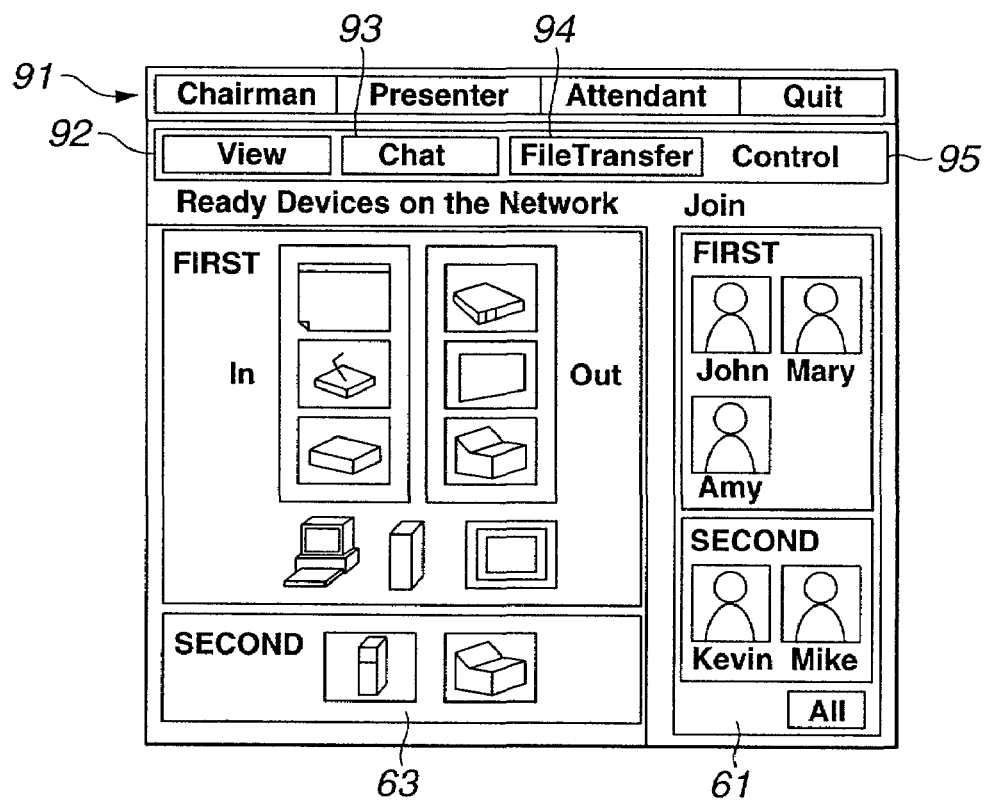
FIG. 12 shows a display screen of a chairman terminal existing in the first conference room in the network conferencing system to which the present invention is applied.
Figure 13:
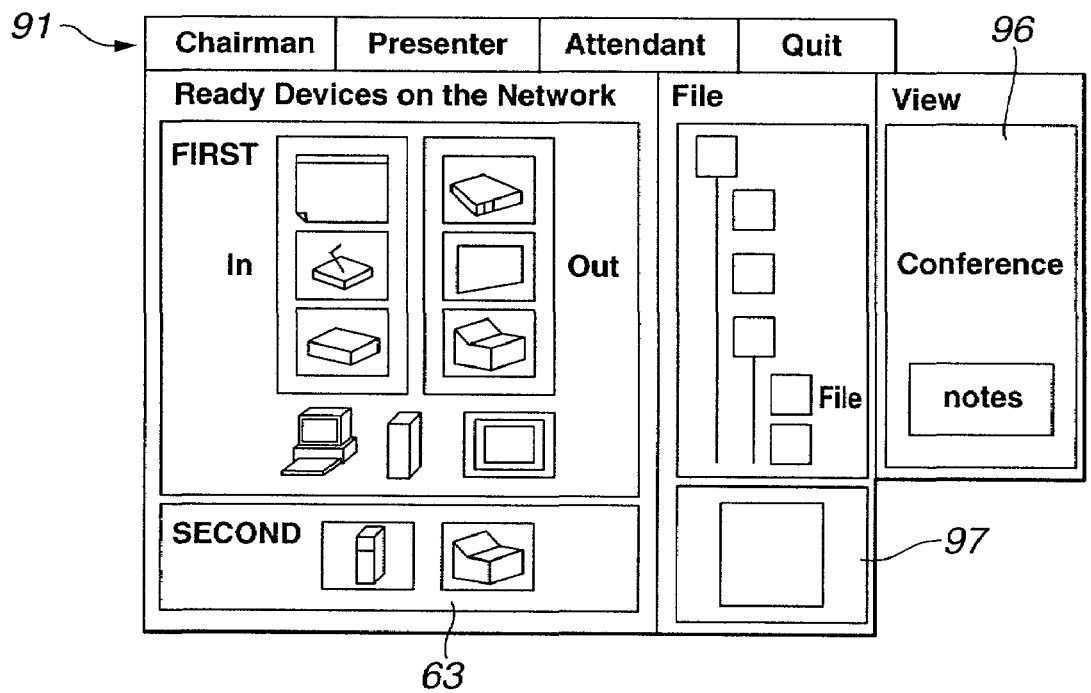
FIG. 13 shows a display screen of a presenter terminal existing in the first conference room in the network conferencing system to which the present invention is applied.
Figure 14:
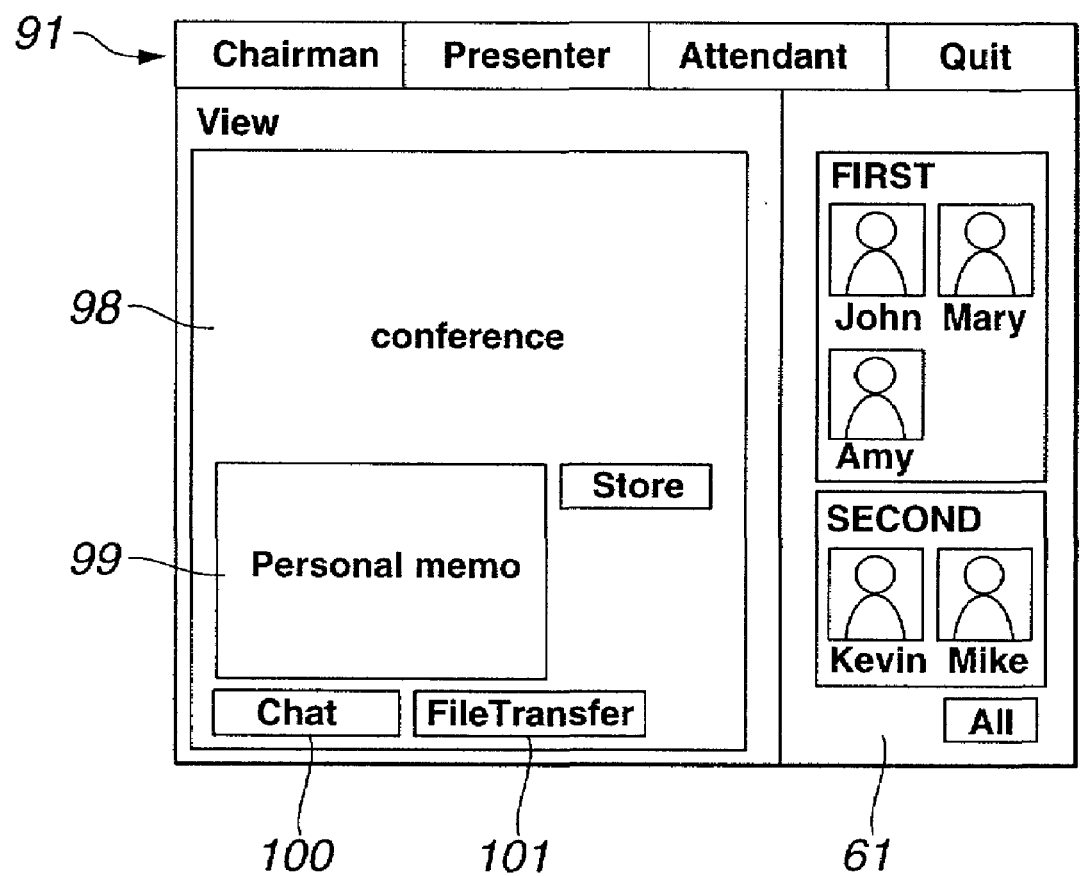
FIG. 14 shows a display screen of an attendant terminal existing in the first conference room in the network conferencing system to which the present invention is applied.

Next, the client PC selects a tab 91 for acquiring the authority to be any of the chairman, the presenter and the attendant, displayed in an upper part of a display screen shown in FIG. 11B, thus carrying out the processing to acquire the authority, and then shifts to any one of the screens shown in FIGS. 12, 13 and 14.

When the client PC 14 acquires the authority of the chairman, the client PC 14 becomes the chairman terminal and displays a viewer button (View) 92 for displaying the contents of presentation, a chat button (Chat) 93 for chatting with the other client PCs, a file transfer button (File Transfer) 94 for carrying out file transfer, and a control button (Control) for generating a control command to control the conference server 11, as shown in FIG. 12. The chairman terminal also displays an available equipment display 63 and an attendant icon display screen 61.

When the client PC 14 acquires the authority of the presenter, the client PC 14 becomes the presenter terminal and provides a viewer display 96 for showing the contents displayed by the projector device 15 in presentation and a file selector display 97 for displaying the directory of the storage location of the presentation data and the viewer of a designated file, as shown in FIG. 13. The presenter terminal also displays an available equipment display 63.

When the client PC 14 acquires the authority of the attendant, the client PC 14 becomes the attendant terminal and provides a viewer display 98 for showing the contents displayed by the projector device 15 in presentation and an individual memorandum display 99 for the user to make a personal memorandum, as shown in FIG. 14. The attendant terminal also displays a chat button 100 for chatting, a file transfer button 101 for carrying out file transfer, and the attendant icon display screen 61.

Figures 15A, 15B:
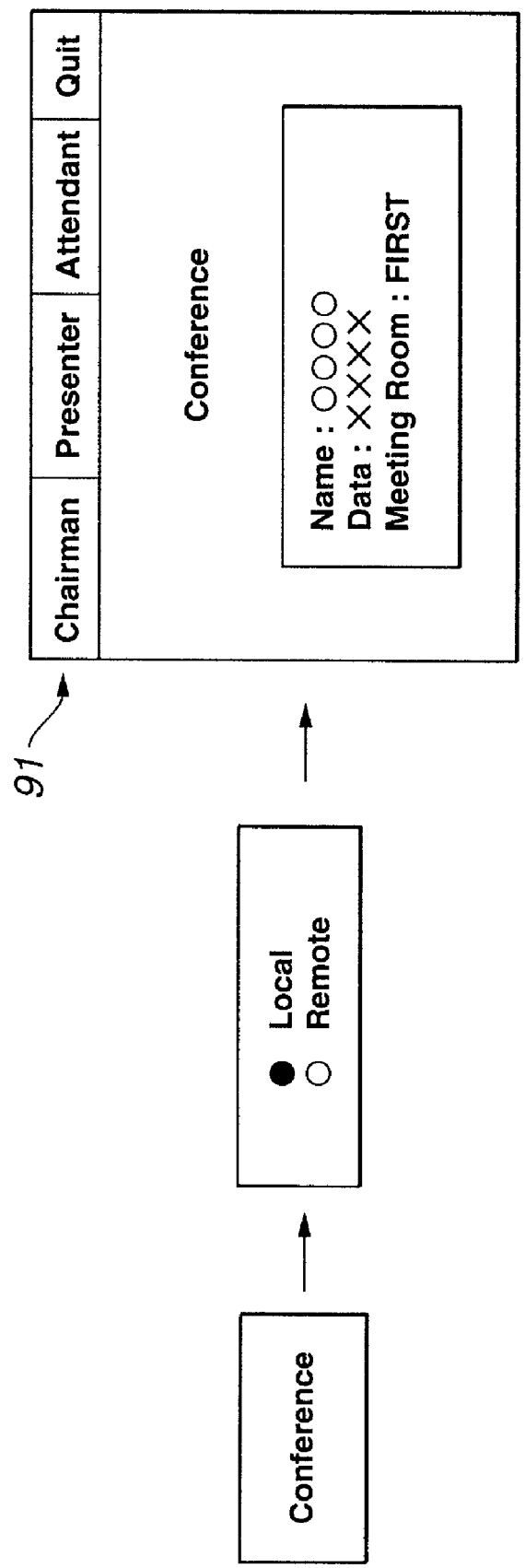
FIGS. 15A and 15B show a display screen of a client PC existing in a second conference room in the network conferencing system to which the present invention is applied.

On the other hand, the client PC 33 present in the second conference room 30 where the conference server 11 does not exist, first starts the application program for having a conference and displays a display screen for selecting the conference room where the conference server 11 exists (first conference room 10, Remote) or the conference room where the conference server 11 does not exist (second conference room 30, Local), as shown in FIG. 15A. Then, the client PC 33 selects the second conference room 30 and shifts to the next display screen shown in FIG. 15B.

Figure 16:
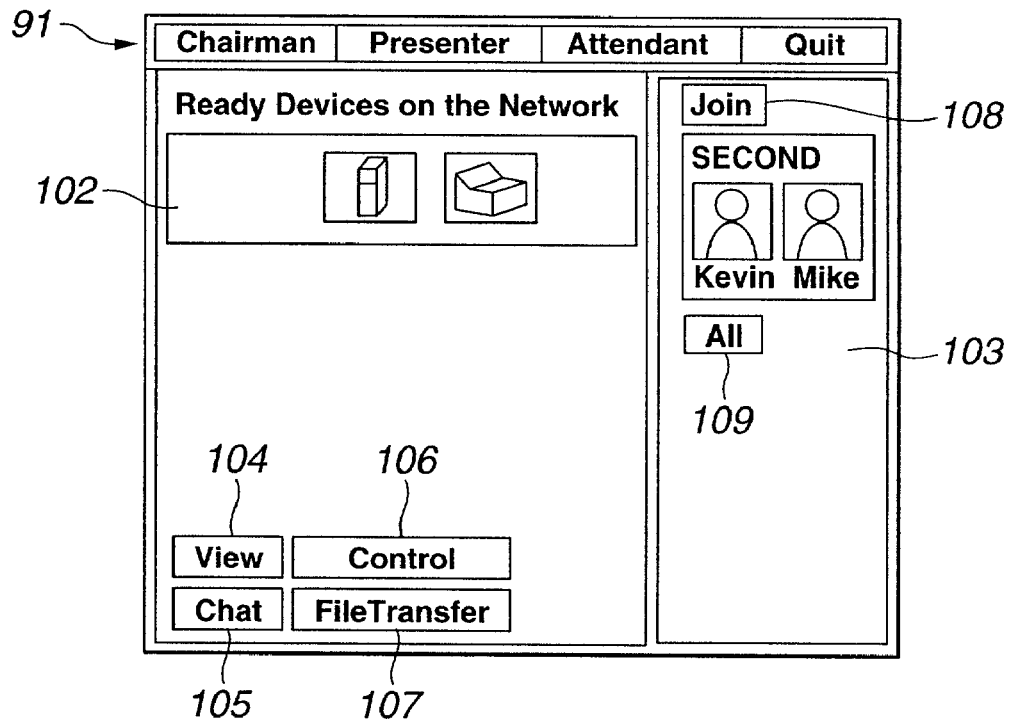
FIG. 16 shows a display screen of a chairman terminal existing in the second conference room in the network conferencing system to which the present invention is applied.
Figure 17:
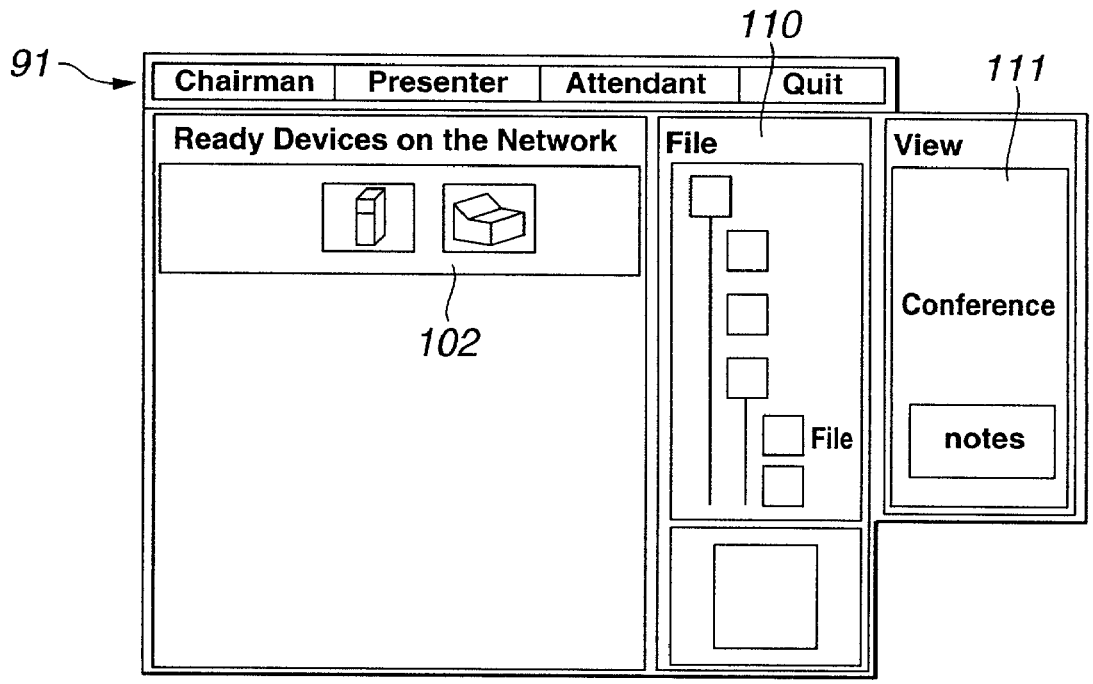
FIG. 17 shows a display screen of a presenter terminal existing in the second conference room in the network conferencing system to which the present invention is applied.
Figure 18:
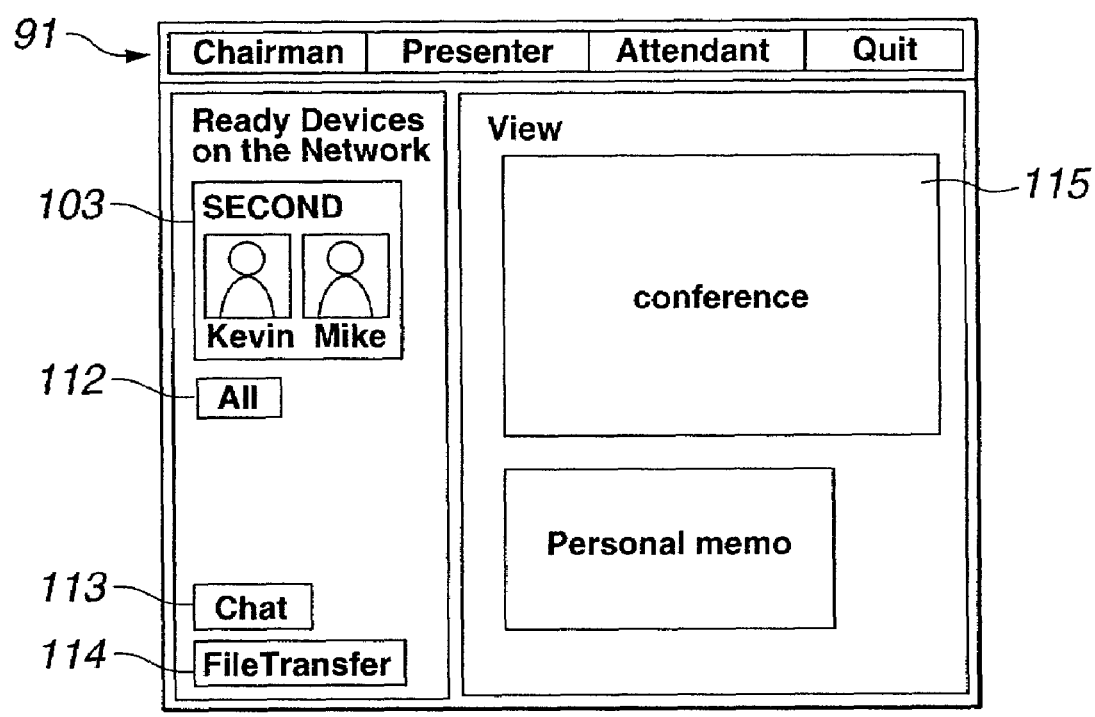
FIG. 18 shows a display screen of an attendant terminal existing in the second conference room in the network conferencing system to which the present invention is applied.

Next, the client PC 33 selects a tab 91 for acquiring the authority to be any of the chairman, the presenter and the attendant, displayed in an upper part of the display screen shown in FIG. 15B, thus carrying out the processing to acquire the authority, and then shifts to any one of the screens shown in FIGS. 16, 17 and 18.

When the client PC 33 present in the second conference room 30 acquires the authority of the chairman, the client PC 33 becomes the chairman terminal and displays an equipment display screen 102 for showing available equipment on the radio network in the second conference room 30, as icons, and an attendant icon display screen 103 for showing the attendants in the second conference room 30, as icons, as shown in FIG. 16. The chairman terminal also displays a viewer button (View) 104 for displaying the contents of presentation, a chat button (Chat) 105 for chatting with the other client PCs, a control button (Control) 106 for generating a control command to control the conference server 11, and a file transfer button (File Transfer) 107 for carrying out file transfer. The chairman terminal also displays an join button 108 for carrying out user authentication and an all-attendant designation button 92 for designating all the attendants.

When the client PC 33 present in the second conference room 30 acquires the authority of the presenter, the client PC 33 becomes the presenter terminal and provides the equipment display screen 102, a file selector display 110 and a viewer display 111, as shown in FIG. 17.

When the client PC 33 present in the second conference room 30 acquires the authority of the attendant, the client PC 33 becomes the attendant terminal and provides an all-attendant designation button 112, a chat button 113, a file transfer button 114 and a viewer display 115 having an area for describing the contents of presentation and personal memorandum, together with the attendant icon display screen 103, as shown in FIG. 18.

Figure 19:
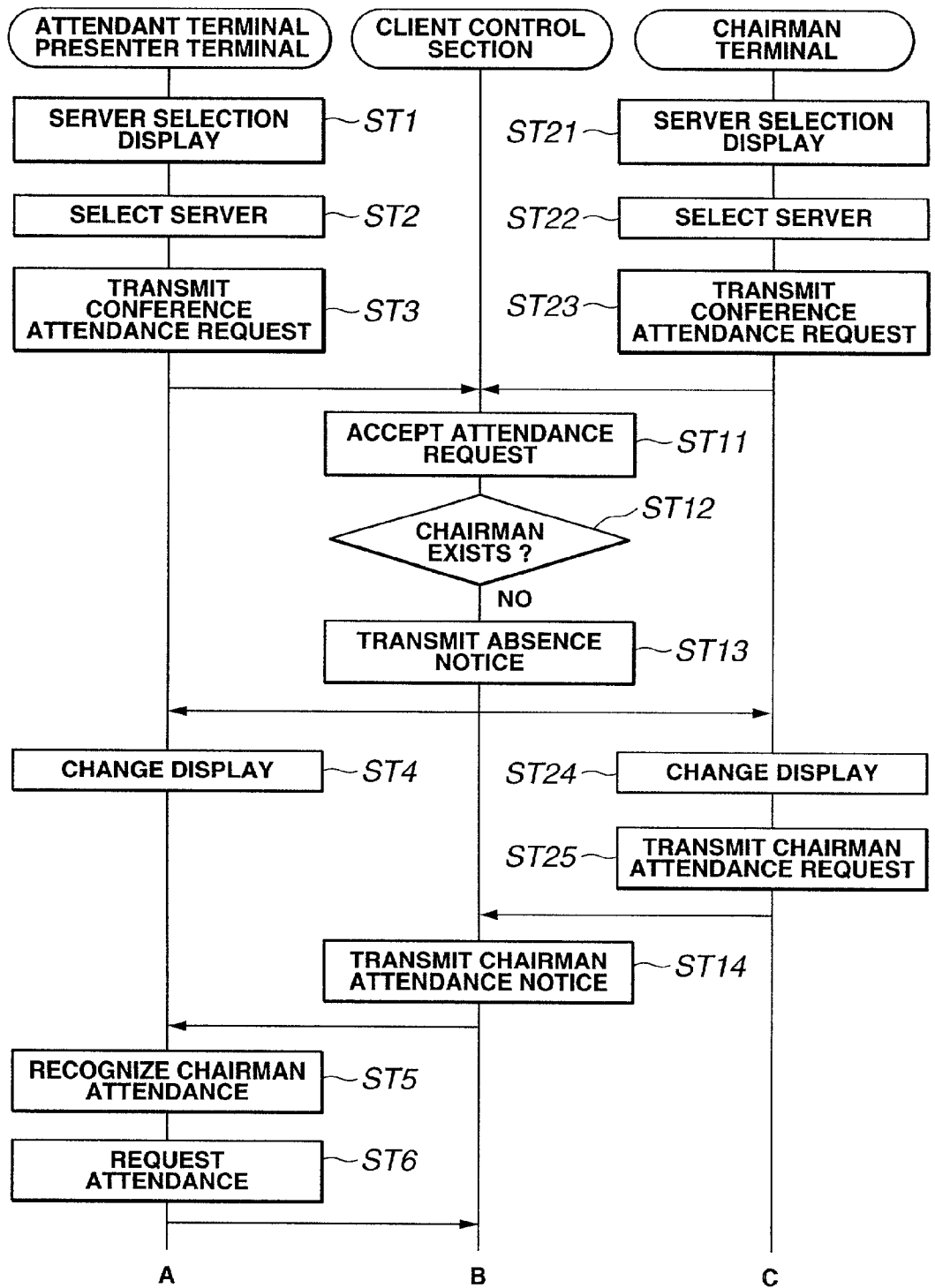
FIG. 19 is a flowchart showing the processing procedures at the attendant terminal and the presenter terminal, a client control section and the chairman terminal at the time of attending/leaving the conference in the network conferencing system to which the present invention is applied.

The processing procedure at the attendant terminal and the presenter terminal, the processing procedure at the chairman terminal and the processing procedure at the client control section 41 in attending and leaving the conference in the above-described network conferencing system will now be described with reference to the flowcharts of FIGS. 19 and 20.

First, the equipment management section 47 of the conference server 11 starts the equipment recognition program and carries out the processing to obtain the equipment information about the various equipments included in the network conferencing system and store the equipment information as the equipment information file into the equipment information file storage section 48 before starting the conference.

Next, the equipment management section 47 enters the state of monitoring the availability of the equipments included in the prepared equipment information file, in accordance with the equipment recognition program. The material transmitting/receiving section 46 enters the state of waiting for data to be displayed on the projector device 15 and the data display device 16 and requests from the client PCs, and also waiting for data input from the printer device 18 and the scanner device 19. The client control section 41 enters the state of waiting for requests from the client PCs.

Figure 23:
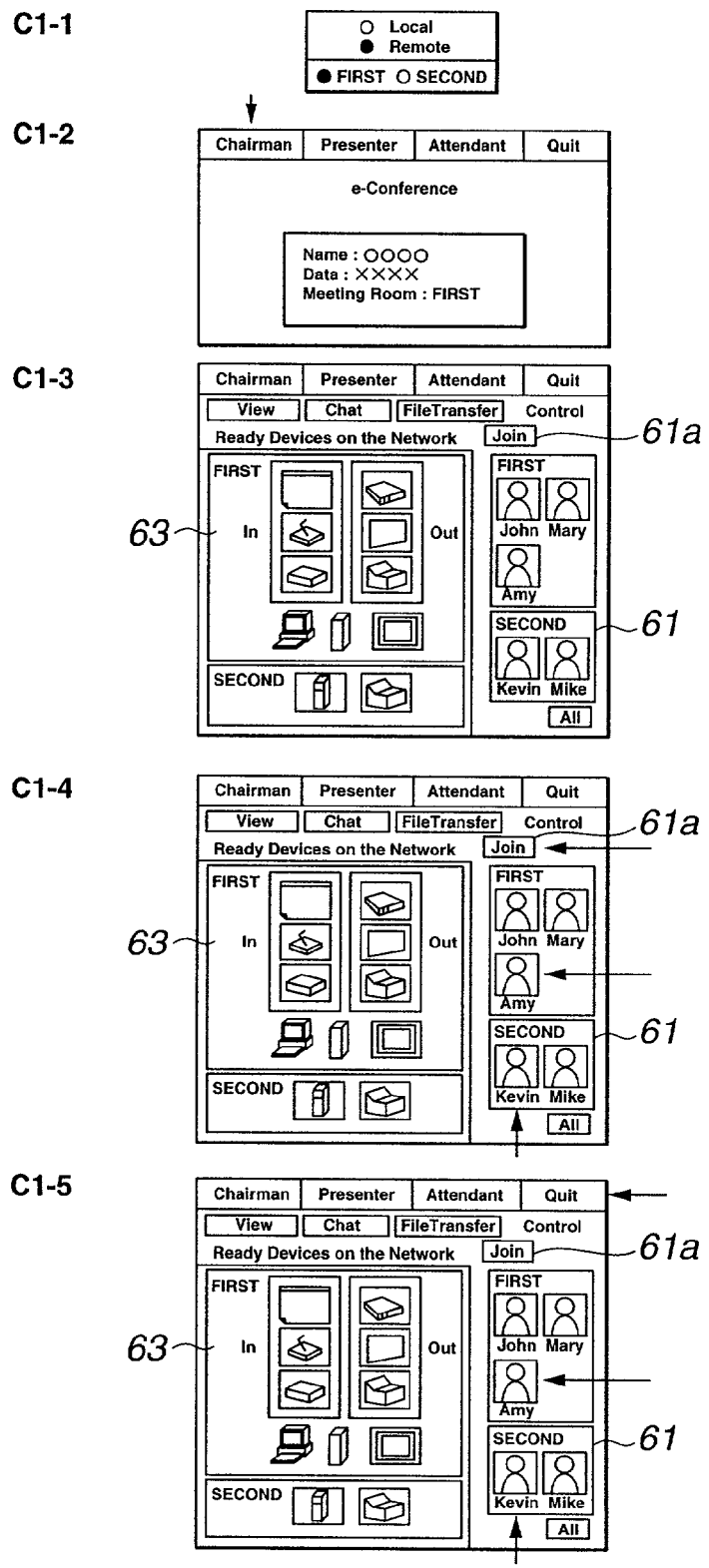
FIG. 23 shows the display screen of the chairman terminal at the time of attending/leaving the conference in the network conferencing system to which the present invention is applied.

On the other hand, the attendant terminal, the presenter terminal and the chairman terminal start the GUI program to display the contents as shown in A1-1 of FIG. 21, P1-1 of FIG. 22 and C1-1 of FIG. 23, respectively (step ST1, step ST21). The clients PC select the first conference room 10 (step ST2, ST22).

The client PCs display screens as shown in A1-2 of FIG. 21, P1-2 of FIG. 22 and C1-2 of FIG. 23 and transmit conference attendance requests including the personal data to the client control section 41 (step ST3, step ST23).

Then, the client control section 41 prepares an attendant information file using the personal data included in the conference attendance requests (step ST11) and notifies of the existence of the other client PCs as new attendants.

The client control section 41 determines whether the chairman terminal exists or not (step ST12). When the chairman terminal does not exist, the client control section 41 transmits a chairman absence notice to all the client PCs (step ST13).

In response to the chairman absence notice from the client control section 41, the other client PCs make the chairman tabs selectable in A1-2 of FIG. 21, P1-2 of FIG. 22 and C1-2 of FIG. 23, thus making it possible to attend the conference as the chairman terminal (step ST4, step ST24).

Next, when the tabs for acquiring the authority of the attendant, the authority of the presenter and the authority of the chairman are selected in accordance with the operation by the user as indicated by arrows in A1-2 of FIG. 21, P1-2 of FIG. 22 and C1-2 of FIG. 23, the client PC operated by the chairman transmits a chairman attendance request to request for the attendance at the conference as the chairman terminal to the client control section 41 (step ST25). In response to this, the display screen of the chairman terminal is switched to a chairman display screen as shown in C1-3 of FIG. 23.

On receiving the chairman attendance request, the client control section 41 enables the client PC which transmitted the chairman attendance request to carry out the processing to start the teleconference control program, the proceedings control program and the user authentication/equipment management program, thus giving the authority to be the chairman terminal.

Next, the client control section 41 transmits a chairman attendance notice to the attendant terminal and the presenter terminal (step ST14).

In response to the chairman attendance terminal, the attendant terminal and the presenter terminal recognize the attendance of the chairman terminal (step ST5) and transmit an attendant attendance request to request for attendance at the conference as the attendant terminal and a presenter attendance request to request for attendance at the conference as the presenter terminal, respectively, to the client control section 41 (step ST6).

Figure 20:
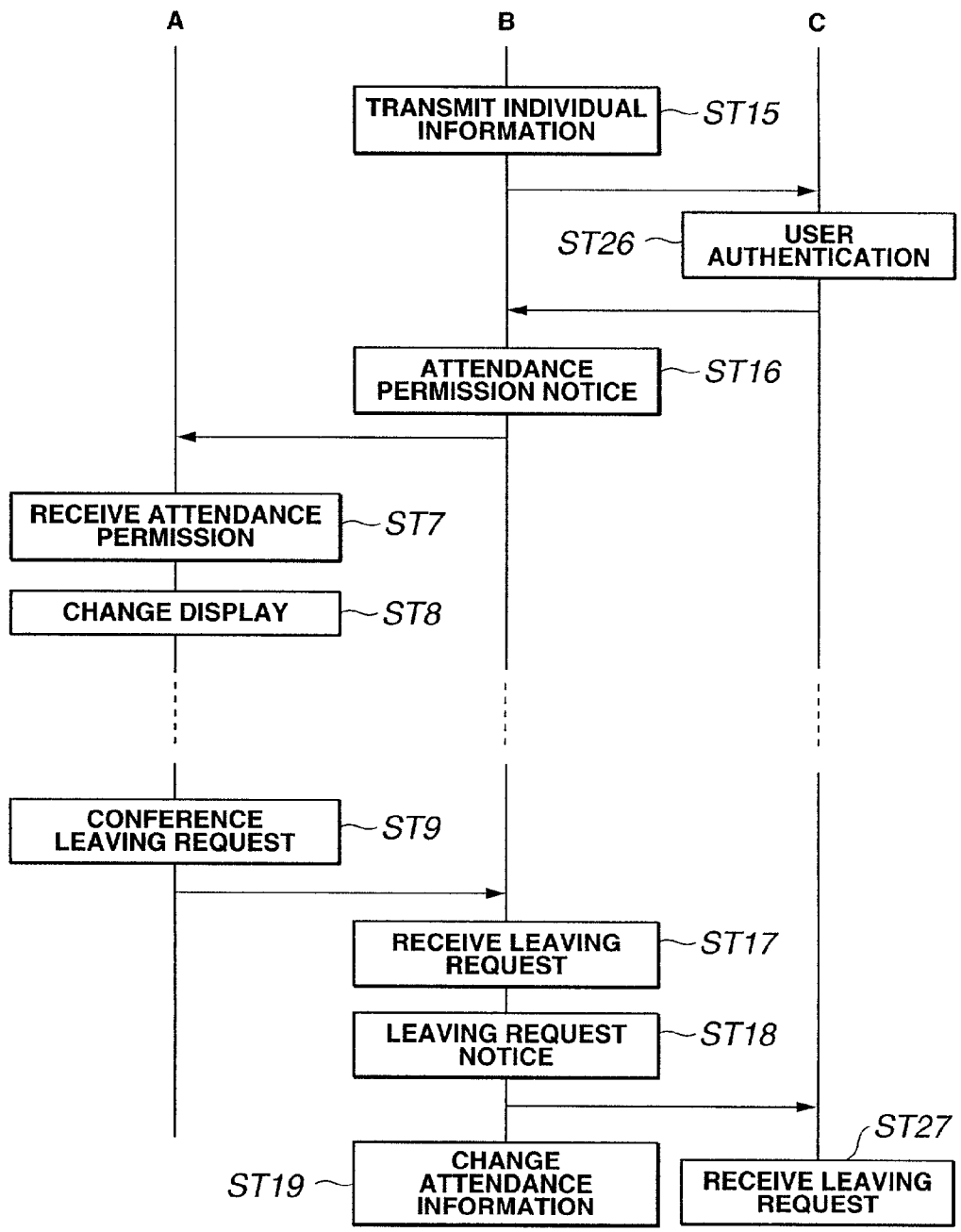
FIG. 20 is a flowchart showing the processing procedure at the attendant terminal and the presenter terminal, a client control section and the chairman terminal at the time of attending/leaving the conference in the network conferencing system to which the present invention is applied.

In response to this, the client control section 41 takes out the personal data received at step ST11 from the attendant information storage section 42 and transmits the personal data to the chairman terminal (FIG. 20, step ST15).

Next, the chairman terminal carries out user authentication processing with reference to the personal data transmitted thereto and transmits attendance permission information to permit attendance to the client control section 41 (FIG. 20, step ST26). In this case, when a display screen as shown in C1-4 of FIG. 23 is displayed, the chairman terminal is operated by the chairman to select an icon corresponding to the client PC as the target of attendance permission and to select the join button 61a, as indicated by arrows in C1-4 of FIG. 23. Thus, the chairman terminal generates the attendance permission information and transmits the attendance permission information to the client control section 41.

The client control section 41 transmits the attendance permission information from the chairman terminal to the attendant terminal or the presenter terminal (step ST16).

On receiving the attendance permission information (FIG. 20, step ST7), the attendant terminal changes the display to an attendant display screen as shown in A1-3 of FIG. 21 (step ST8). On receiving the attendance permission information (step ST7), the presenter terminal changes the display to a presenter display screen as shown in P1-3 of FIG. 22 (step ST8).

Thus, the conference using the network conferencing system is held by the chairman terminal, the presenter terminal and the attendant terminal.

When the conference ends, or when the attendant terminal or the presenter terminal leaves during the conference, the attendant terminal or the presenter terminal generates a conference leaving request in response to the selection of a quit button (Quit) 91a, as indicated by an arrow in A1-4, P1-4 of FIG. 21, and transmits the conference leaving request to the client control section 41 (step ST9).

On receiving the conference leaving request (step ST17), the client control section 41 sends a conference leaving notice to the chairman terminal (step ST18) and updates the contents of the attendant information file in the attendant information storage section 42 (step ST19).

On receiving the conference leaving notice (step ST15), the chairman terminal updates the display screen which displays the attendants so that the display of the leaving attendant is shaded as indicated by an arrow in C1-5 of FIG. 23.

Figure 24:
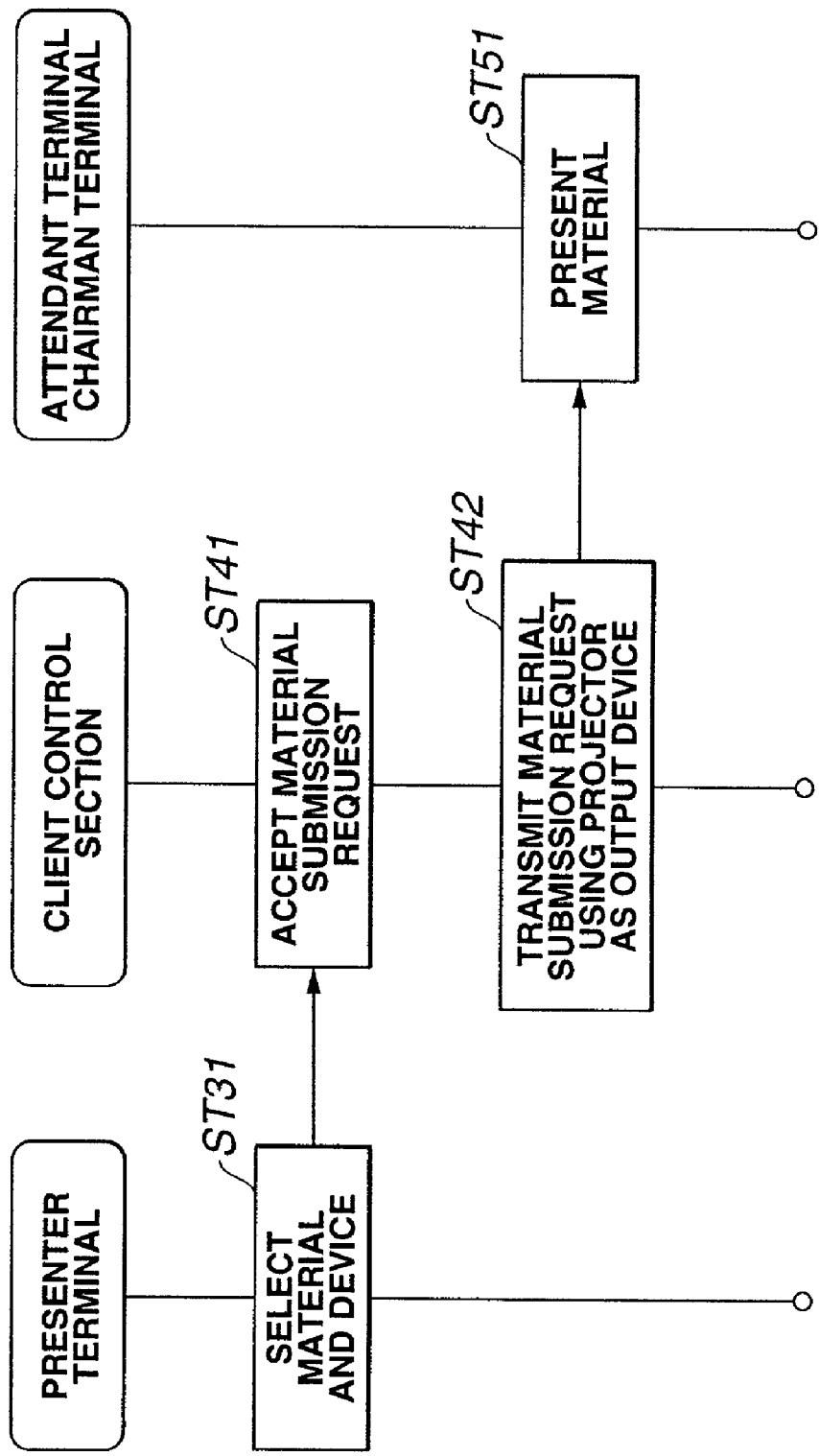
FIG. 24 is a flowchart showing the processing procedure at the presenter terminal, the client control section, the attendant terminal and the chairman terminal at the time of presenting a material in the network conferencing system to which the present invention is applied.

The processing procedure at the presenter terminal, the processing procedure at the client control section 41 and the processing procedure at the attendant terminal and the chairman terminal in designating an input equipment and designating the projector device 15 as an output equipment for making presentation will now be described with reference to FIG. 24.

Figure 25:
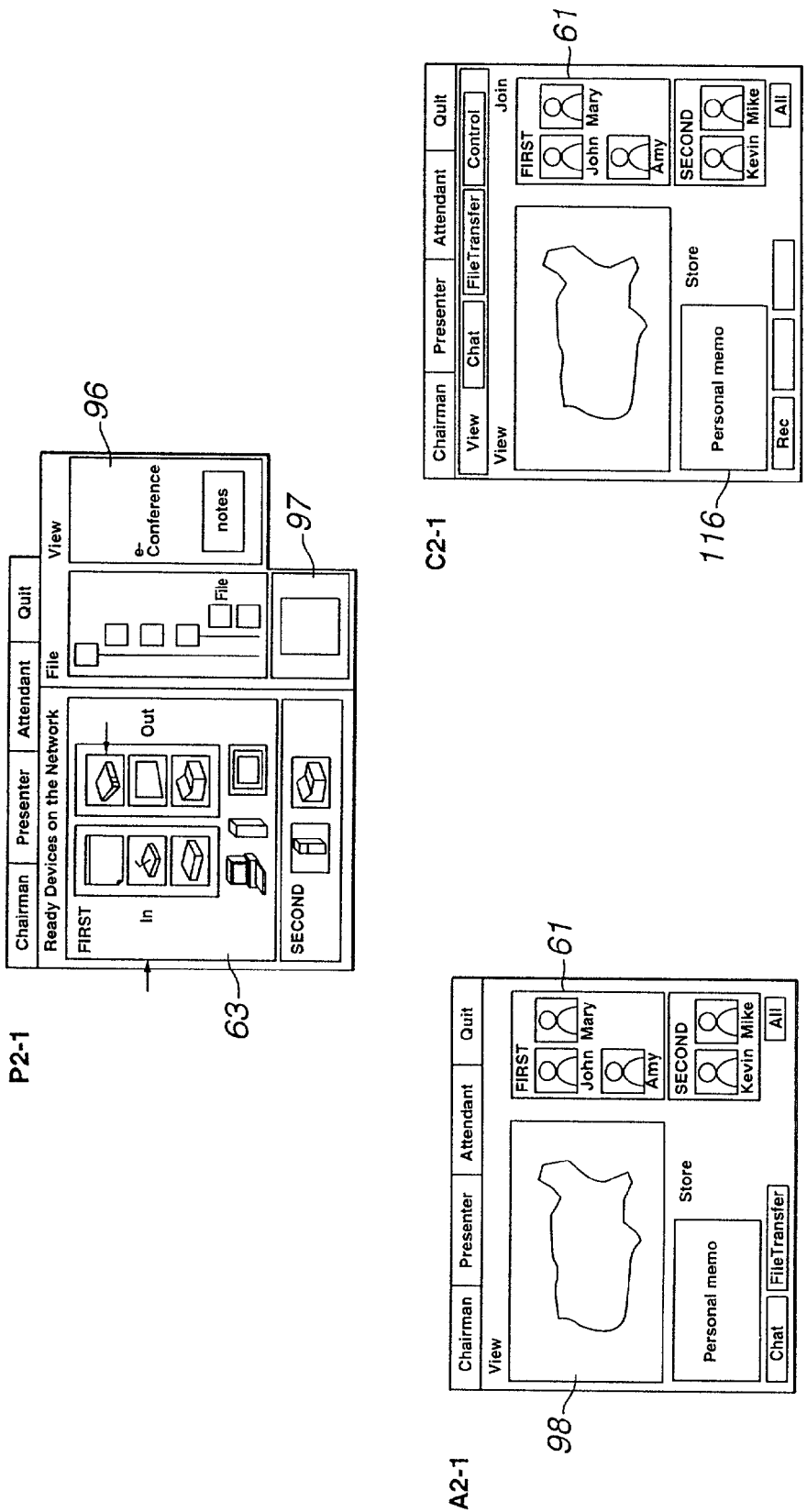
FIG. 25 shows the display screens of the attendant terminal, the presenter terminal and the chairman terminal at the time of presenting a material in the network conferencing system to which the present invention is applied.

First, the presenter terminal selects an input equipment for taking data for presentation, of the currently available input equipments displayed by the available equipment display 63 shown in P2-1 of FIG. 25 (step ST31). That is, the presenter terminal selects the input equipment which prepared a material used for presentation and the material prepared by the input equipment.

After selecting the input equipment, the presenter terminal provides a file selector display 97 for selecting the material file taken in by the input equipment and stored in the data storage section 45, and a preview display 96, and presents the material data used for presentation to the presenter. When the projector device 15 is selected as the output equipment, the presenter terminal transmits a material presentation request to the client control section 41.

Next, on accepting the material presentation request designating the material data and the projector device 15 as the output equipment (step ST41), the client control section 41 reads out the designated material data from the data storage section 45 and causes the material transmitting/receiving section 46 to carry out the processing to display the material data by the projector device 15 (step ST42). The client control section 41 also transmits the material to be presented by the projector device 15 to the attendant terminal and the chairman terminal.

The attendant terminal and the chairman terminal carry out the processing to display the contents of the material data transmitted from the client control section 41, thereby carrying out the processing to present the material as shown in A2-1, C2-1 of FIG. 25 (step ST51).

Thus, the presenter terminal can carry out the processing to project by the projector device 15 and can make presentation while presenting the material on the display screens of the attendant terminal and the chairman terminal.

Figure 26:
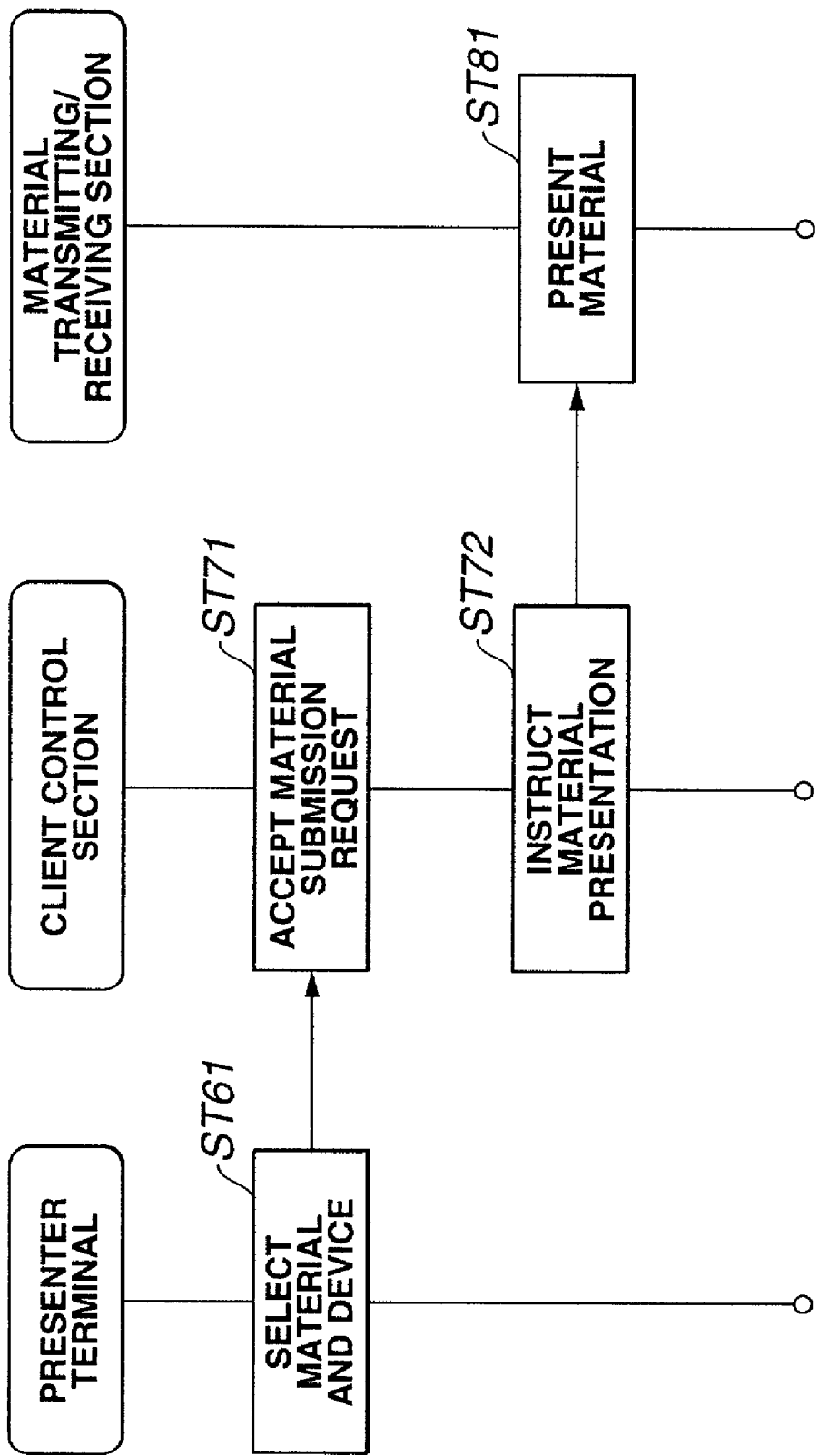
FIG. 26 is a flowchart showing the processing procedure at the presenter terminal, the client control section and a material transmitting/receiving section at the time of presenting a material in the network conferencing system to which the present invention is applied.

The processing procedure at the presenter terminal, the processing procedure at the client control section 41 and the processing procedure at the material transmitting/receiving section 46 in designating an input equipment and designating the data display device 16 and the printer device 18 as output equipments for presentation in the network conferencing system will now be described with reference to FIG. 26.

Figure 27:
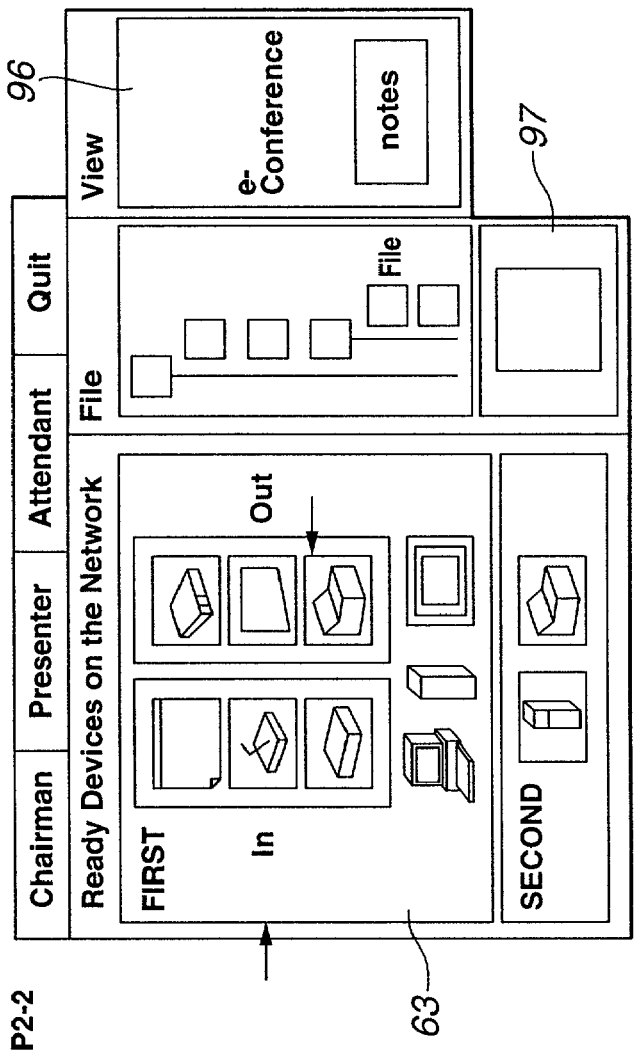
FIG. 27 shows the display screen of the presenter terminal at the time of presenting a material in the network conferencing system to which the present invention is applied.

First, the presenter terminal selects an input equipment for taking material data for presentation, of the currently available input equipments displayed as shown in P-22 of FIG. 27 (step ST61).

After selecting the input equipment, the presenter terminal provides a file selector display 97 for selecting a material file and material data taken in by the input equipment and stored in the data storage section 45, and a preview display 96, and presents the material data used for presentation to the presenter. After the material file and the material data used for presentation is selected and the data display device 16 and the printer device 18 are used as the output equipments, the presenter terminal transmits a material presentation request to the client control section 41.

Then, on accepting the material presentation request designating the material file and the data display device 16 and the printer device 18 as the output equipments (step ST71), the client control section 41 reads out the designated material file from the data storage section 45 and causes the material transmitting/receiving section 46 to carry out the processing to display the material data by the data display device 46 and print the material data by the printer device 18 (step ST72). In this case, the material transmitting/receiving section 46 transmits the material data to the data display device 16 and the printer device 18 in accordance with, for example, the Jet Send protocol.

By thus displaying the material data using the data display device 16 and printing the material data using the printer device 18, the presenter terminal can make presentation while presenting the material to the attendant and the chairman.

The processing procedure at the presenter terminal, the processing procedure at the client control section 41 and the processing procedure at the attendant terminal and the chairman terminal in selecting a presentation file stored in advance in the data storage section 45 so as to make presentation will now be described with reference to FIG. 28.

Figure 28:
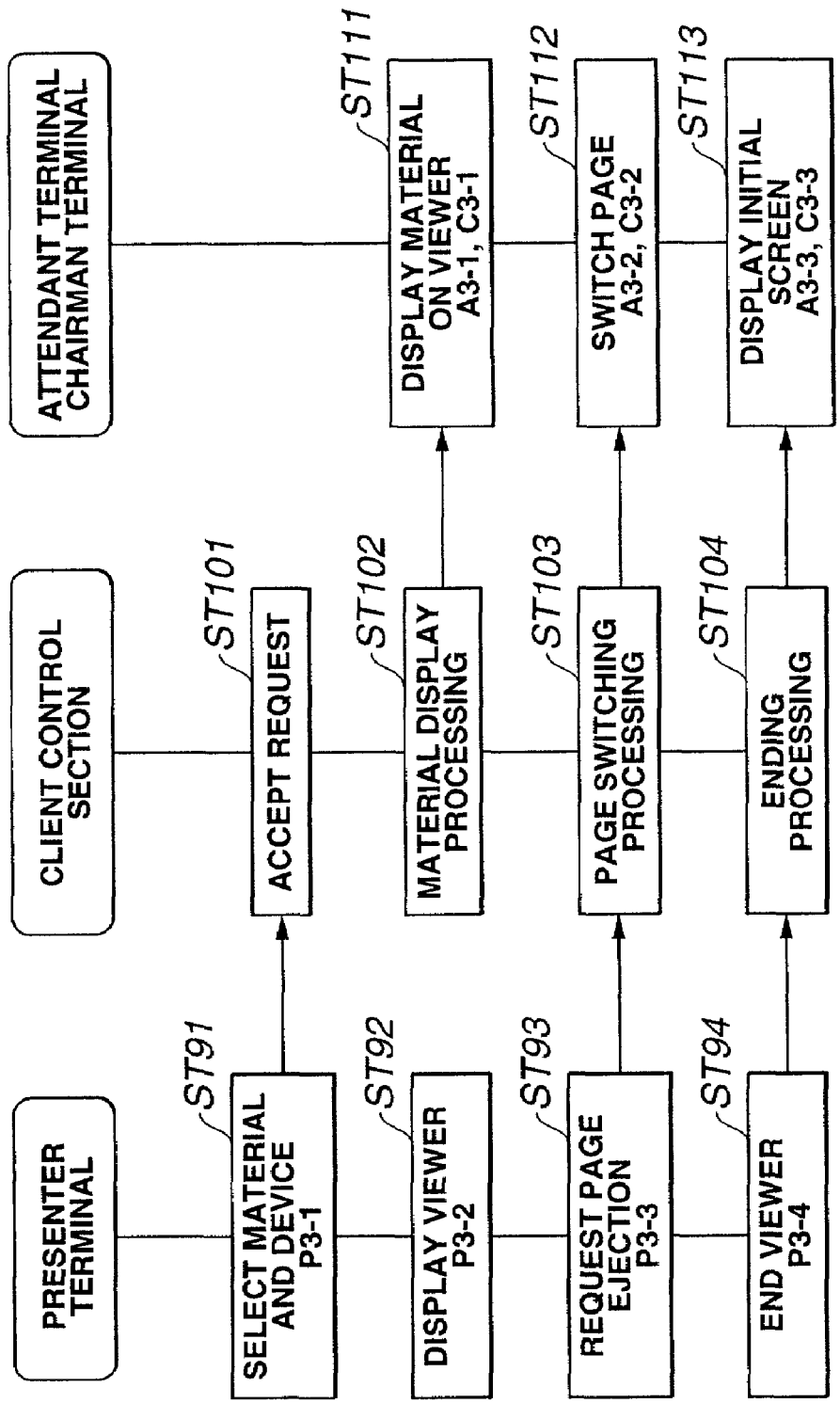
FIG. 28 is a flowchart showing the processing procedure at the presenter terminal, the client control section, the attendant terminal and the chairman terminal at the time of presentation in the network conferencing system to which the present invention is applied.
Figure 30:
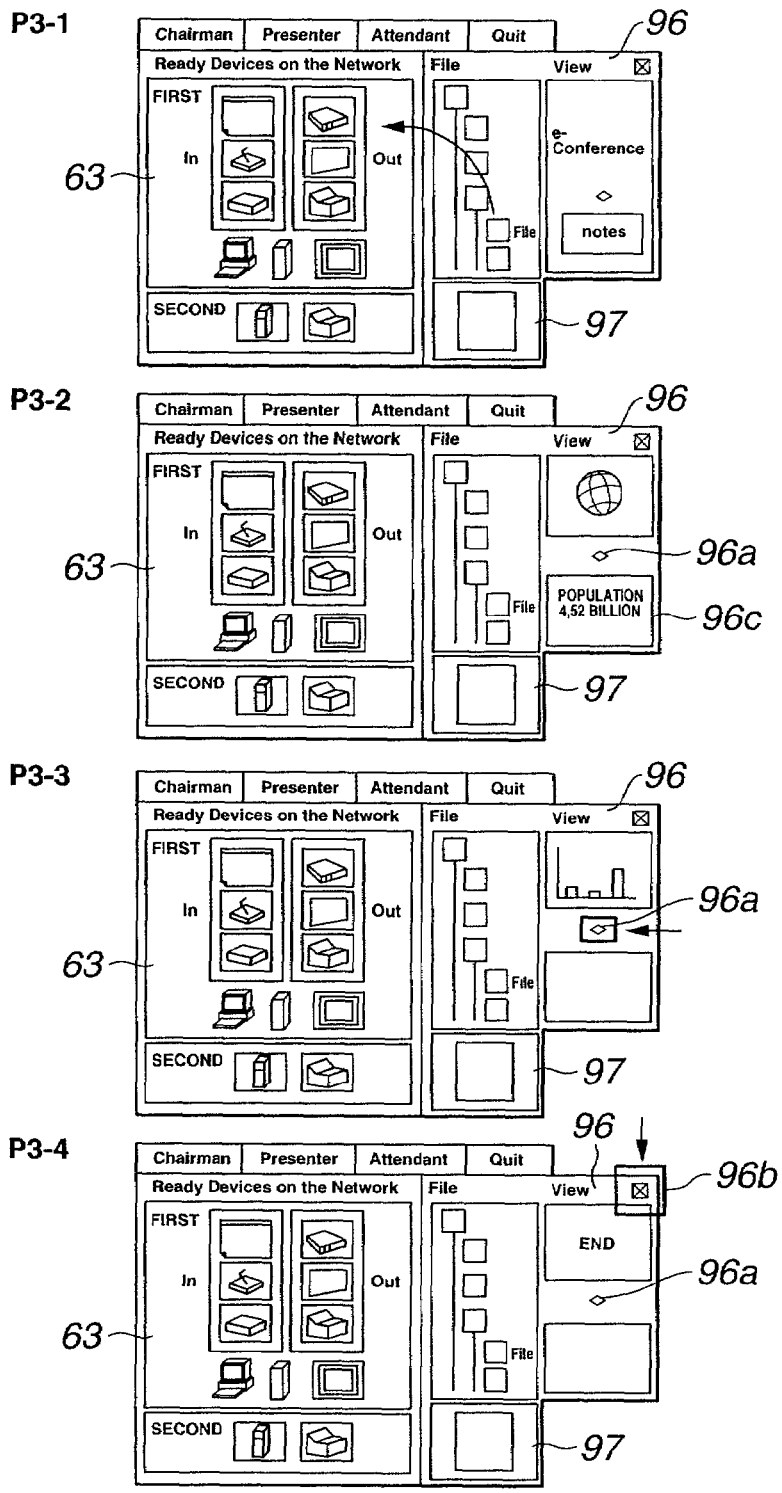
FIG. 30 shows the display screen of the presenter terminal at the time of presentation in the network conferencing system to which the present invention is applied.

With reference to FIG. 28, the presenter terminal provides a file selector display 97 and also provides an available equipment display 63 for displaying available output equipments and a preview display 96, as shown in P3-1 of FIG. 30. The presenter terminal selects a presentation file used for presentation from the file display in the file selector display 97 and drags the presentation file to an output equipment (for example, projector device 15) for outputting the contents of presentation, as indicated by an arrow in P3-1 of FIG. 30. Thus, the presenter terminal transmits a material presentation request designating the presentation file and the output equipment to the client control section 41 (step ST91).

Next, the client control section 41 accepts the material presentation request (step ST101) and controls the material transmitting/receiving section 46 to display the contents of presentation by the projector device 15 (step ST102). The client control section 41 also carries out the processing to read out the contents of presentation displayed by the projector device 15 from the data storage section 45 and to transmit the contents of presentation to the attendant terminal and the chairman terminal.

The attendant terminal and the chairman terminal provide a viewer display of the same contents of the presentation as those displayed by the projector device 15, as shown in A3-1, C3-1 of FIG. 29, using the presentation file from the client control section 41 (step ST111).

Following step ST91, the presenter terminal provides a preview display 96 of the presentation file designated by the material presentation request, as shown in P3-2 of FIG. 30 (step ST92). In this case, the presenter terminal displays a prompter display screen 96c for supplementing the contents previewed in previewing the contents of presentation, within the preview display 96. Thus, the presenter can make presentation while displaying a reference memorandum or the like for presentation only at the presenter terminal. This improves the convenience for the presenter.

Next, when a page ejection button 96a is selected as indicated by an arrow in P3-3 of FIG. 30 in response to the operation by the presenter, the presenter terminal transmits a page ejection request to the client control section 41 (step ST93).

Then, the client control section 41 carries out the processing to read out a presentation file showing the next or previous page from the data storage section 45 in accordance with the received page ejection request and to switch the material displayed by the projector device 15 through the material transmitting/receiving section 46 (step ST103). The client control section 41 also transmits the same file as the presentation file outputted to the projector device 15, to the attendant terminal and the chairman terminal.

Figure 31:
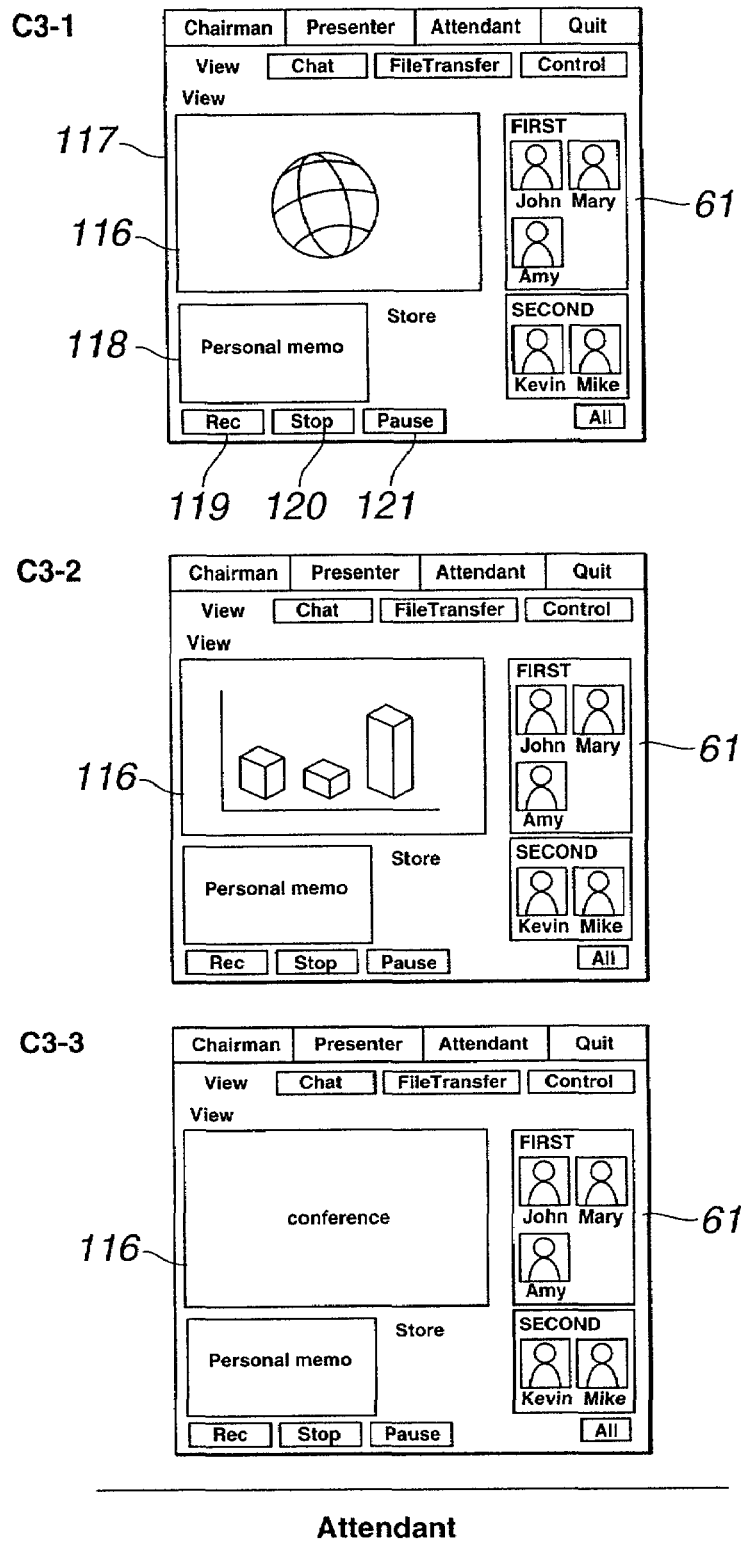
FIG. 31 shows the display screen of the chairman terminal at the time of presentation in the network conferencing system to which the present invention is applied.

The attendant terminal and the chairman terminal carry out the processing to switch the page by displaying the contents of the presentation file showing the next or previous page inputted from the client control section 41, as shown in A3-2 of FIG. 29 and C3-2 of FIG. 31 (step ST112).

When a viewer end button 96b is selected as indicated by an arrow in P3-4 of FIG. 30, the presenter terminal ends the preview display 96 and transmits a presentation end request to the client control section 41 (step ST94).

Then, the client control section 41 controls the projector device 15 to end presentation and carries out the processing to output the presentation end request to the attendant terminal and the chairman terminal (step ST104).

The attendant terminal and the chairman terminal carry out the processing to set a viewer display 98 and the viewer display 116 to their initial screens, as shown in A3-3 of FIG. 29 and C3-3 of FIG. 31.

Thus, the presenter terminal can present the contents of presentation to the projector device 15, the attendant terminal and the chairman terminal by using the presentation file made up of a plurality of prepared pages, and can make presentation while switching the pages.

The processing procedure at the presenter terminal, the processing procedure at the client control section 41 and the processing procedure at the material transmitting/receiving section 46 in selecting a presentation file prepared in advance in the data storage section 45 so as to make presentation by the data display device 16 will now be described with reference to FIG. 32.

Figure 32:
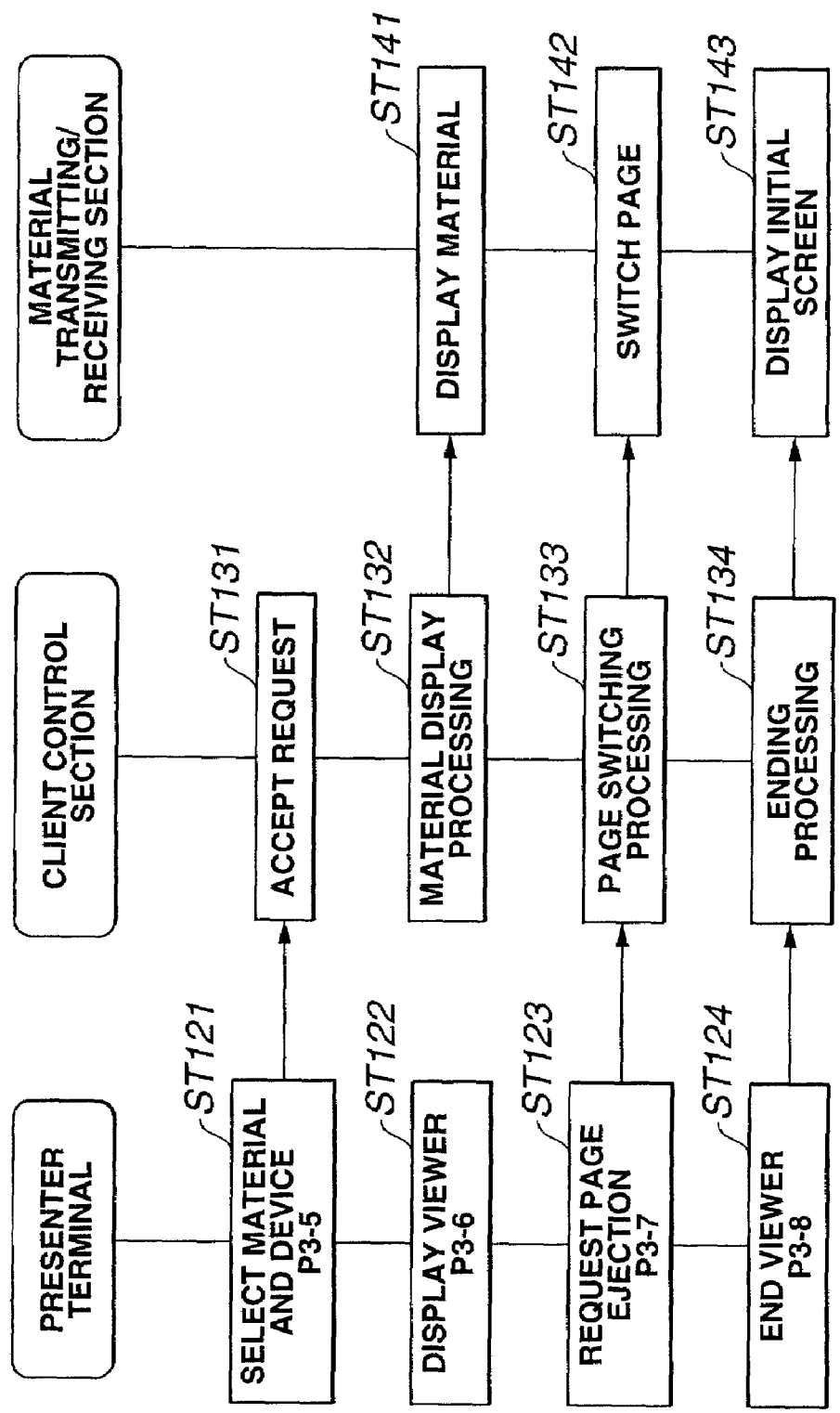
FIG. 32 is a flowchart showing the processing procedure at the presenter terminal, the client control section and the material transmitting/receiving section at the time of presentation in the network conferencing system to which the present invention is applied.
Figure 33:
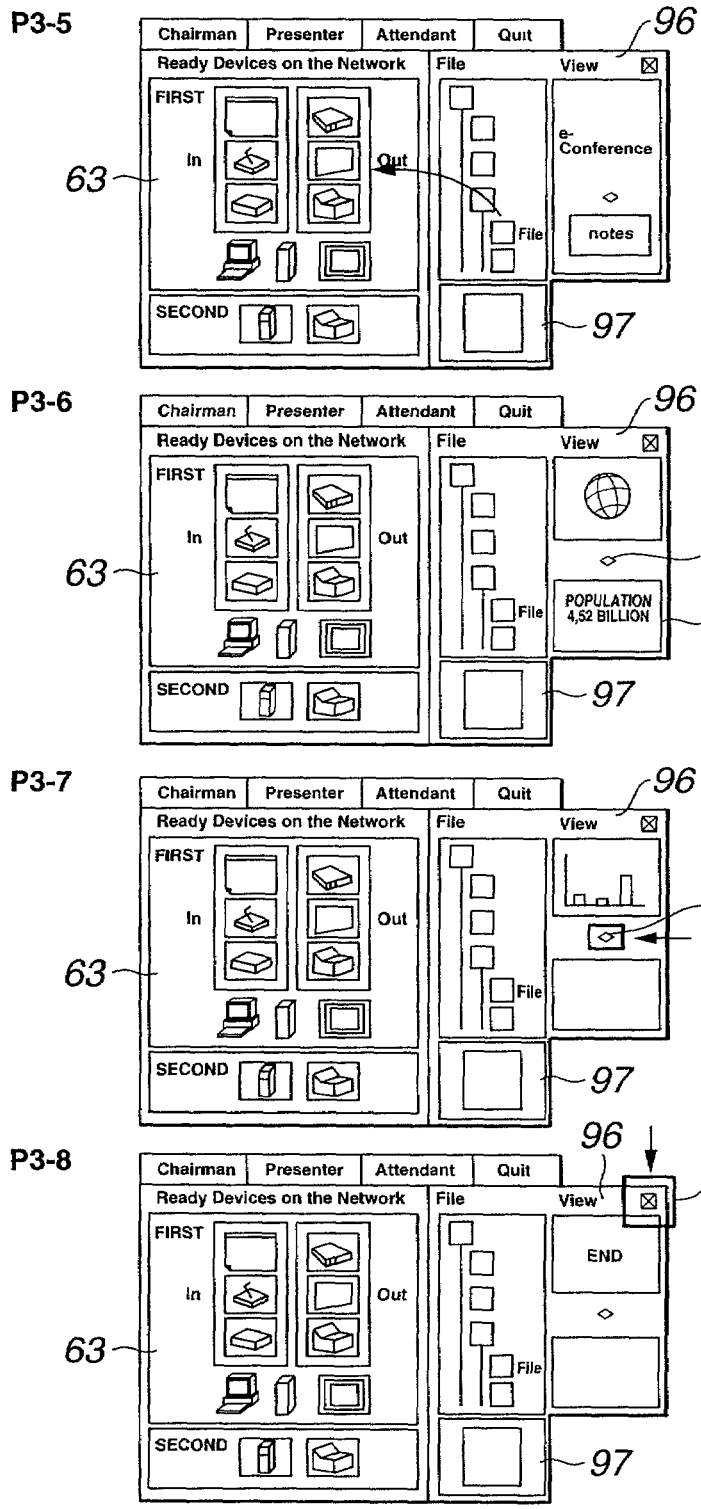
FIG. 33 shows the display screen of the presenter terminal at the time of presentation in the network conferencing system to which the present invention is applied.

With reference to FIG. 32, the presenter terminal displays a file selector display image 97 and also displays an available equipment display image 63, as shown in P3-5 of FIG. 33. In response to the operation by the presenter, the presenter terminal selects a presentation file used for presentation and drags the presentation file to the data display device 16 which outputs the contents of presentation. Thus, the presenter terminal transmits a material presentation request designating the presentation file and the data display device 16 as an output equipment to the client control section 41 (step ST121).

Next, the client control section 41 accepts the material presentation request (step ST131), then takes out the designated presentation file from the data storage section 45, and controls the material transmitting/receiving section 46 to display the contents of presentation by the data display device 16 (step ST132). Thus, the material transmitting/receiving section 46 transmits the presentation file thus taken out, to the data display device 16 in accordance with a predetermined protocol, and controls the data display device 16 to display the contents of presentation (step ST141). In this case, since the contents of presentation are not displayed by the projector device 15, the client control section 41 does not carry out the processing to display the contents of presentation at the attendant terminal and the chairman terminal.

Following step ST121, the presenter terminal provides a viewer display of the contents of presentation in a preview display section 96, as shown in P3-6 of FIG. 33 (step ST122).

Next, when a page ejection button 96a is selected as indicated by an arrow in P3-7 of FIG. 33 in response to the operation by the presenter, the presenter terminal transmits a page ejection request to the client control section 41 (step ST123).

The client control section 41 carries out the processing to read out presentation data showing the next or previous page from the data storage section 45 in accordance with the received page ejection request and to switch the contents of presentation displayed by the projector device 15 through the material transmitting/receiving section 46 (step ST133).

The material transmitting/receiving section 46 carries out the processing to output the presentation data to the data display device 16 and to switch the page (step ST142).

When a viewer end button 96b is selected as indicated by an arrow in P3-8 of FIG. 33, the presenter terminal ends the display of the viewer display image 96 and transmits a presentation end request to the client control section 41 (step ST124).

The client control section 41 controls the data display device 16 to end presentation and carries out the processing to output the presentation end request to the material transmitting/receiving section 46 (step ST134).

The material transmitting/receiving section 46 carries out the processing to set the data display device 16 to its initial screen (step ST143).

Thus, the presenter terminal can control the material transmitting/receiving section 46 to present the contents of presentation to the data display device 16 by using the presentation file made up of a plurality of prepared pages and to make presentation while switching the pages.

The processing procedure at the first client PC on the chat message transmitting side, the client control section 41 and the second client PC on the chat message receiving side in chatting between the client PCs during a conference in the network conferencing system will now be described with reference to FIG. 34. In the following description, the first client PC is an attendant terminal and the second client PC is an attendant terminal or a chairman terminal.

Figure 34:
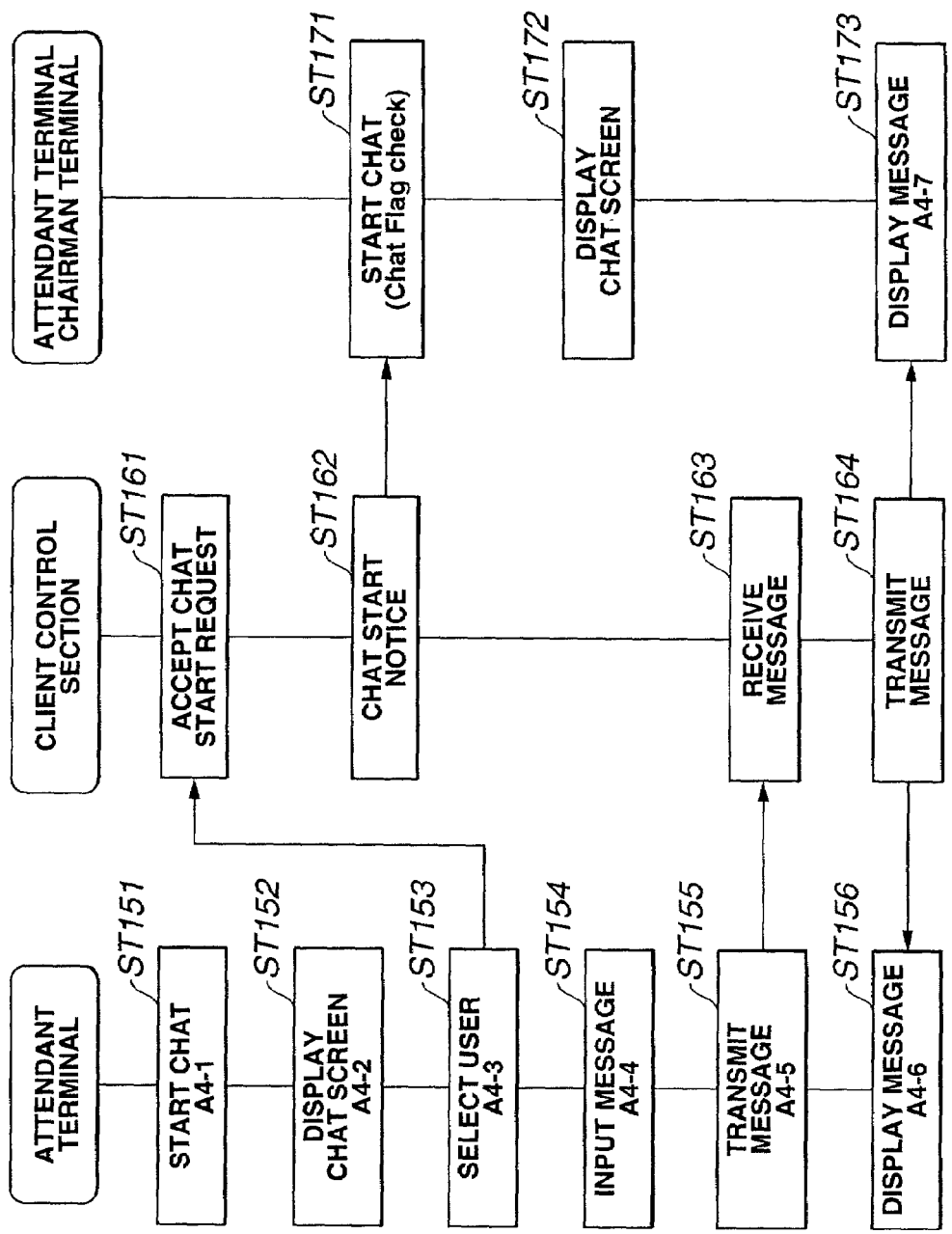
FIG. 34 is a flowchart showing the processing procedure at the attendant terminal, the client control section and the chairman terminal at the time of chat in the network conferencing system to which the present invention is applied.

With reference to FIG. 34, first, when a chat button (Chat) 100 is designated as indicated by an arrow in A4-1 of FIG. 35 in response to the operation by the user, the first client PC displays a chat display screen (A4-2 of FIG. 35) including a chat message preparation screen 123 and a chat message receiving screen 124 (step ST152).

Next, the first client PC selects an icon indicating the second client PC of the chat message transmission destination from an attendant icon display screen 61 as indicated by an arrow in A4-3 of FIG. 35 so as to select the user, and transmits a chat start request to the client control section 41 (step ST153).

On receiving the chat start request (step ST161), the client control section 41 transmits a chat start notice to all the client PCs attending the conference (step ST162).

On receiving the chat start notice, the second client PC starts chatting (step ST171) and displays a chat display screen (step ST172).

Then, the first client PC prepares a chat message using the chat message preparation screen 124 as indicated by an arrow in A4-4 of FIG. 35 (step ST154). After preparing the chat message, the first client PC selects a send button (Send) 125 within the chat message preparation screen 123 as indicated by an arrow in A4-5 of FIG. 35, thus transmitting the chat message to the client control section 41 (step ST155). In this case, the first client PC adds additional information such as the address of the second client PC to the chat message.

On receiving the chat message from the first client PC (step ST163), the client control section 41 recognizes the second client PC of the transmission destination from the chat message and transmits the chat message to the second client PC (step ST164).

The second client PC displays the chat message from the first client PC onto the chat message receiving screen 124, as shown in A4-7 of FIG. 36 (step ST173).

When replying to the chat message from the first client PC, the second client PC sends a chat message describing the contents of reply to the client control section 41. In response to this, the client control section 41 carries out the processing to transmit the chat message to the first client PC.

Thus, in the network conferencing system, as the chat messages are relayed by the client control section 41, the chat messages can be transmitted/received between the first client PC and the second client PC.

In this case, even when the conference server 11 is in the proceedings preparation mode, the chat messages transmitted/received between the client PCs are not stored into the data storage section 45.

The processing procedure in carrying out file transfer from the first client PC to the second client PC during a conference in the network conferencing system will now be described with reference to FIG. 37.

Figure 37:
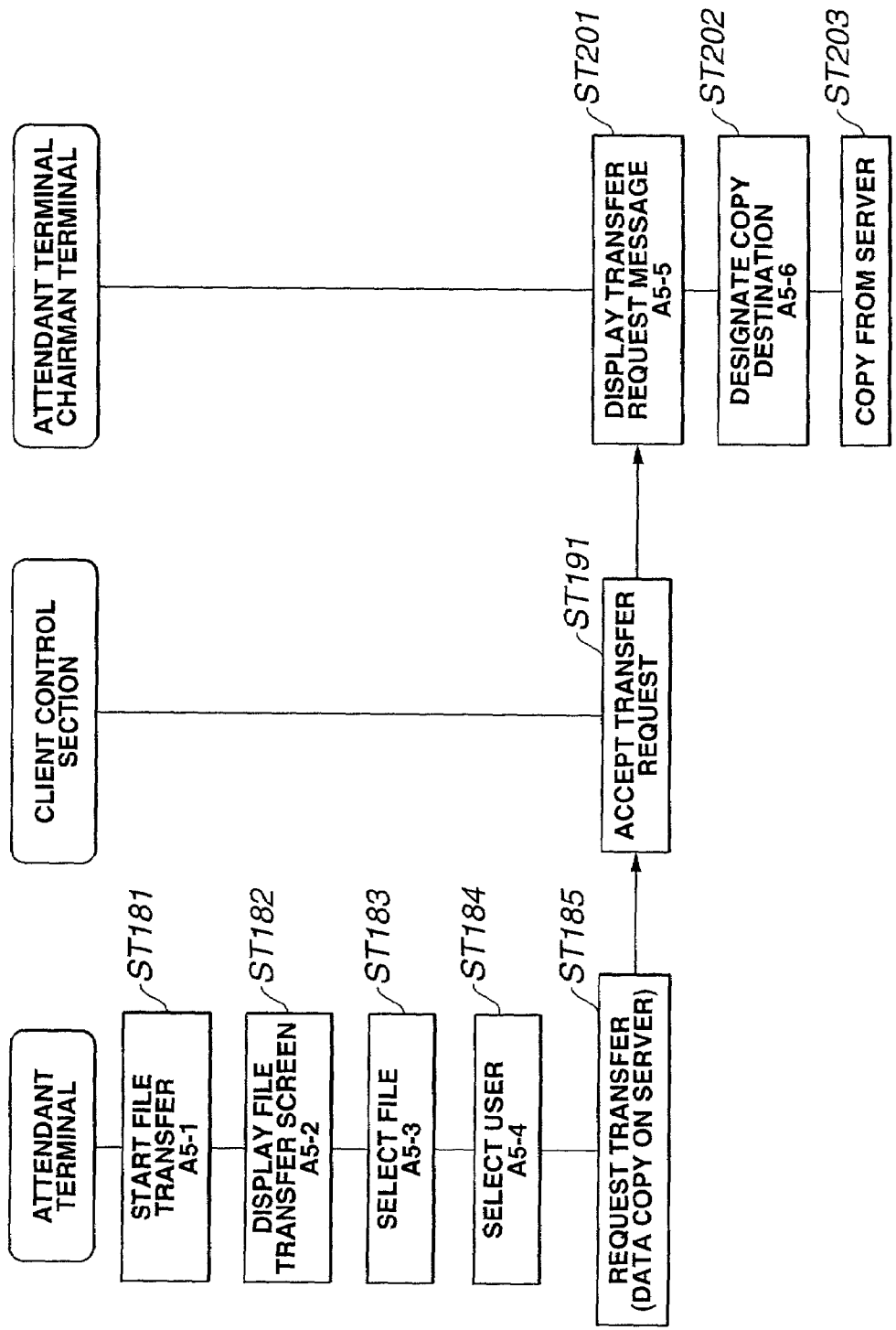
FIG. 37 is a flowchart showing the processing procedure at the first client PC, the client control section and the second client PC at the time of file transfer in the network conferencing system to which the present invention is applied.
Figure 38:
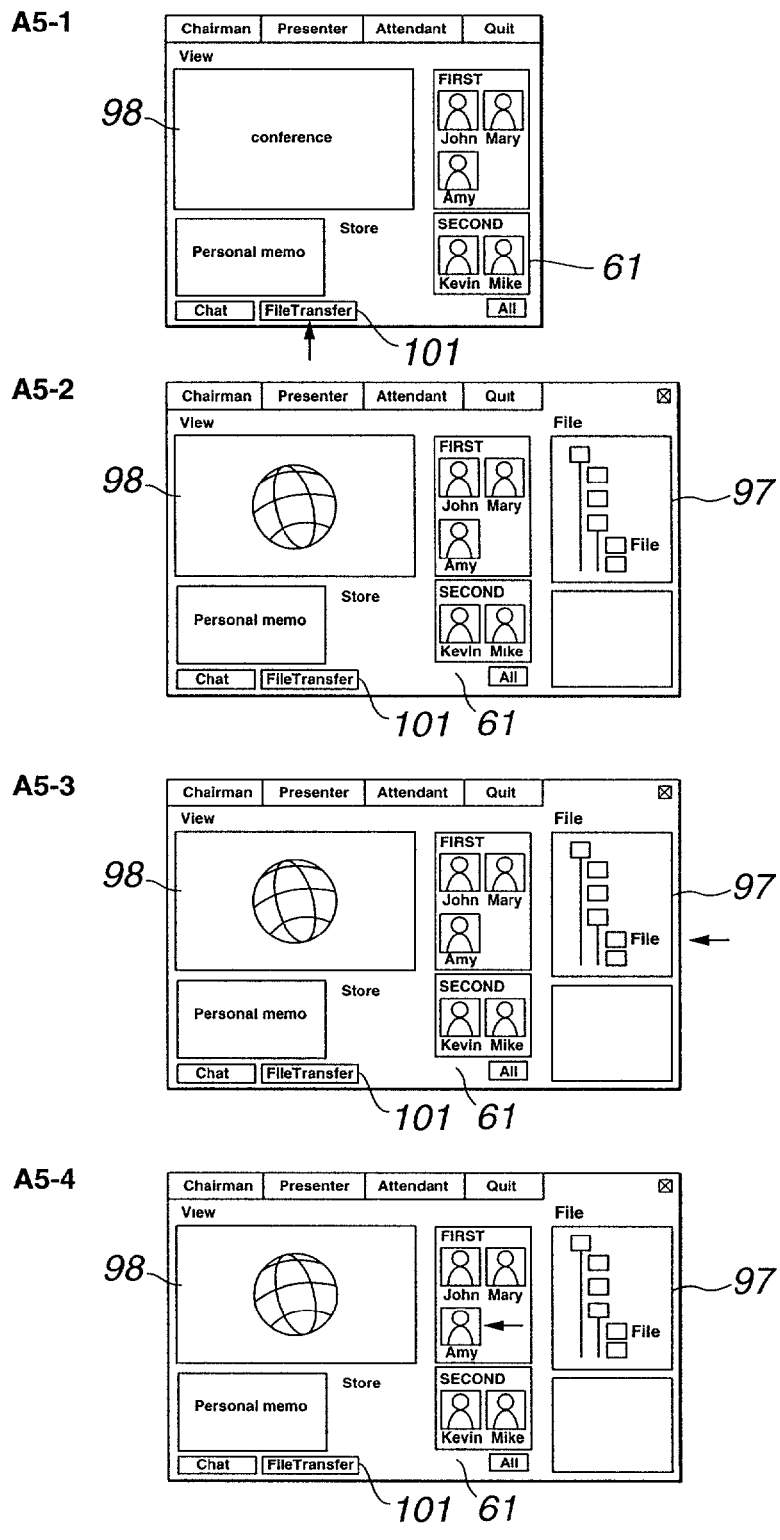
FIG. 38 shows the display screen of the attendant terminal at the time of file transfer in the network conferencing system to which the present invention is applied.

With reference to FIG. 37, first, when a file transfer button (File Transfer) 101 is designated as indicated by an arrow in A5-1 of FIG. 38 in response to the operation by the user, the first client PC transmits a file transfer start request to the client control section 41 (step ST181).

Then, the first client PC displays a file selector display screen 97 for selecting a file to be transferred from files stored on an internal HDD, as shown in A5-2 of FIG. 38 (step ST182).

The first client PC carries out the processing to select a file to transferred from the file selector display screen 97, as indicated by an arrow in A5-3 of FIG. 38 (step ST183).

Then, the first client PC selects an icon indicating the second client PC of the chat message transmission destination from an attendant icon display screen 61, as indicated by an arrow in A5-4 of FIG. 38 (step ST184).

The first client PC transmits a file transfer request which designates transfer of the file selected at step ST183 to the second client PC operated by the attendant selected at step ST184, to the client control section 41 (step ST185).

The client control section 41 stores the file included in the file transfer request into the shared file storage section 43 and transmits a file transfer request notice to which the address of the second client PC included in the file transfer request is added, to the second client PC (step ST191).

On receiving the file transfer request notice from the client control section 41, the second client PC carries out the processing to display a transfer request message, as shown in A5-5 of FIG. 39 (step ST201).

When the user saves the file transfer in accordance with the transfer request message, that is, when the user selects "Yes", the second client PC displays a screen for designating a file copy destination for designating the saving location such as the internal HDD, as shown in A5-6 of FIG. 39 (step ST202).

Then, the second client PC copies the transferred file saved in the shared file storage section 43, thus saving the file in the saving location designated at step ST202 (step ST203).

By thus temporarily storing the file to be transferred by the client control section 41 into the shared file storage section 43, file transfer from the first client PC to the second client PC can be carried out even during the conference in the network conferencing system.

Figure 40:
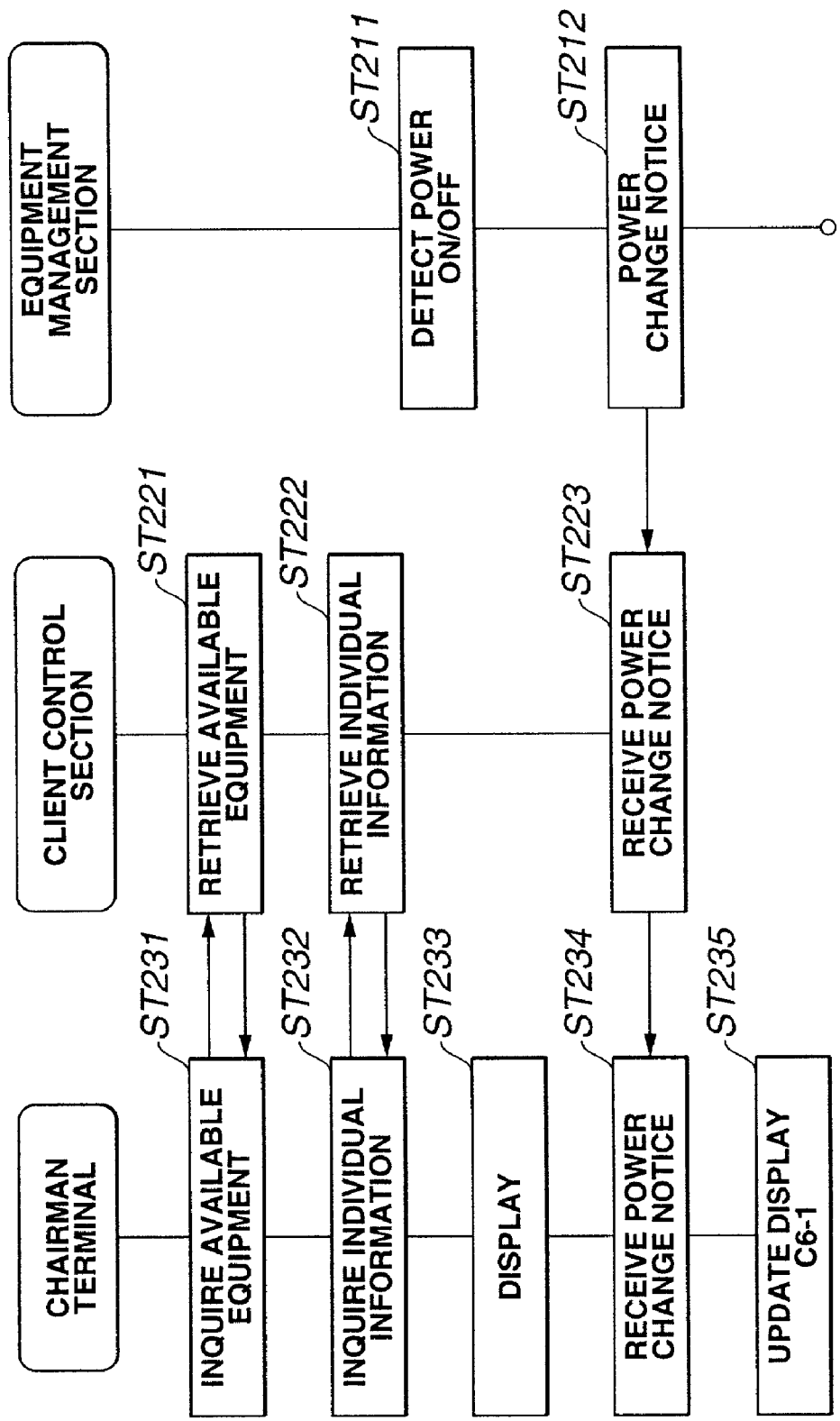
FIG. 40 is a flowchart showing the processing procedure at the chairman terminal, the client control section and an equipment management section at the time of equipment management and user authentication in the network conferencing system to which the present invention is applied.

The user authentication processing and the equipment management processing in the network conferencing system will now be described with reference to FIG. 40.

When the conference server 11 is started, the equipment management section 47 operates in accordance with the equipment recognition program. The equipment management section 47 thus prepares an equipment information file including information related to available equipments in the conference and stores the equipment information file in the equipment information file storage section 48.

When the conference server 11 is started, the client control section 41 prepares an attendant information file including information about a plurality of individuals corresponding to the respective client PCs and stores the attendant information file in the attendant information storage section 42.

When the chairman terminal is started before starting the conference, it carries out processing to inquire of the client control section 41 about available equipments (step ST231). In response to this, the client control section 41 reads out the equipment information file stored in the equipment information file storage section 48, then retrieves information related to available equipments, and transmits the information related to available equipments to the chairman terminal (step ST221).

When the chairman terminal is started before starting the conference, it also carries out the processing to inquire of the client control section 41 about information related to conference attendants (step ST232). In response to this, the client control section 41 reads out the attendant information file stored in the attendant information storage section 42, then retrieves personal data, and transmits the personal data related to the client PCs attending the conference to the chairman terminal (step ST222). On receiving the information related to the client PCs, the chairman terminal display the attendant icon display screen 61 (step ST233).

In this case, during the conference, the equipment management section 47 of the conference server 11 monitors the power on/off state of the various equipments included in the network conferencing system. When the on/off operation of the power source is detected (step ST211), the equipment management section 47 transmits a power change notice including the ID and power on/off state of the various equipments to the client control section 41 (step ST212).

On receiving the power change notice, the client control section 41 carries out the processing to transmit the power change notice to the chairman terminal (step ST223). On receiving the power change notice (step ST234), the chairman terminal changes the available equipment display screen 63 with respect to the equipment included in the power change notice (step ST235). The chairman terminal provides a shaded display of an icon of the equipment the power of which is turned off, and provides a normal display of an icon of the equipment the power of which is turned on.

Figure 41:
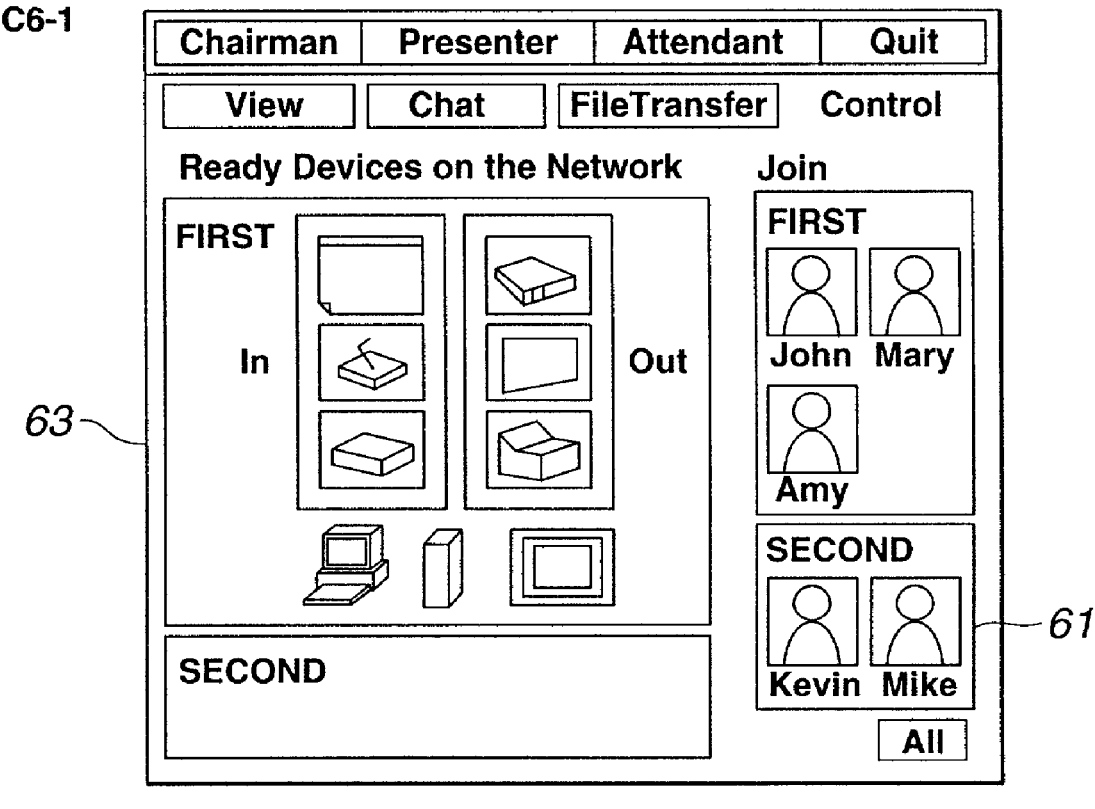
FIG. 41 shows the display screen of the chairman terminal at the time of equipment management and user authentication in the network conferencing system to which the present invention is applied.

Thus, before the start of the conference, the chairman terminal displays the available equipment display screen 63 displaying the available equipments as icons and also displays the attendant icon display screen 61 displaying the client PCs attending the conference as icons, as shown in C6-1 of FIG. 41.

Figure 42:
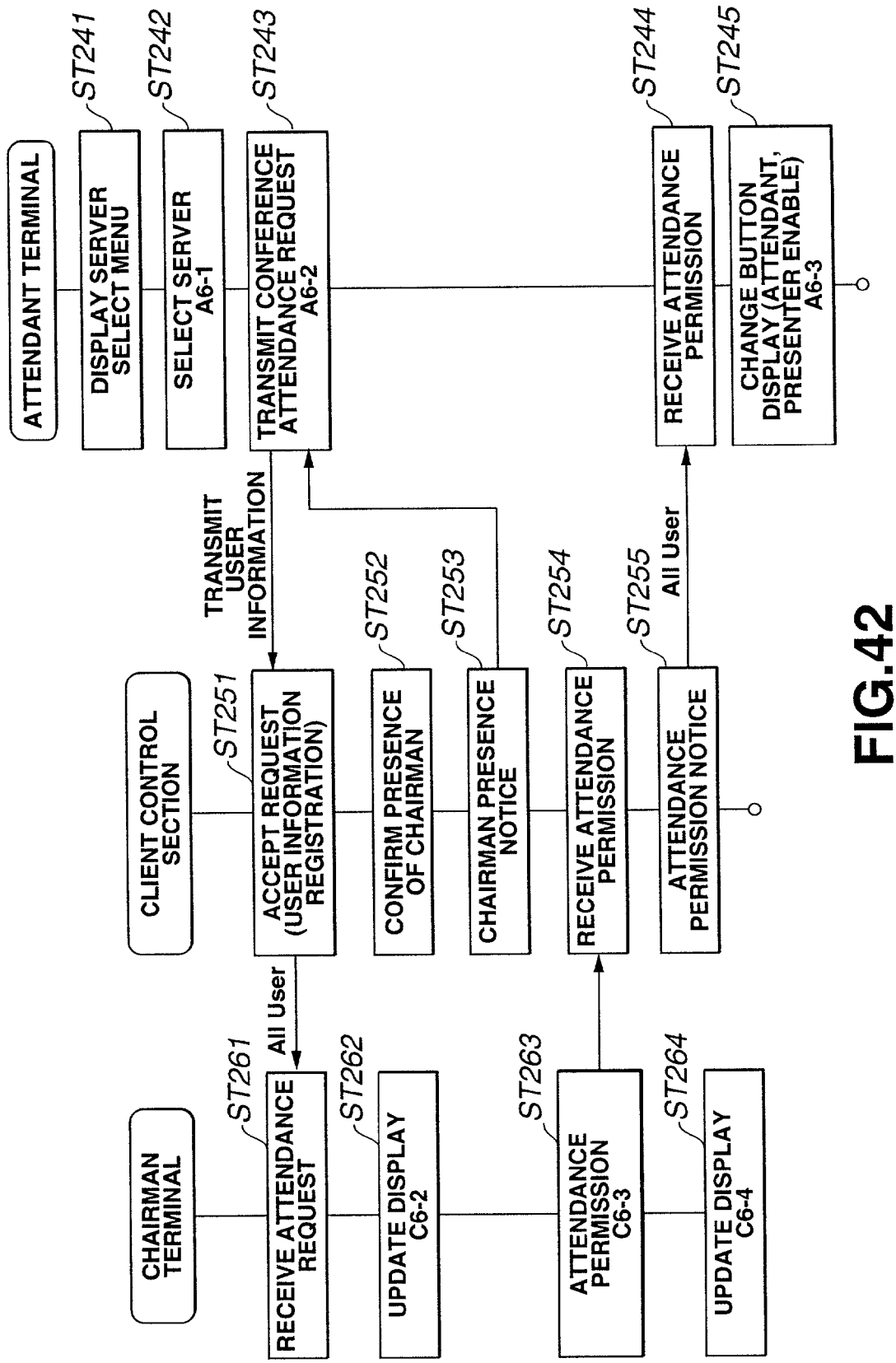
FIG. 42 is a flowchart showing the processing procedure at the attendant terminal, the client control section and the chairman terminal at the time of user authentication in the network conferencing system to which the present invention is applied.

The processing at the client PC, the client control section 41 and the chairman terminal when a new client PC attends a conference as an attendant terminal will now be described with reference to FIG. 42.

When the client PC newly attending the conference is started, the client PC first displays a server select display screen as shown in A6-1 of FIG. 43 (step ST241) and selects, for example, the first conference 10 by designating "Remote" and "first" in accordance with the operation by the user (step ST242).

When the tab of the attendant is selected in accordance with the operation by the user as indicated by an arrow in A6-2 of FIG. 43, the client PC transmits a conference attendance request for requesting for attendance at the conference as an attendant terminal to the client control section 41 (step ST243). In this case, the client PC carries out the processing to add personal data to the conference attendance request.

On accepting the conference attendance request, the client control section 41 transmits a conference attendance request notice including the personal data to all the other client PCs attending the conference and the chairman terminal (step ST251).

On receiving the conference attendance request, the client control section 41 also confirms the presence of the chairman terminal with reference to the attendant information file (step ST252). When the presence of the chairman terminal is confirmed, the client control section 41 transmits a chairman presence notice to the client PC (step ST253).

On receiving the conference attendance request notice (step ST261), the chairman terminal displays the attendant icon display screen 61 to which, for example, an icon with the name of "Amy" is added, as shown in C6-2 of FIG. 44 (step ST262).

Next, when permitting the client PC operated by the name of "Amy" to attend the conference, the chairman terminal selects the icon with the name of "Amy" as indicated by an arrow in C6-3 of FIG. 44, then prepares an attendance permission notice for the client PC in response to the operation to select the join button 62, and transmits the attendance permission notice to the client control section 41 (step ST263). In accordance with the provision of the attendance permission for the client PC, the chairman terminal changes the display of the icon with the name of "Amy" from the shaded display to the normal display, as shown in C6-4 of FIG. 44 (step ST264).

On receiving the conference attendance permission notice (step ST254), the client control section 41 carries out the processing to transmit the conference attendance permission notice to all the client PCs including the chairman terminal (step ST255).

When the client PC which transmitted the conference attendance request to the client control section 41 receives the conference attendance permission notice from the client control section 41 (step ST244), the client PC changes the icon display of the client PC to the normal display as indicated by an arrow in A6-3 of FIG. 43. The other client PCs already attending the conference similarly change the icon display of the client PC.

By such processing, the new client PC can attend the conference even during the conference and the other client PCs can recognize the new attendant in the network conferencing system.

The processing procedure at the chairman terminal, the client control section 41 and the material transmitting/receiving section 46 in carrying out proceedings control for preparing the proceedings during the conference in the network conferencing system will now be described with reference to FIG. 45.

Figure 45:
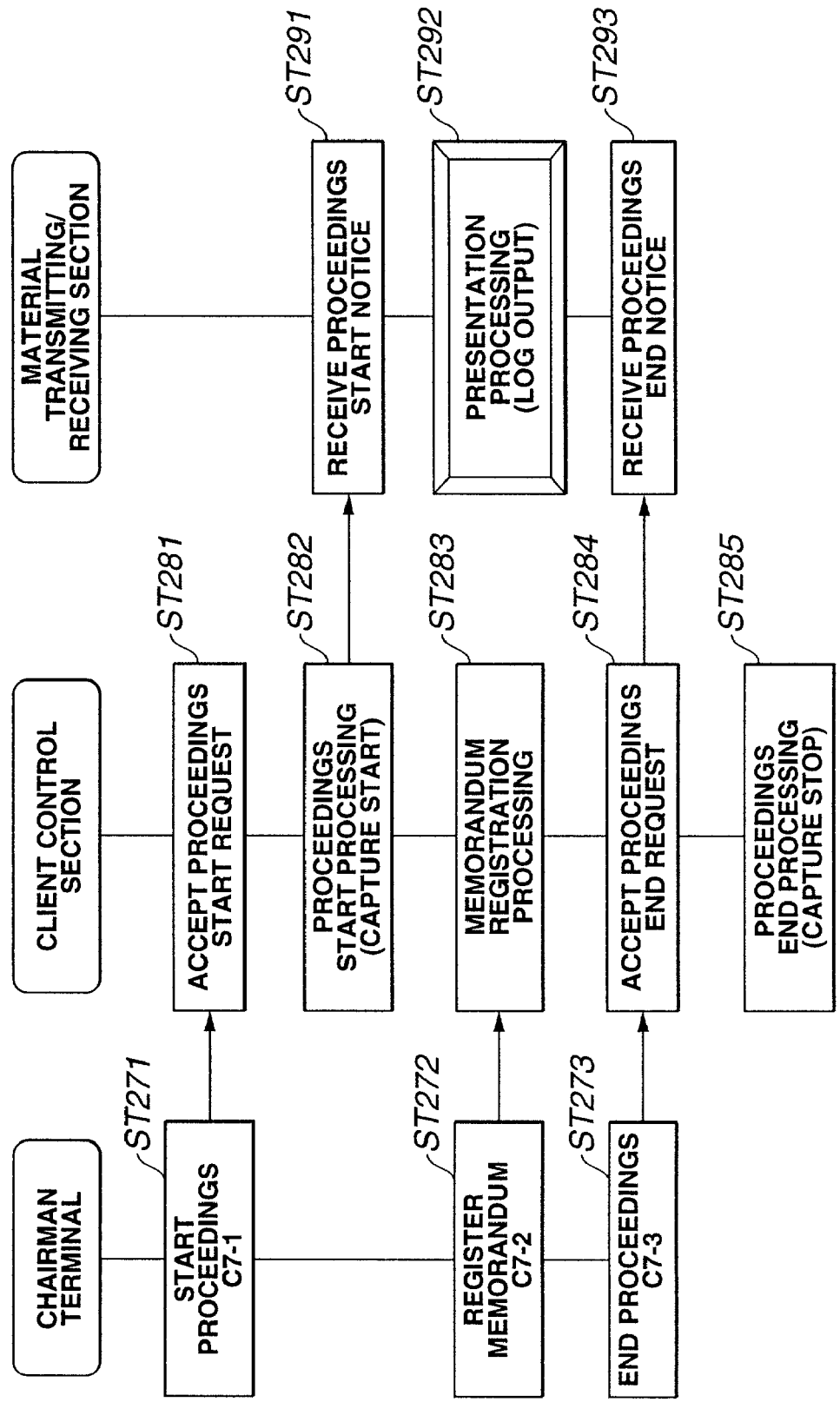
FIG. 45 is a flowchart showing the processing procedure at the chairman terminal, the client control section and the material transmitting/receiving section at the time of controlling the proceedings in the network conferencing system to which the present invention is applied.

With reference to FIG. 45, first, in response to the operation by the chairman to select a proceedings control start button (Rec) 119 as indicated by an arrow in C7-1 of FIG. 46, the chairman terminal transmits a proceedings control start request to start the proceedings control mode for preparing the proceedings in which the presentation file, the material data and images and sounds in the material data used for presentation are recorded, to the client control section 41 (step ST271).

The client control section 41 enters the proceedings control mode by accepting the proceedings control start request (step ST281) and starts capturing the video data and audio data in the first conference room 10 obtained by the teleconferencing system (step ST282). The client control section 41 also outputs a proceedings control start notice to the material transmitting/receiving section 46.

On receiving the proceedings control start notice from the client control section 41, the material transmitting/receiving section 46 enters the proceedings control mode (step ST291) and shifts to the processing to register the name of the presentation data read out from the data storage section 45 and transmitted to the projector device 15 and the presentation time of the presentation data to the proceedings log file in the data storage section 45 (step ST292).

When the operation to write a memorandum is carried out in a chairman memorandum display screen 118 as indicated by an arrow in C7-2 of FIG. 46 during the presentation, the chairman terminal transmits the memorandum data to the client control section 41 (step ST272).

On receiving the memorandum data, the client control section 41 carries out the processing to store the memorandum data into the data storage section 45 and controls the proceedings control section 44 to register the time when the memorandum data is received, as the proceedings log file (step ST283).

When the operation to select a proceedings end button (Stop) 120 indicated by an arrow in C7-3 of FIG. 46 is carried out during the presentation, the chairman terminal transmits a proceedings end request to the client control section 41 (step ST273).

On receiving the proceedings end request (step ST284), the client control section 41 cancels the proceedings control mode, then carries out the processing to end intake of the video data and audio data obtained by the teleconferencing system (step ST285), and transmits a proceedings end notice to the material transmitting/receiving section 46.

On receiving the proceedings end notice (step ST293), the material transmitting/receiving section 46 carries out the processing to end writing of the presentation data into the data storage section 45.

In the network conferencing system in which the above-described processing is carried out, the contents presented in presentation and the name thereof, the images and sounds obtained by teleconferencing system, and the memorandum data can be stored into the data storage section 45 as the proceedings file, and the time when the material is presented in presentation and the time when the memorandum data is received can be stored into the data storage section 45 as the proceedings log file. Thus, the proceedings control section 44 can prepare the proceedings log file as shown in FIG. 8.

Moreover, in the network conferencing system, as a matter of course, the contents read by the scanner device 19 during the conference and the contents taken by the data display device 16 or the 3D image input device 17 may be included in the proceedings file, and the time when the contents read by the scanner device 19 during the conference and the contents taken by the data display device 16 or the 3D image input device 17 are presented may be included in the proceedings log file.

The processing at the chairman terminal, the client control section 41 and the presenter terminal in preparing a proceedings log file and a proceedings file to start preparation of the proceedings will now be described with reference to FIG. 47.

Figure 47:
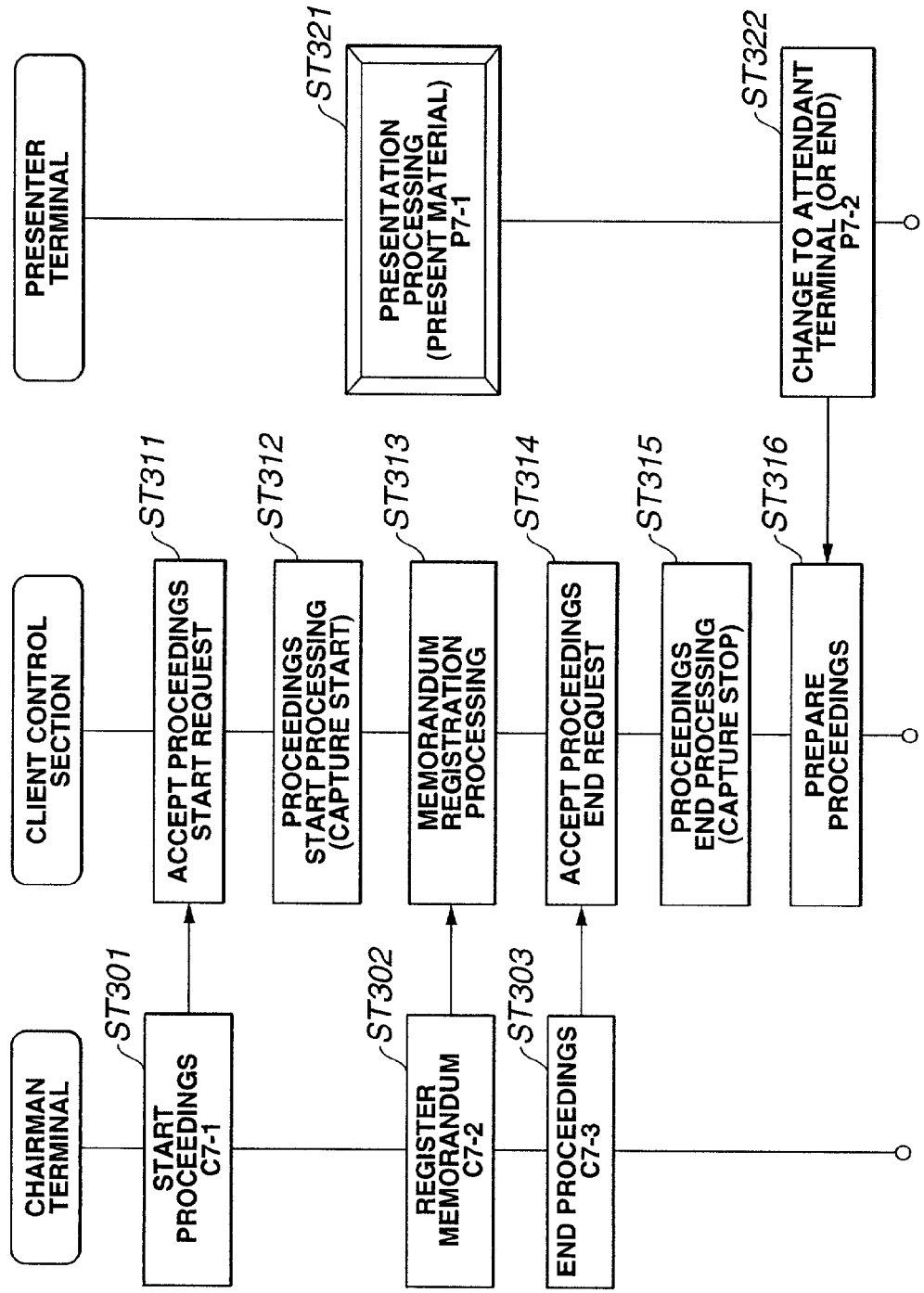
FIG. 47 is a flowchart showing the processing procedure at the chairman terminal, the client control section and the presenter terminal at the time of starting preparation of the proceedings in the network conferencing system to which the present invention is applied.

With reference to FIG. 47, first, the chairman terminal and the client control section 41 drag and drop the presentation file in the projector device 15 as shown in P7-1 of FIG. 48, thus making presentation (step ST321). The chairman terminal and the client control section 41 then carries out the processing (steps ST301 to ST315) similar to the processing described as steps ST271 to ST285 and ends the proceedings control. In this case, the presenter terminal becomes the attendant terminal if the attendant tab is selected in accordance with the operation by the user to shift the presenter terminal to the attendant terminal as indicated by an arrow in P7-2 of FIG. 48, or if the viewer display is closed to end the application for making presentation. The presenter terminal transmits information indicating that the presenter terminal has become the attendant terminal, to the client control section 41 (step ST322).

At step ST316, the client control section 41 carries out te processing to prepare the proceedings data with reference to the proceedings log file, using the presentation data, video data, audio data and memorandum data included in the proceedings file stored in the data storage section 45.

In such a network conferencing system, when the presentation is ended by the presenter terminal, the proceedings data can be prepared using the contents of presentation, the captured video data, audio data and memorandum data, and the contents presented by the various equipments.

The processing at the chairman terminal, the client control section 41 and the teleconferencing system in carrying out teleconference control during presentation in the network conferencing system will now be described with reference to FIG. 49.

Figure 49:
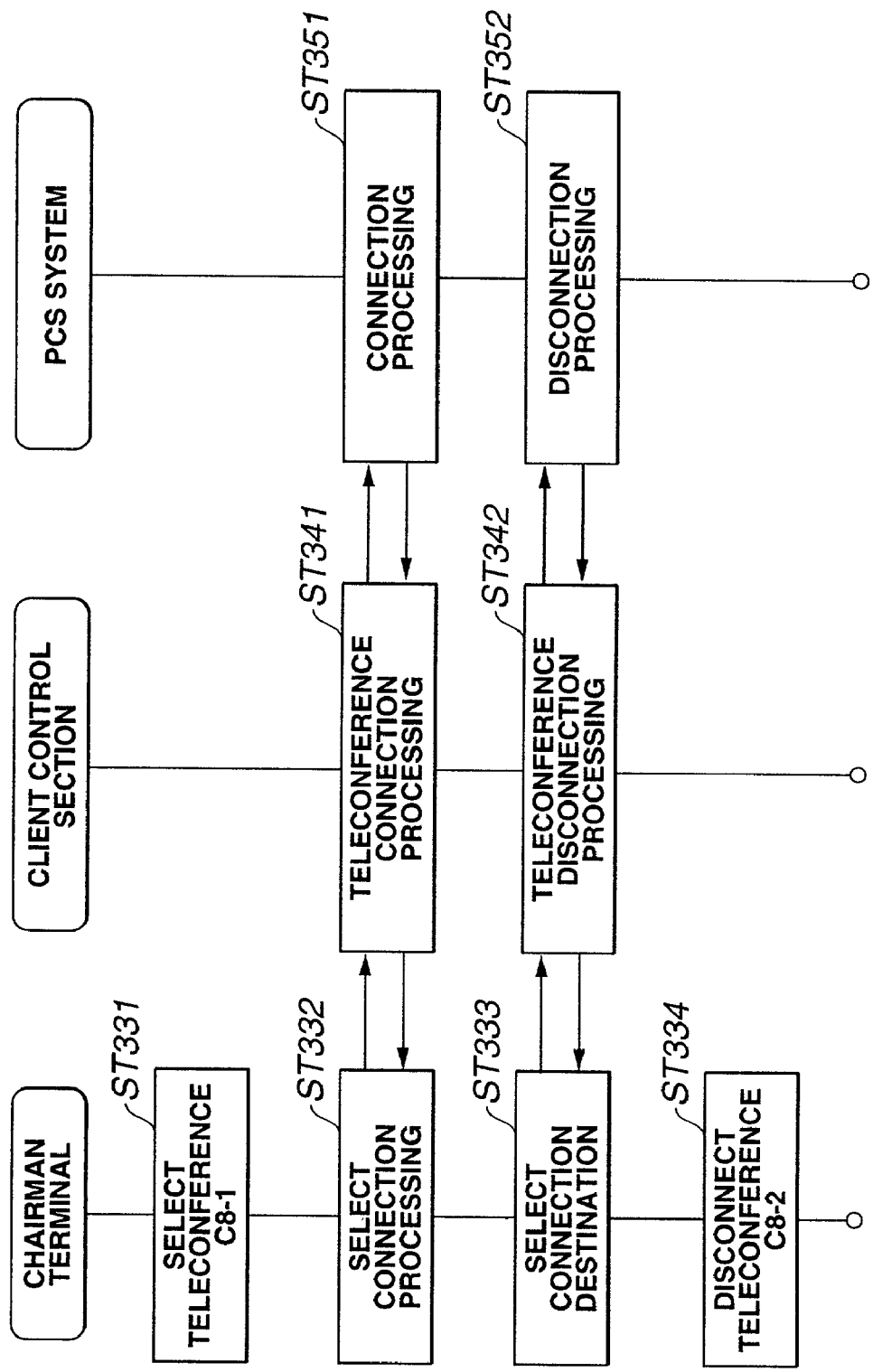
FIG. 49 is a flowchart showing the processing procedure at the chairman terminal, the client control section and a teleconferencing system at the time of teleconference control in the network conferencing system to which the present invention is applied.
Figure 50:
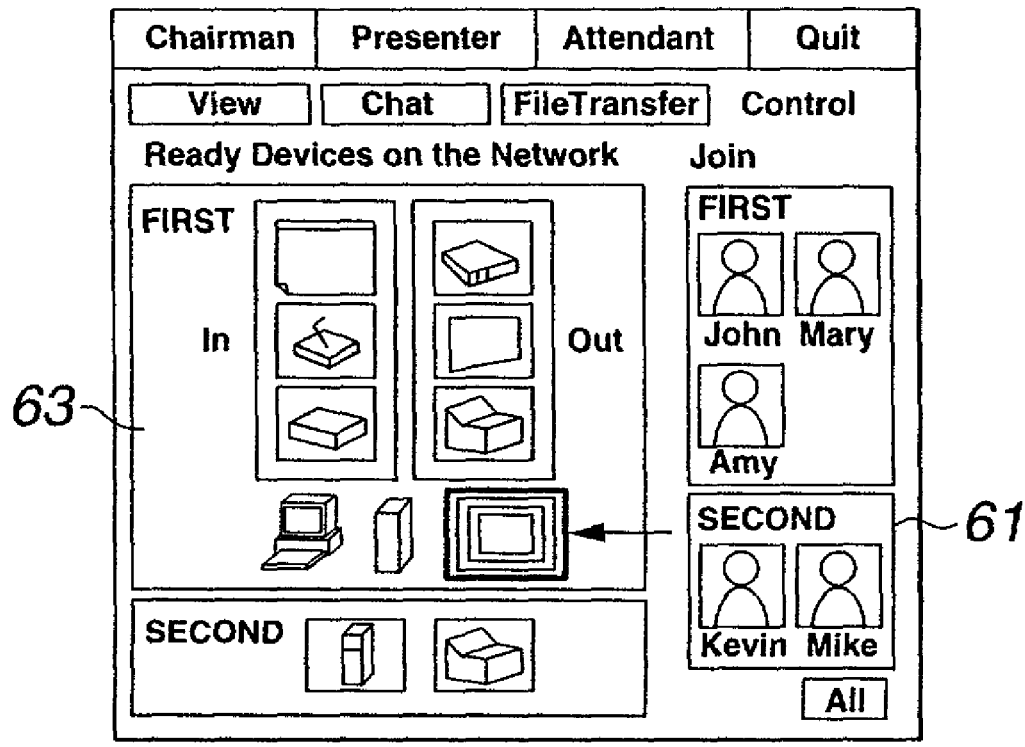
FIG. 50 shows the display screen at the time of teleconference control by the chairman terminal in the network conferencing system to which the present invention is applied.

With reference to FIG. 49, first, the chairman terminal starts the teleconferencing operation as the operation to select the icon display of the teleconferencing system is carried out as indicated by an arrow in FIG. 50 (step ST331).

Then, the chairman terminal selects the connection processing between the teleconferencing systems when starting the teleconference (step ST332), and selects the teleconferencing system 35 in the second conference room 30 as the connection destination (step ST333). The chairman terminal then transmits a connection request for connection between the teleconferencing system in the first conference room 10 and the teleconferencing system 35 to the client control section 41.

On receiving the connection request from the chairman terminal, the client control section 41 transmits the connection request to the teleconferencing system in the first conference room 10 and the teleconferencing system 35, thus carrying out the teleconference connection processing (step S341).

In response to the connection request from the client control section 41, the teleconferencing system in the first conference room 10 and the teleconferencing system 35 carry out the connection processing to transmit and receive video data and audio data, and output a connection completion notice to the client control section 41 and the chairman terminal (step ST351).

Then, the chairman terminal carries out the processing to select and disconnect the teleconferencing system as indicated by an arrow in FIG. 36, thus outputting a disconnection request to the client control section 41 (step ST334).

The client control section 41 outputs the disconnection request to the teleconferencing system in the first conference room 10 and the teleconferencing system 35 (step ST342).

The teleconferencing system in first conference room 10 and the teleconferencing system 35 carry the disconnection processing. On completion of the disconnection processing, the teleconferencing system in the first conference room 10 and the teleconferencing system 35 output a disconnection completion notice to the client control section 41 and the chairman terminal (step ST352).

Thus, in the network conferencing system, the setting, start and disconnection of the teleconference can be controlled under the control of the chairman terminal.

In the above-described embodiment, the conference server 11 exists and the various types of control is carried out by the conference server 11. However, the various functions of the conference server 11 may be provided in the client PCs. That is, the client PCs operated by the conference attendants and the conference server 11 may be realized by the same hardware. Thus, the client PC having the functions of the conference server 11 can directly transmit the data stored in the internal storage medium to the projector device 15 and the data display device 16 via the radio communication device 13.

Industrial Applicability

With the network conferencing system and equipment management method according to the present invention, the output electronic equipment and the generating electronic equipment are managed by the equipment management function of the attendant electronic equipment, and icon displays of the output electronic equipment and the generating electronic equipment can be separately provided to each attendant electronic equipment. Therefore, the various electronic equipments used for a conference can be integrally managed by one of the attendant electronic equipments.

With the conference management server and equipment management method according to the present invention, the output electronic equipment and the generating electronic equipment are managed by preparing the equipment management file, and the equipment display information for providing separate icon displays of the output electronic equipment and the generating electronic equipment to each attendant electronic equipment can be prepared and outputted to each attendant electronic equipment. Therefore, the various electronic equipments used for a conference can be integrally managed by one of the attendant electronic equipments.

With the network conferencing system and data presentation method according to the present invention, even in the case of presenting material data generated by the generating electronic equipment, presentation can be made by the presentation function with the contents of material data displayed in a list and presented to the presenter, thus enabling simple presentation.

With the conference management server and data presentation method according to the present invention, even in the case of presenting material data generated by the generating electronic equipment, the contents of material data is displayed in a list and presented to the presenter while the selected material data is outputted to the output electronic equipment and/or the attendant electronic equipment via the conference management server, thus enabling presentation. Therefore, presentation can be made in a simple manner.

What is claimed is:

1. A network conferencing system having an output electronic equipment for presenting the contents of a presentation, a generating electronic equipment for generating the contents of the presentation to be presented by the output electronic equipment, a plurality of attendant electronic equipment operated by users attending a conference, and a conference management server connected with the output electronic equipment and the attendant electronic equipment so as to transmit and receive information to and from the output electronic equipment and the attendant electronic equipment, via a communication network, each of the attendant electronic equipment comprising an information input/output unit for inputting and outputting information from and to the other attendant electronic equipment and the output electronic equipment via the communication network, a presentation unit for presenting the contents of presentation by using the output electronic equipment, a presentation contents browsing unit for browsing the contents of the presentation presented by the presentation unit of the other attendant electronic equipment using the output electronic equipment, an authentication unit for carrying out authentication of attendance of the other attendant electronic equipment at a conference, an equipment management unit for managing the state of each electronic equipment connected to the communication network, a display unit for displaying, as icons, the other attendant electronic equipment with their attendance authenticated by the authentication unit and the electronic equipment managed by the equipment management unit, and a proceedings control unit for obtaining information for preparing the proceedings by using the contents of the presentation presented by the presentation unit, wherein the display unit has a separate area for icon display of the generating electronic equipment and an area for icon display of the output electronic equipment, thus providing the icon display of the generating electronic equipment and the icon display of the output electronic equipment.

2. The network conferencing system as claimed in claim 1, wherein each of the attendant electronic equipment further enables selection of the icon displays of the generating electronic equipment and the output electronic equipment and generates a control request for controlling the generating electronic equipment and the output electronic equipment that are selected.

3. The network conferencing system as claimed in claim 1, wherein each of the attendant electronic equipment further enables selection of the icon display of the generating electronic equipment and transmits an attribute display request for displaying attribute information about data generated and stored by the selected generating electronic equipment, to the conference management server, and the display unit displays a list of the attribute information generated by the generating electronic equipment corresponding to the selected icon display and stored in the conference server.

4. The network conferencing system as claimed in claim 1, wherein the display unit displays an available electronic equipment at the conference as a selectable icon display and displays an unavailable electronic equipment at the conference as a non-selectable icon display.

5. The network conferencing system as claimed in claim 1, wherein the display unit prepares equipment display information including an icon display of an electronic equipment existing within the communication network, in a first screen area, and includes an icon display of an electronic equipment existing outside the communication network, in a second screen area.

6. The network conferencing system as claimed in claim 5, wherein the display unit displays location attribute information indicating the presence within the communication network, in the first screen area, and displays location attribute information indicating the presence outside the communication network, in the second screen area.

7. The network conferencing system as claimed in claim 1, wherein the display unit provides icon displays based on the functions of the output electronic equipment and the generating electronic equipment.

8. An equipment management method for a network conferencing system in which an output electronic equipment for presenting the contents of a presentation, a generating electronic equipment for generating the contents of the presentation to be presented by the output electronic equipment, a plurality of attendant electronic equipment, and a conference management server connected with the output electronic equipment and the attendant electronic equipment so as to transmit and receive information to and from the output electronic equipment and the attendant electronic equipment, via a communication network, each of the attendant electronic equipment comprising an information input/output unit for inputting and outputting information from and to the other attendant electronic equipment and the output electronic equipment via the communication network, a presentation unit for presenting the contents of the presentation by using the output electronic equipment, a presentation contents browsing unit for browsing the contents of the presentation presented by the presentation unit of the other attendant electronic equipment using the output electronic equipment, an authentication unit for carrying out authentication of attendance of the other attendant electronic equipment at a conference, an equipment management unit for managing the state of each electronic equipment connected to the communication network, a display unit for displaying, as icons, the other attendant electronic equipment with their attendance authenticated by the authentication unit and the electronic equipment managed by the equipment management unit, and a proceedings control unit for obtaining information for preparing the proceedings by using the contents of the presentation presented by the presentation unit, wherein when each of the attendant electronic equipment attends a conference, an area for icon display of the generating electronic equipment and an area for icon display of the output electronic equipment are separated, thus providing the icon display of the generating electronic equipment and the icon display of the output electronic equipment by the display unit of the attendant electronic equipment.

9. The equipment management method as claimed in claim 8, wherein the icon displays of the generating electronic equipment and the output electronic equipment are selected by the attendant electronic equipment, and a control request for controlling the generating electronic equipment and the output electronic equipment that are selected is generated.

10. The equipment management method as claimed in claim 9, wherein the icon display of the generating electronic equipment is selected by the attendant electronic equipment, an attribute display request for displaying attribute information about data generated by the selected generating electronic equipment is transmitted from the attendant electronic equipment to the conference management server, the attribute information is transmitted from the conference management server to the attendant electronic equipment, and
a list of the attribute information is displayed by the display unit of the attendant electronic equipment.

11. The equipment management method as claimed in claim 8, wherein of icon displays provided by the display unit, an icon display of an available electronic equipment at the conference is made selectable and an icon display of an unavailable electronic equipment at the conference is made non-selectable.

12. The equipment management method as claimed in claim 8, wherein an icon display of an electronic equipment existing within the communication network is included in a first screen area and an icon display of an electronic equipment existing outside the communication network is included in a second screen area.

13. The equipment management method as claimed in claim 8, wherein location attribute information indicating the presence within the communication network is displayed in the first screen area and location attribute information indicating the presence outside the communication network is displayed in the second screen area.

14. The equipment management method as claimed in claim 8, wherein icon displays based on the functions of the output electronic equipment and the generating electronic equipment are provided.

15. A conference management server connected with an output electronic equipment for presenting the contents of a presentation, a generating electronic equipment for generating the contents of the presentation to be presented by the output electronic equipment, and a plurality of attendant electronic equipment via a communication network, each of the attendant electronic equipment comprising an information input/output unit for inputting and outputting information from and to the other attendant electronic equipment and the output electronic equipment via the communication network, a presentation unit for presenting the contents of the presentation by using the output electronic equipment, a presentation contents browsing unit for browsing the contents of the presentation presented by the presentation unit of the other attendant electronic equipment using the output electronic equipment, an authentication unit for carrying out authentication of attendance of the other attendant electronic equipment at a conference, an equipment management unit for monitoring the electronic equipment connected with the communication network and managing the state of each electronic equipment, a display unit for displaying, as icons, the other attendant electronic equipment with their attendance authenticated by the authentication unit and the electronic equipment managed by the equipment management unit, and a proceedings control unit for obtaining information for preparing the proceedings by using the contents of presentation presented by the presentation unit, the conference management server comprising:
equipment management means for monitoring the operating states of the output electronic equipment and the generating electronic equipment and preparing an equipment information file showing the type of each equipment and the operating state of each equipment;
equipment display information preparation means for preparing equipment display information which separately displays an area for icon display of the generating electronic equipment and an area for icon display of the output electronic equipment on the basis of the result of monitoring and the type from the equipment management means; and
output means for transmitting the equipment display information prepared by the equipment display information preparation means to the attendant electronic equipment.

16. The conference management server as claimed in claim 15, wherein the equipment display information preparation means prepares equipment display information to enable selection of the icon displays of the generating electronic equipment and the output electronic equipment.

17. The conference management server as claimed in claim 15, further comprising data storage means for associating the generating electronic equipment managed by the equipment management means with the data generated by the generating electronic equipment and thus storing the data, and
means for transmitting information for displaying a list of attribute information of the data that is generated by the generating electronic equipment corresponding to the icon display selected by the attendant electronic equipment and is stored in the data storage means.

18. The conference management server as claimed in claim 15, wherein the equipment display information preparation means prepares equipment display information to enable selection of an icon display of an available electronic equipment at the conference and to make it impossible to select an icon display of an unavailable electronic equipment at the conference.

19. The conference management server as claimed in claim 15, wherein the equipment display information preparation means prepares equipment display information including an icon display of an electronic equipment existing within the communication network, in a first screen area, and including an icon display of an electronic equipment existing outside the communication network, in a second screen area.

20. The conference management server as claimed in claim 19, wherein the equipment display information preparation means prepares equipment display information for displaying location attribute information indicating the presence within the communication network, in the first screen area, and displaying location attribution information indicating the presence outside the communication network, in the second screen area.

21. The conference management server as claimed in claim 15, wherein the equipment display information preparation means prepares equipment display information for providing icon displays based on the functions of the output electronic equipment and the generating electronic equipment.

22. An equipment management method for a conference server connected with an output electronic equipment for presenting the contents of a presentation, a generating electronic equipment for generating the contents of the presentation to be presented by the output electronic equipment, and a plurality of attendant electronic equipment via a communication network, each of the attendant electronic equipment comprising an information input/output unit for inputting and outputting information from and to the other attendant electronic equipment and the output electronic equipment via the communication network, a presentation unit for presenting the contents of the presentation by using the output electronic equipment, a presentation contents browsing unit for browsing the contents of the presentation presented by the presentation unit of the other attendant electronic equipment using the output electronic equipment, an authentication unit for carrying out authentication of attendance of the other attendant electronic equipment at a conference, an equipment management unit for monitoring the electronic equipment connected with the communication network and managing the state of each electronic equipment, a display unit for displaying, as icons, the other attendant electronic equipment with their attendance authenticated by the authentication unit and the electronic equipment managed by the equipment management unit, and a proceedings control unit for obtaining information for preparing the proceedings by using the contents of presentation presented by the presentation unit, the method comprising the steps of:

monitoring the operating states of the output electronic equipment and the generating electronic equipment;

preparing an equipment information file showing the type of each equipment and the operating state of each equipment;

preparing equipment display information which separately displays an area for icon display of the generating electronic equipment and an area for icon display of the output electronic equipment on the basis of the result of monitoring and the type; and transmitting the prepared equipment display information to the attendant electronic equipment.

23. The equipment management method as claimed in claim 22, wherein the equipment display information to enable selection of the icon displays of the generating electronic equipment and the output electronic equipment is prepared.

24. The equipment management method as claimed in claim 22, wherein information related to the generating electronic equipment including the operating state of each generating electronic equipment and the type of each equipment is associated with the data generated by the generating electronic equipment and thus stored, and information for displaying a list of attribute information of the data that is generated by the generating electronic equipment corresponding to the icon display selected by the attendant electronic equipment and is thus stored, is transmitted.

25. The equipment management method as claimed in claim 22, wherein equipment display information to enable selection of an icon display of an available electronic equipment at the conference and to make it impossible to select an icon display of an unavailable electronic equipment at the conference, is prepared.

26. The equipment management method as claimed in claim 22, wherein equipment display information including an icon display of an electronic equipment existing within the communication network, in a first screen area, and including an icon display of an electronic equipment existing outside the communication network, in a second screen area, is prepared.

27. The equipment management method as claimed in claim 26, wherein equipment display information for displaying location attribute information indicating the presence within the communication network, in the first screen area, and displaying location attribution information indicating the presence outside the communication network, in the second screen area, is prepared.

28. The equipment management method as claimed in claim 22, wherein equipment display information for providing icon displays based on the functions of the output electronic equipment and the generating electronic equipment is prepared.

29. An attendant electronic equipment connected with an output electronic equipment for presenting the contents of a presentation, a generating electronic equipment for generating the contents of the presentation to be presented by the output electronic equipment, and a conference management server connected with the output electronic equipment so as to transmit and receive information to and from the output electronic equipment, via a communication network, the attendant electronic equipment being operated by a user attending a conference connected with the server to transmit and receive information to and from the server via the communication network, the attendant electronic equipment comprising an information input/output unit for inputting and outputting information from and to other attendant electronic equipment and the output electronic equipment via the communication network, a presentation unit for presenting the contents of the presentation by using the output electronic equipment, a presentation contents browsing unit for browsing the contents of the presentation presented by the presentation unit of the other attendant electronic equipment using the output electronic equipment, an authentication unit for carrying out authentication of attendance of the other attendant electronic equipment at a conference, an equipment management unit for managing the state of each electronic equipment connected with the communication network, a display unit for displaying, as icons, the other attendant electronic equipment with their attendance authenticated by the authentication unit and the electronic equipment managed by the equipment management unit, and a proceedings control unit for obtaining information for preparing the proceedings by using the contents of presentation presented by the presentation unit, wherein the display unit has a separate area for icon display of the generating electronic equipment and an area for icon display of the output electronic equipment, thus providing the icon display of generating electronic equipment and the icon display of the output electronic equipment.

30. A network conferencing system having an output electronic equipment for presenting the contents of a presentation, a generating electronic equipment for generating the contents of the presentation to be presented by the output electronic equipment, a plurality of attendant electronic equipment operated by users attending a conference, and a conference management server connected with the output electronic equipment and the attendant electronic equipment so as to transmit and receive information to and from the output electronic equipment and the attendant electronic equipment via a communication network, each of the attendant electronic equipment comprising an information input/output unit for inputting and outputting information from and to the other attendant electronic equipment, the output electronic equipment and the generating electronic equipment via the communication network, a presentation unit for presenting the contents of presentation by using the output electronic equipment, a presentation contents browsing unit for browsing the contents of presentation presented by the presentation unit of the other attendant electronic equipment using the output electronic equipment, an authentication unit for carrying out authentication of attendance of the other attendant electronic equipment at a conference, an equipment management unit for managing the state of each electronic equipment connected to the communication network, a display unit for displaying, as icons, the other attendant electronic equipment with their attendance authenticated by the authentication unit and the electronic equipment managed by the equipment management unit, and a proceedings control unit for carrying out control to prepare the proceedings by using the contents of the presentation presented by the presentation unit, wherein the presentation unit selects an icon display of the generating electronic equipment from the icon displays of the generating electronic equipment made by the display unit in accordance with the operation by the user, then carries out control to display, by the display unit, a list of the contents of material data generated by the generating electronic equipment corresponding to the selected icon display, then selects the contents of material data displayed in the list by the display unit, and carries out control to transfer the selected material data to the output electronic equipment or the attendant electronic equipment via the conference management server.

31. The network conferencing system as claimed in claim 30, wherein the presentation unit causes browsing of the selected data by the presentation contents browsing unit of the other attendant electronic equipment.

32. The network conferencing system as claimed in claim 30, wherein the presentation unit controls the display unit to provide a display related to the contents of the material data when transferring the material data.

33. The network conferencing system as claimed in claim 30, wherein the proceedings control unit stores the material data selected and transferred by the presentation unit and the contents of presentation into the conference management server.

34. A data presentation method for a network conferencing system in which an output electronic equipment for presenting the contents of a presentation, a generating electronic equipment for generating the contents of the presentation to be presented by the output electronic equipment, a plurality of attendant electronic equipment operated by users attending a conference, and a conference management server connected with the output electronic equipment and the attendant electronic equipment so as to transmit and receive information to and from the output electronic equipment and the attendant electronic equipment, are connected via a communication network, each of the attendant electronic equipment comprising an information input/output unit for inputting and outputting information from and to the other attendant electronic equipment, the output electronic equipment and the generating electronic, equipment via the communication network, a presentation unit for presenting the contents of the presentation by using the output electronic equipment and/or the other attendant electronic equipment, a presentation contents browsing unit for browsing the contents of the presentation presented by the presentation unit of the other attendant electronic equipment using the output electronic equipment, an authentication unit for carrying out authentication of attendance of the other attendant electronic equipment at a conference, an equipment management unit for managing the state of each electronic equipment connected to the communication network, a display unit for displaying, as icons, the other attendant electronic equipment with their attendance authenticated by the authentication unit and the electronic equipment managed by the equipment management unit, and a proceedings control unit for carrying out control to prepare the proceedings by using the contents of the presentation presented by the presentation unit, the method comprising the steps of:

providing an icon display related to the generating electronic equipment by the display unit;

selecting the icon display of the generating electronic equipment in accordance with the operation by the user;

displaying, by the display unit, a list of the contents of material data generated by the generating electronic equipment corresponding to the selected icon display;

selecting the material data displayed in the list by the display unit; and transferring the selected material data to the output electronic equipment or the attendant electronic equipment via the conference management server.

35. The data presentation method as claimed in claim 34, wherein the selected material data is browsed by the presentation contents browsing unit of the other attendant electronic equipment.

36. The data presentation method as claimed in claim 34, wherein the display unit is controlled to provide a display related to the contents of data to the selected material data.

37. The presentation method as claimed in claim 34, wherein the material data selected and transferred by the presentation unit and the contents of presentation are stored into the conference management server.

38. A conference management server connected with an output electronic equipment for presenting the contents of a presentation, a generating electronic equipment for generating the contents of the presentation to be presented by the output electronic equipment, and a plurality of attendant electronic equipment via a communication network, each of the attendant electronic equipment comprising an information input/output unit for inputting and outputting information from and to the other attendant electronic equipment, the output electronic equipment and the generating electronic equipment via the communication network, a presentation unit for presenting the contents of the presentation by using the output electronic equipment and/or the other attendant electronic equipment, a presentation contents browsing unit for browsing the contents of the presentation presented by the presentation unit of the other attendant electronic using the output electronic equipment, an authentication unit for carrying out authentication of attendance of the other attendant electronic equipment at a conference, an equipment management unit for monitoring the electronic equipment connected with the communication network and managing the state of each electronic equipment, a display unit for displaying, as icons, the other attendant electronic equipment with their attendance authenticated by the authentication unit and the electronic equipment managed by the equipment management unit, and a proceedings control unit for obtaining information for preparing the proceedings by using the contents of presentation presented by the presentation unit, the conference management server comprising:

material data input means for inputting material data generated by the generating electronic equipment;

data storage means for storing the material data inputted by the material data input means;

output means for outputting the material data to the output electronic equipment or the attendant electronic equipment in accordance with a request from the attendant electronic equipment having the authority of a presenter terminal with the presentation unit; and control means for carrying out control to cause the presenter terminal to display a list of the material data generated by the generating electronic equipment in accordance with a material presentation request for presenting the material data generated by the generating electronic equipment from the presenter terminal, and to transfer the material data selected in accordance with a material presentation request for selecting the material data displayed in the list, to the output electronic equipment or the attendant electronic equipment.

39. A data presentation method for a conference management server connected with an output electronic equipment for presenting the contents of a presentation, a generating electronic equipment for generating the contents of the presentation to be presented by the output electronic equipment, and a plurality of attendant electronic equipment via a communication network, each of the attendant electronic equipment comprising an information input/output unit for inputting and outputting information from and to the other attendant electronic equipment, the output electronic equipment and the generating electronic equipment via the communication network, a presentation unit for presenting the contents of the presentation by using the output electronic equipment and/or the other attendant electronic equipment, a presentation contents browsing unit for browsing the contents of the presentation presented by the presentation unit of the other attendant electronic using the output electronic equipment, an authentication unit for carrying out authentication of attendance of the other attendant electronic equipment at a conference, an equipment management unit for monitoring the electronic equipment connected with the communication network and managing the state of each electronic equipment, a display unit for displaying, as icons, the other attendant electronic equipment with their attendance authenticated by the authentication unit and the electronic equipment managed by the equipment management unit, and a proceedings control unit for obtaining information for preparing the proceedings by using the contents of the presentation presented by the presentation unit, the method comprising the steps of:

inputting material data generated by the generating electronic equipment;

storing the inputted presentation data and material data;

causing the presenter terminal to display a list of the material data generated by the generating electronic equipment in accordance with a material presentation request for presenting the material data generated by the generating electronic equipment from the attendant electronic equipment having the authority of a presenter terminal with the presentation unit; and transferring the material data selected in accordance with a material presentation request for selecting the material data displayed in the list, to the output electronic equipment or the attendant electronic equipment.

40. An attendant electronic equipment connected with an output electronic equipment for presenting the contents of a presentation, a generating electronic equipment for generating the contents of the presentation to be presented by the output electronic equipment, and a conference management server connected with the output electronic equipment so as to transmit and receive information to and from the output electronic equipment, via a communication network, the attendant electronic equipment being operated by a user attending a conference connected with the server to transmit and receive information to and from the server via the communication network, the attendant electronic equipment comprising an information input/output unit for inputting and outputting information from and to the other attendant electronic equipment, the output electronic equipment and the generating electronic equipment via the communication network, a presentation unit for presenting the contents of the presentation by using the output electronic equipment, a presentation contents browsing unit for browsing the contents of the presentation presented by the presentation unit of the other attendant electronic equipment using the output electronic equipment, an authentication unit for carrying out authentication of attendance of the other attendant electronic equipment at a conference, an equipment management unit for managing the state of each electronic equipment connected to the communication network, a display unit for displaying, as icons, the other attendant electronic equipment with their attendance authenticated by the authentication unit and the electronic equipment managed by the equipment management unit, and a proceedings control unit for carrying out control to prepare the proceedings by using the contents of presentation presented by the presentation unit, wherein the presentation unit selects an icon display of the generating electronic equipment from the icon displays of the generating electronic equipment made by the display unit in accordance with the operation by the user, then carries out control to display, by the display unit, a list of the contents of material data generated by the generating electronic equipment corresponding to the selected icon display, then selects the contents of material data displayed in the list by the display unit, and carries out control to transfer the selected material data to the output electronic equipment or the attendant electronic equipment via the conference management server.

* * * * *